(12) United States Patent
Hayakawa et al.

(10) Patent No.: US 6,373,639 B2
(45) Date of Patent: *Apr. 16, 2002

(54) ZOOM LENS HAVING AN IMAGE STABILIZING FUNCTION

(75) Inventors: Shingo Hayakawa; Kazuhiko Momoki, both of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,264

(22) Filed: Oct. 20, 1998

Related U.S. Application Data

(62) Division of application No. 08/404,870, filed on Mar. 15, 1995, now Pat. No. 6,124,972.

(30) Foreign Application Priority Data

| | | |
|---|---|---|
| Mar. 18, 1994 | (JP) | 06-074390 |
| Jul. 12, 1994 | (JP) | 06-182813 |
| Aug. 24, 1994 | (JP) | 06-222443 |
| Nov. 7, 1994 | (JP) | 06-297866 |

(51) Int. Cl.⁷ ............................................. G02B 15/14
(52) U.S. Cl. ........................ 359/683; 359/676; 359/677; 359/685
(58) Field of Search ............................... 359/554–557, 359/676–677, 680–684, 750–752, 754, 756, 757; 396/52–55; 348/208

(56) References Cited

U.S. PATENT DOCUMENTS

| | | | | |
|---|---|---|---|---|
| 4,830,477 A | * | 5/1989 | Takahashi et al. | 359/683 |
| 4,836,662 A | | 6/1989 | Ogata et al. | 359/690 |
| 4,907,868 A | * | 3/1990 | Kitagishi et al. | 359/557 |
| 4,974,950 A | * | 12/1990 | Yamazaki et al. | 359/785 |
| 5,000,549 A | | 3/1991 | Yamazaki | 359/557 |
| 5,018,845 A | * | 5/1991 | Yamazaki | 359/557 |
| 5,121,978 A | * | 6/1992 | Maruyama | 359/557 |
| 5,189,557 A | * | 2/1993 | Endo | 359/683 |
| 5,303,087 A | | 4/1994 | Hayakawa et al. | 359/708 |
| 5,434,710 A | | 7/1995 | Zozawa | 359/689 |
| 5,715,088 A | | 2/1998 | Suzuki | 359/557 |
| 5,717,526 A | * | 2/1998 | Ohtake | 359/683 |

FOREIGN PATENT DOCUMENTS

| | | | |
|---|---|---|---|
| JP | 50-80147 | 6/1975 | |
| JP | 56-21133 | 5/1981 | |
| JP | 56-34847 | 8/1981 | |
| JP | 57-7414 | 2/1982 | |
| JP | 61-223819 | 10/1986 | |
| JP | 1-191825 | 8/1989 | 359/557 |
| JP | 4-186212 | 7/1992 | |

* cited by examiner

Primary Examiner—Thong Nguyen
(74) Attorney, Agent, or Firm—Fitzpatrick, Cella, Harper & Scinto

(57) ABSTRACT

A zoom lens is disclosed comprising, from front to rear, a first lens unit of positive refractive power, a second lens unit of negative refractive power, a third lens unit of positive refractive power, a fourth lens unit of negative refractive power, a fifth lens unit of positive refractive power and a sixth lens unit of negative refractive power, wherein, during zooming from the wide-angle end to the telephoto end, the air separations between the i-th and (i+1)st lens units are made to vary properly and the ratio of the focal length of the fourth lens unit to the longest focal length of the entire system is made to have a proper value. In particular, a zoom lens is disclosed wherein the second lens unit is made to decenter to stabilize the image.

5 Claims, 41 Drawing Sheets

FIG.4(A)(1) FIG.4(A)(2) FIG.4(A)(3) FIG.4(A)(4)
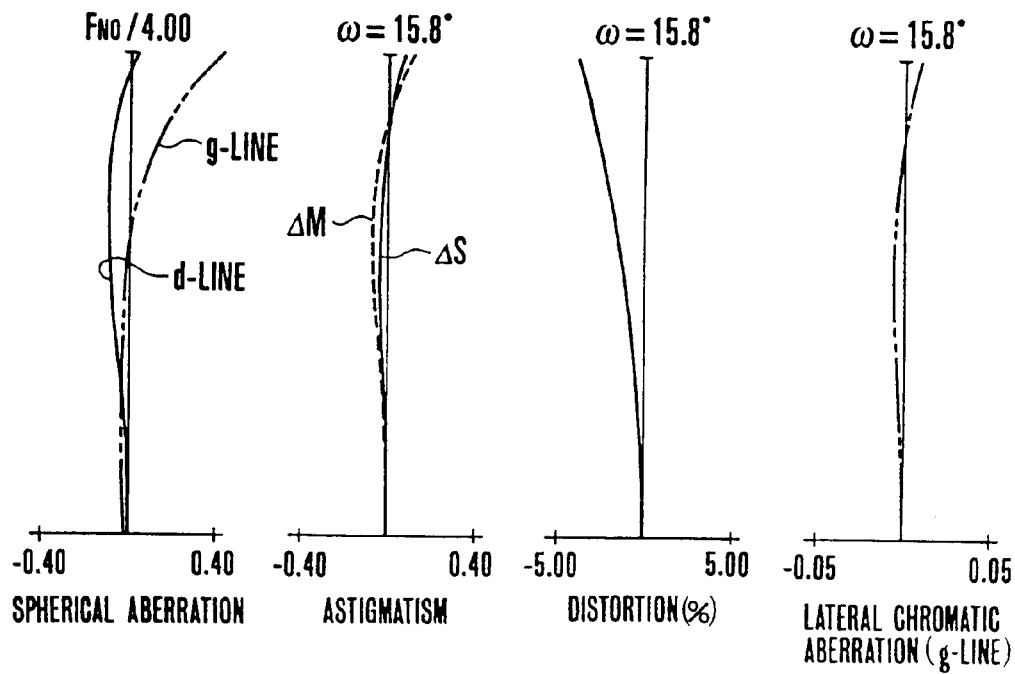
FIG.4(B)(1) FIG.4(B)(2) FIG.4(B)(3) FIG.4(B)(4)
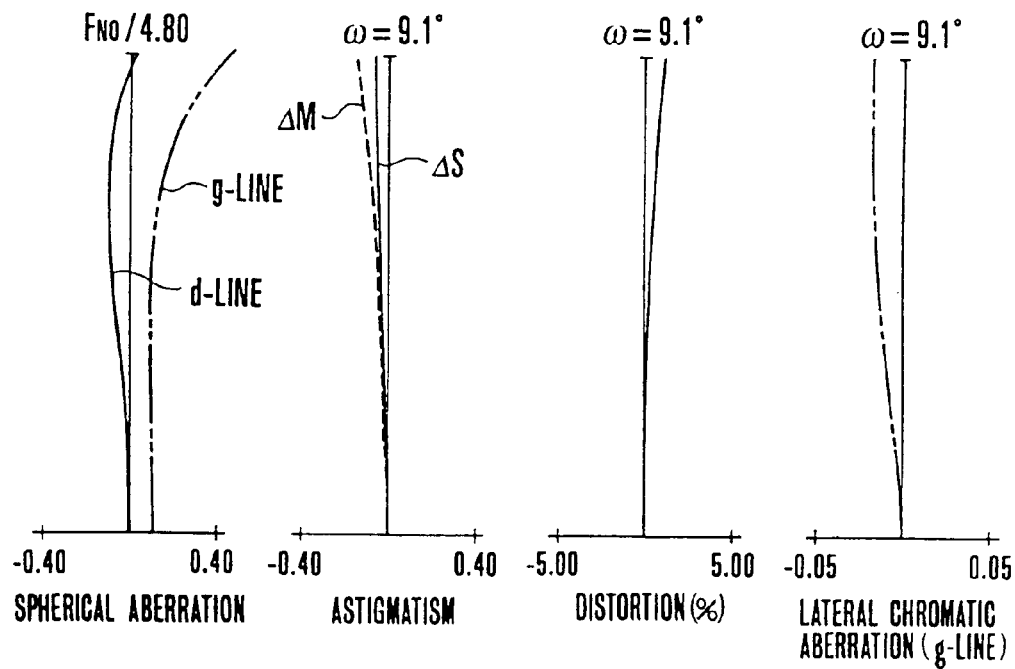

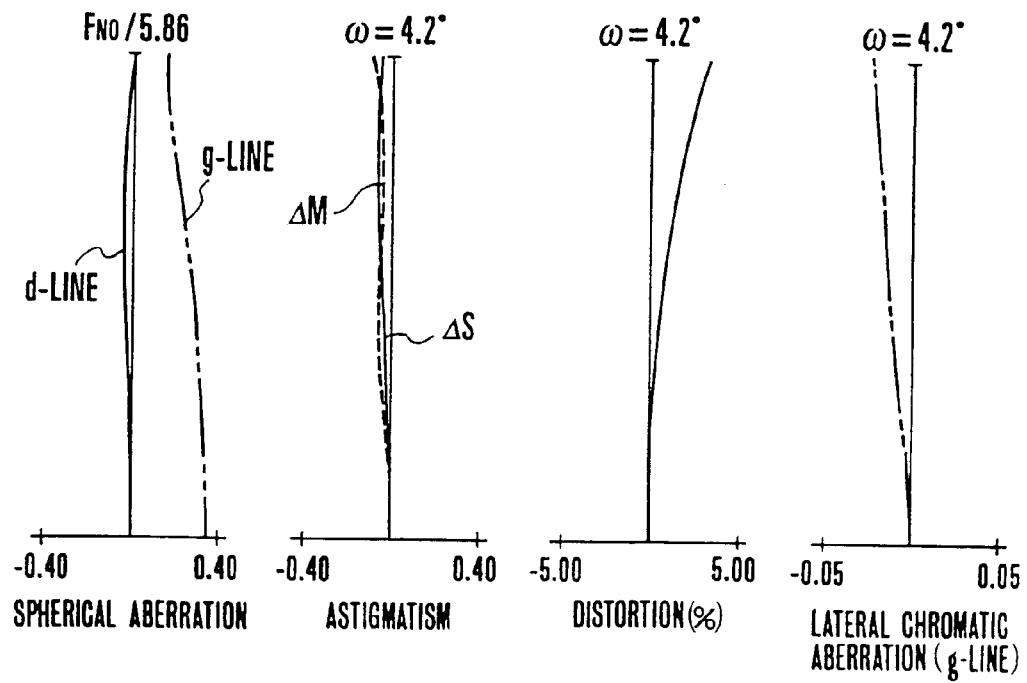
FIG.4(C)(1) FIG.4(C)(2) FIG.4(C)(3) FIG.4(C)(4)
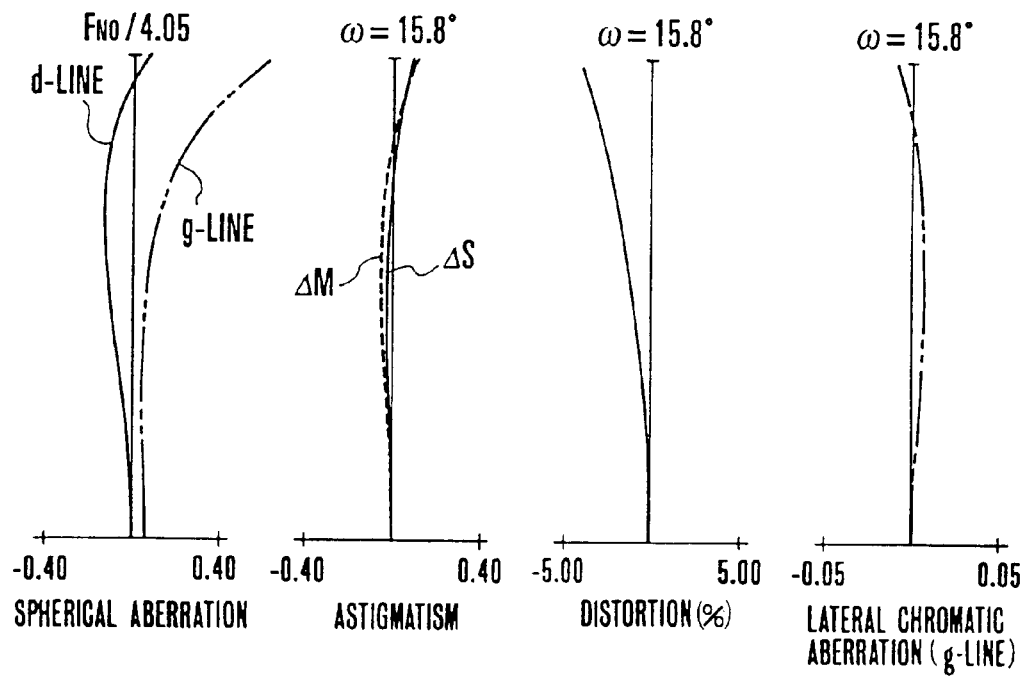
FIG.5(A)(1) FIG.5(A)(2) FIG.5(A)(3) FIG.5(A)(4)

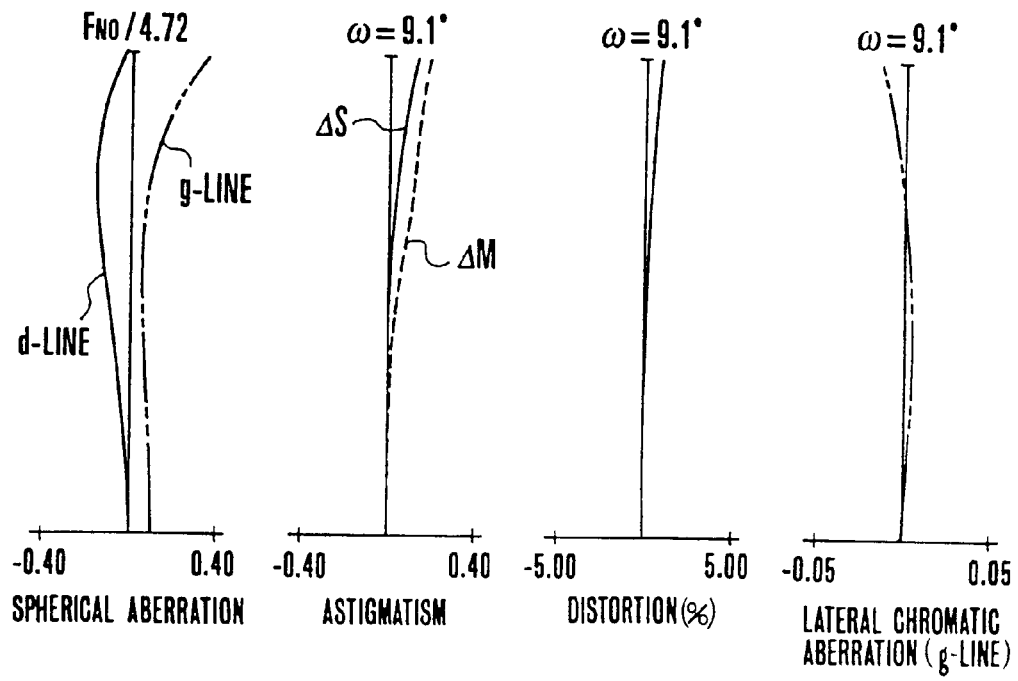
FIG.5(B)(1) FIG.5(B)(2) FIG.5(B)(3) FIG.5(B)(4)
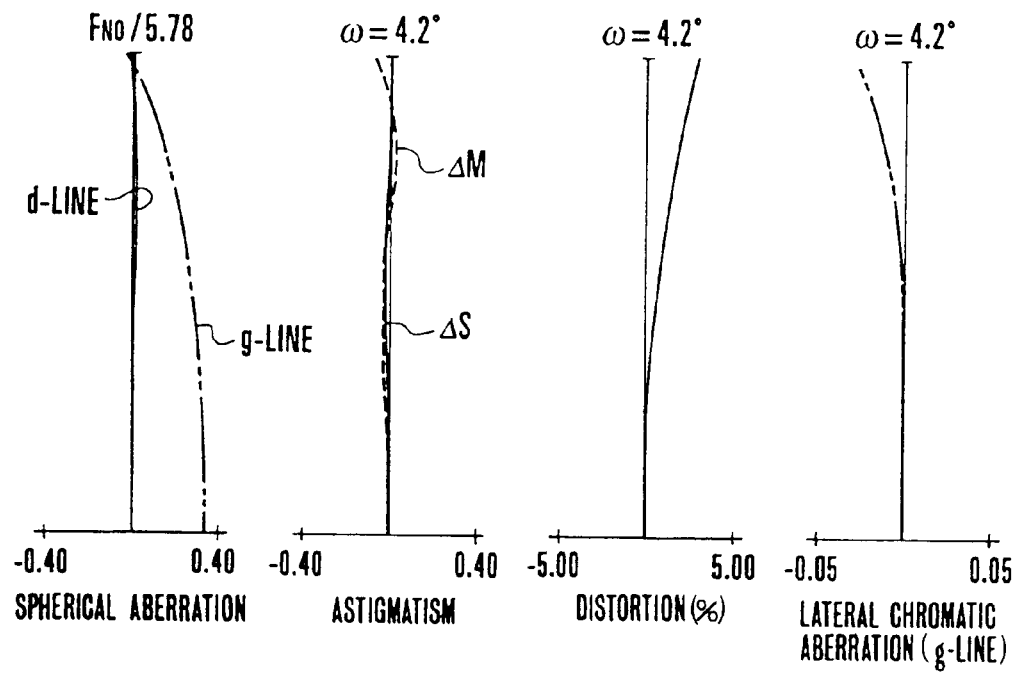
FIG.5(C)(1) FIG.5(C)(2) FIG.5(C)(3) FIG.5(C)(4)

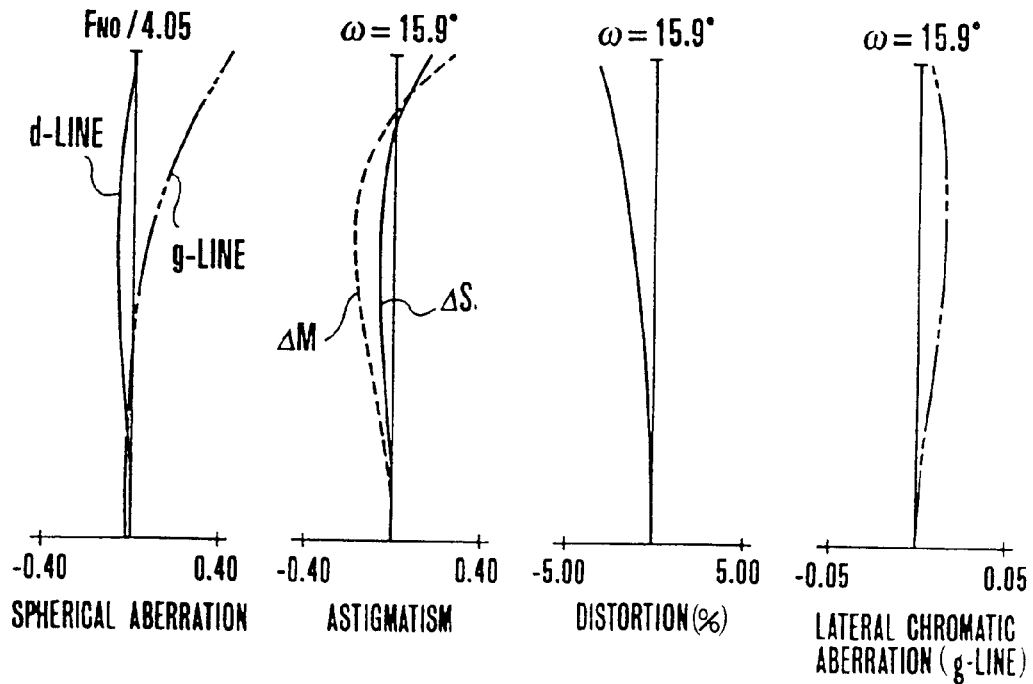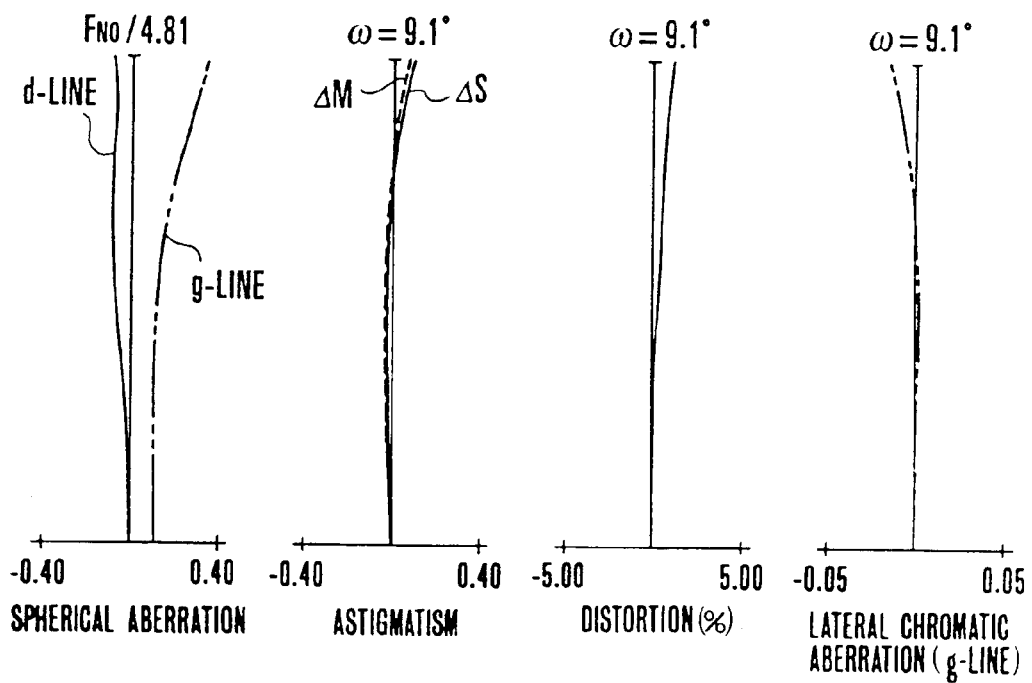

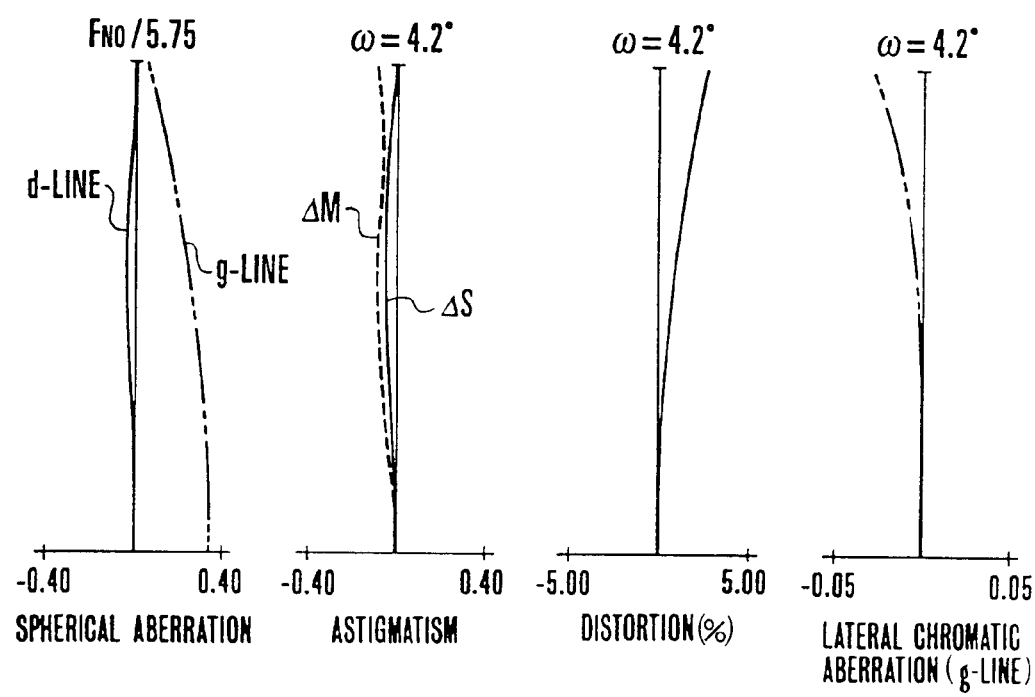

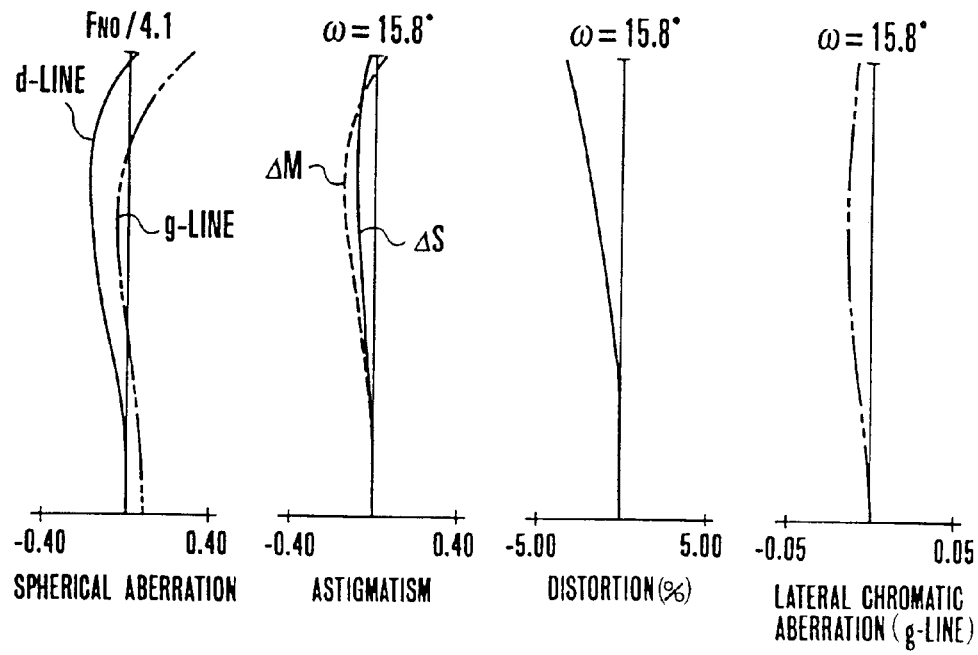
FIG.11(A)(1) FIG.11(A)(2) FIG.11(A)(3) FIG.11(A)(4)
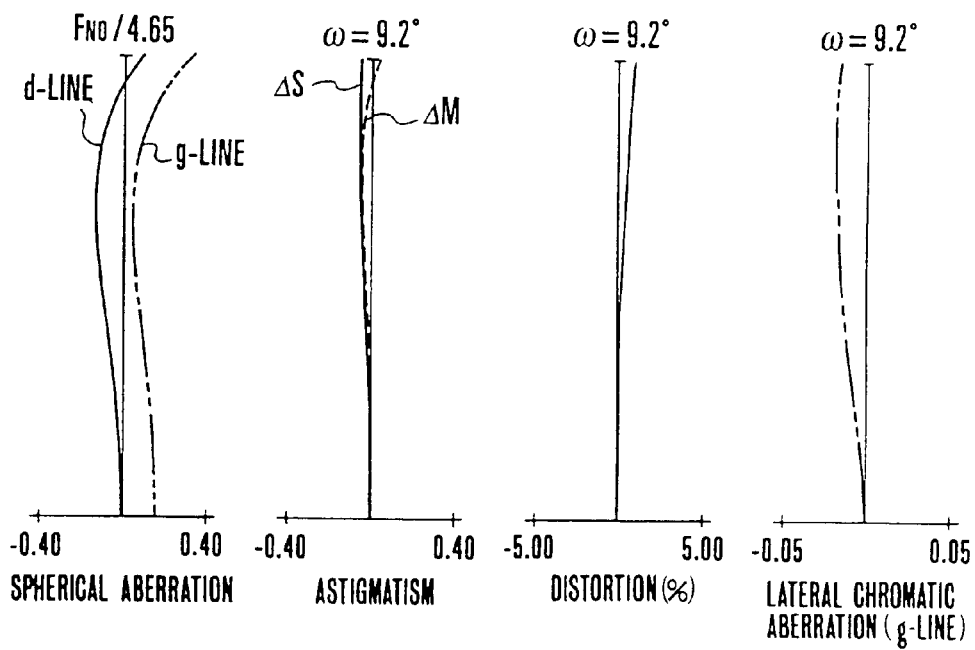
FIG.11(B)(1) FIG.11(B)(2) FIG.11(B)(3) FIG.11(B)(4)

FIG.11(C)(1) FIG.11(C)(2) FIG.11(C)(3) FIG.11(D)(4)
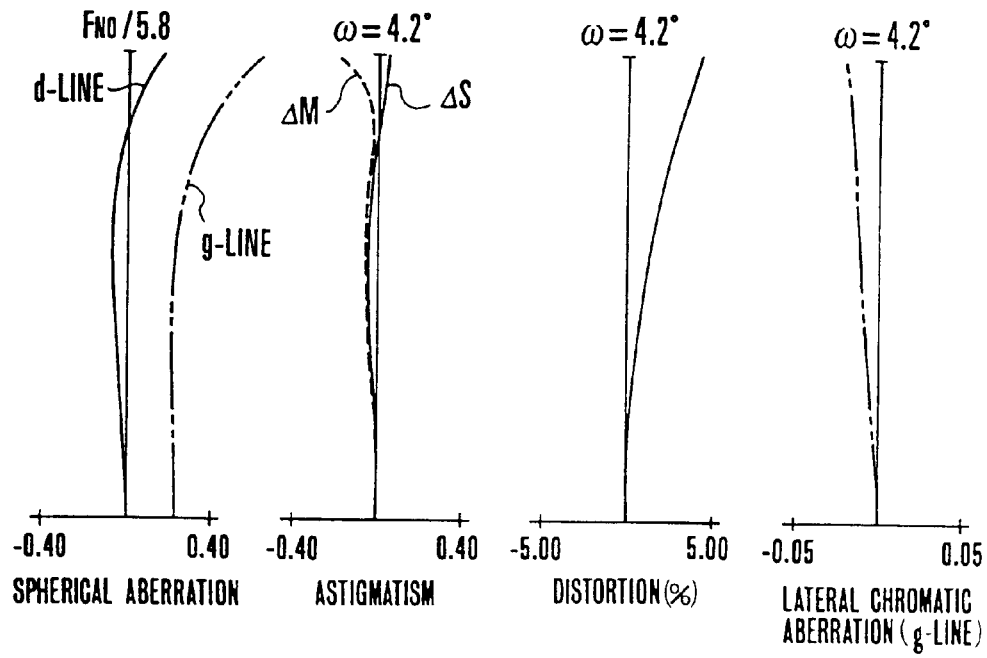
FIG.12(A)(1) FIG.12(A)(2) FIG.12(A)(3) FIG.12(A)(4)
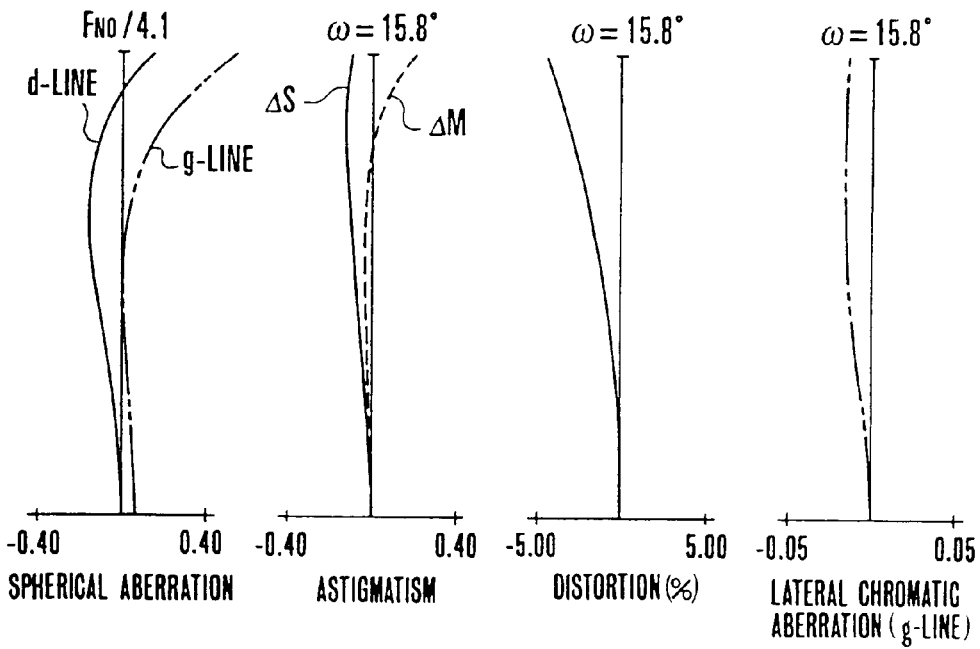

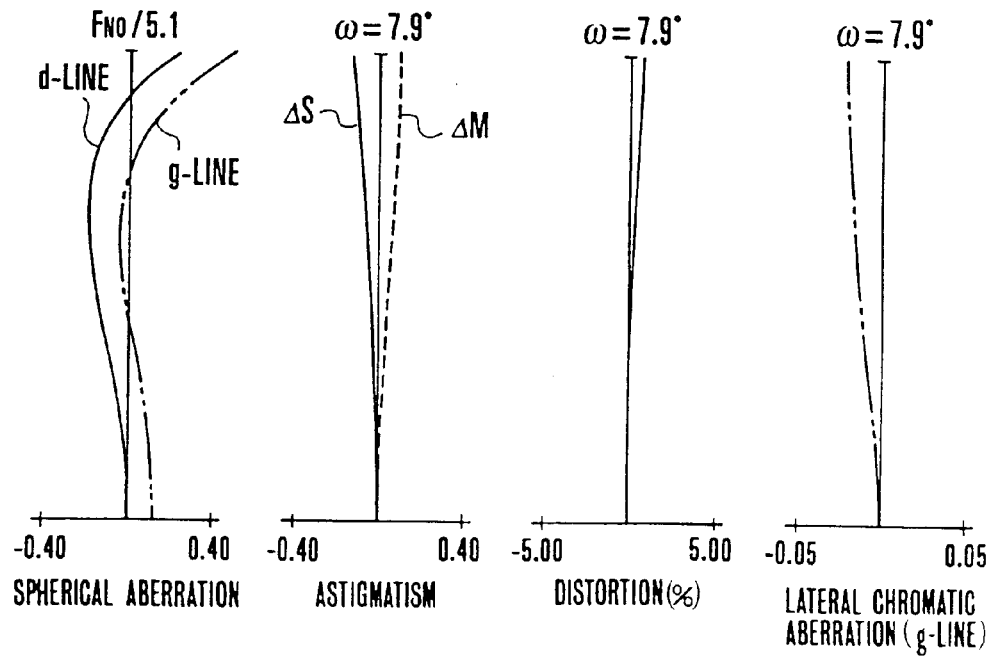
FIG.12(B)(1) FIG.12(B)(2) FIG.12(B)(3) FIG.12(B)(4)
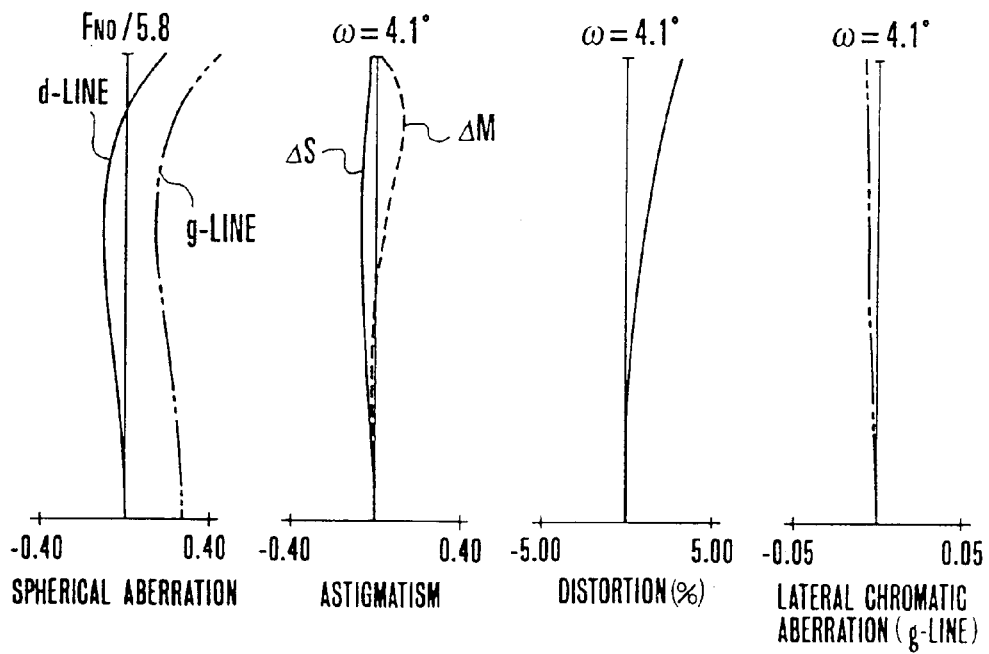
FIG.12(C)(1) FIG.12(C)(2) FIG.12(C)(3) FIG.12(C)(4)

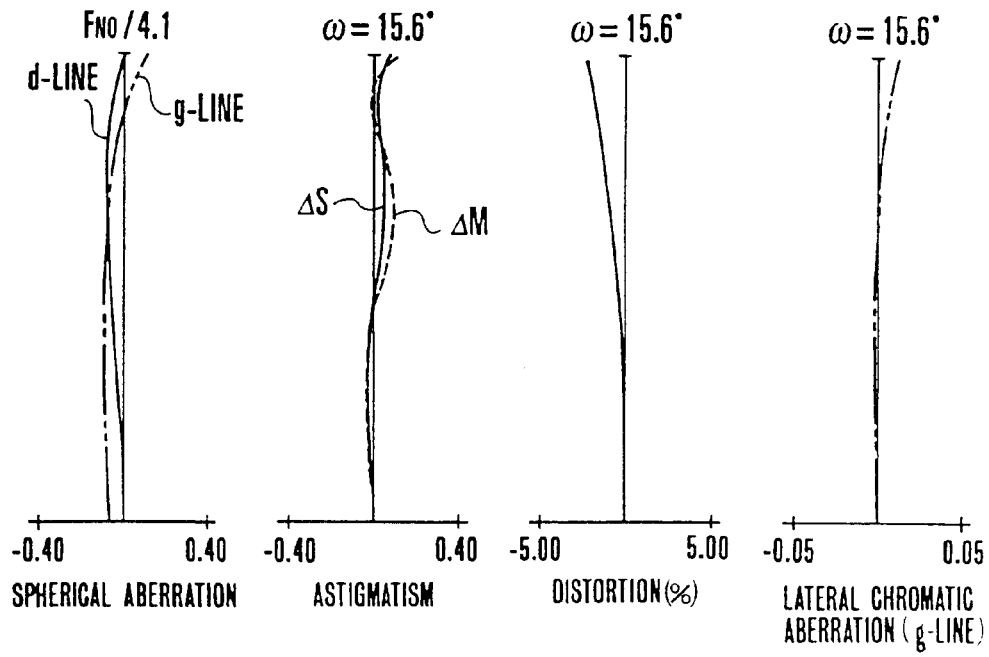
FIG.13(A)(1) FIG.13(A)(2) FIG.13(A)(3) FIG.13(A)(4)
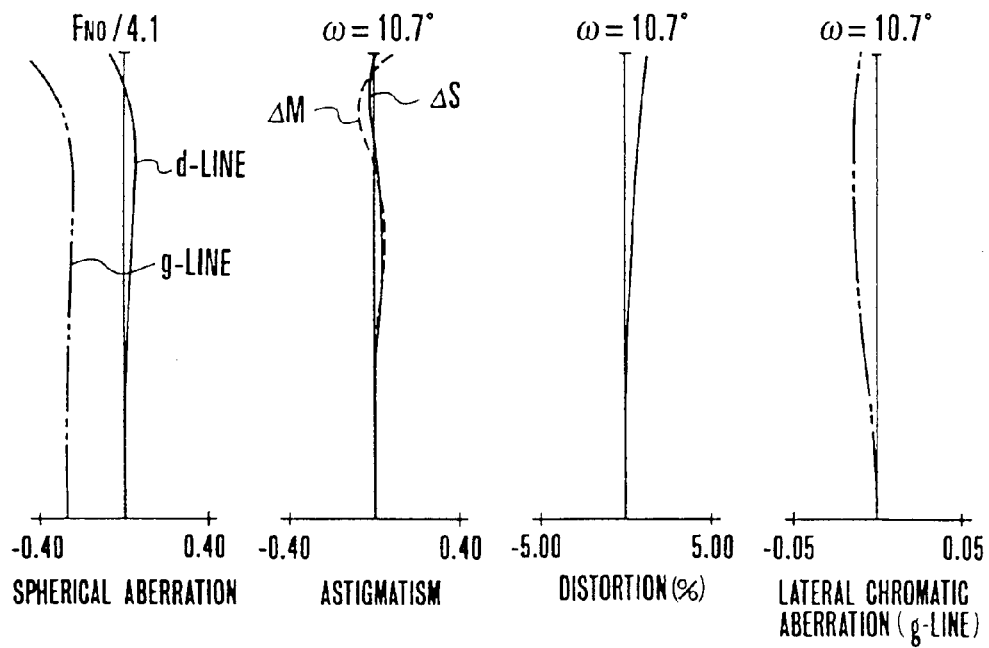
FIG.13(B)(1) FIG.13(B)(2) FIG.13(B)(3) FIG.13(B)(4)

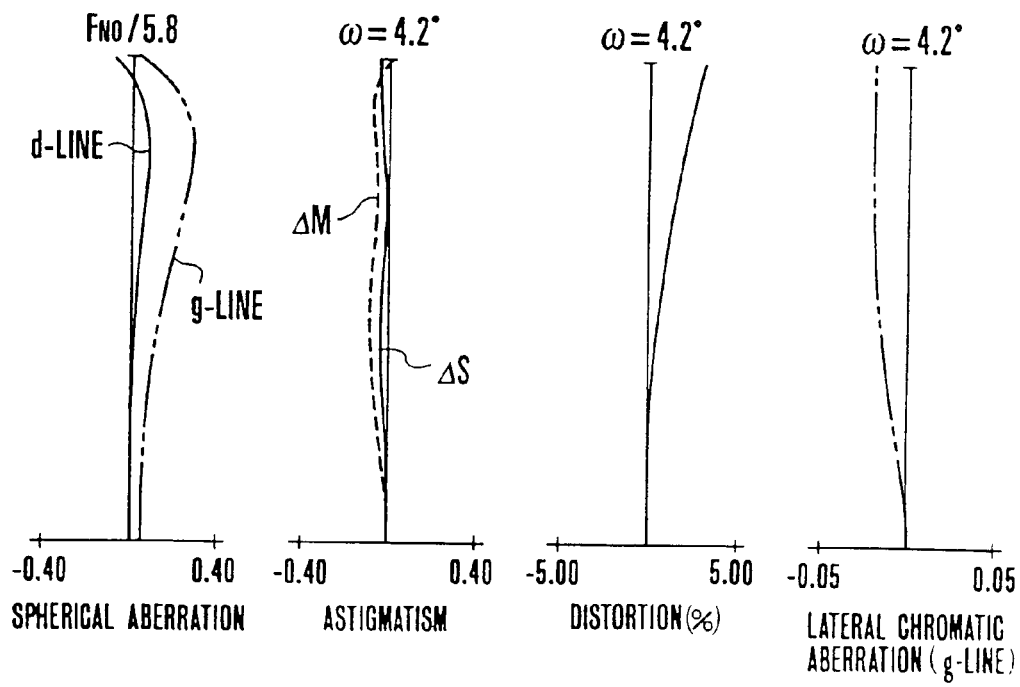
FIG.13(C)(1) FIG.13(C)(2) FIG.13(C)(3) FIG.13(C)(4)
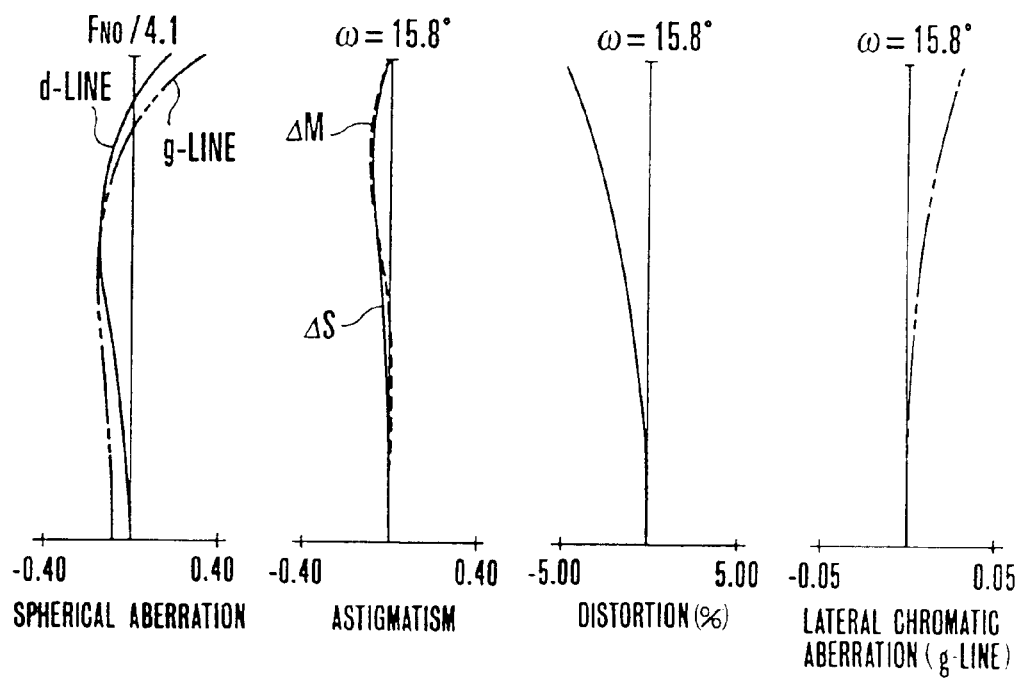
FIG.14(A)(1) FIG.14(A)(2) FIG.14(A)(3) FIG.14(A)(4)

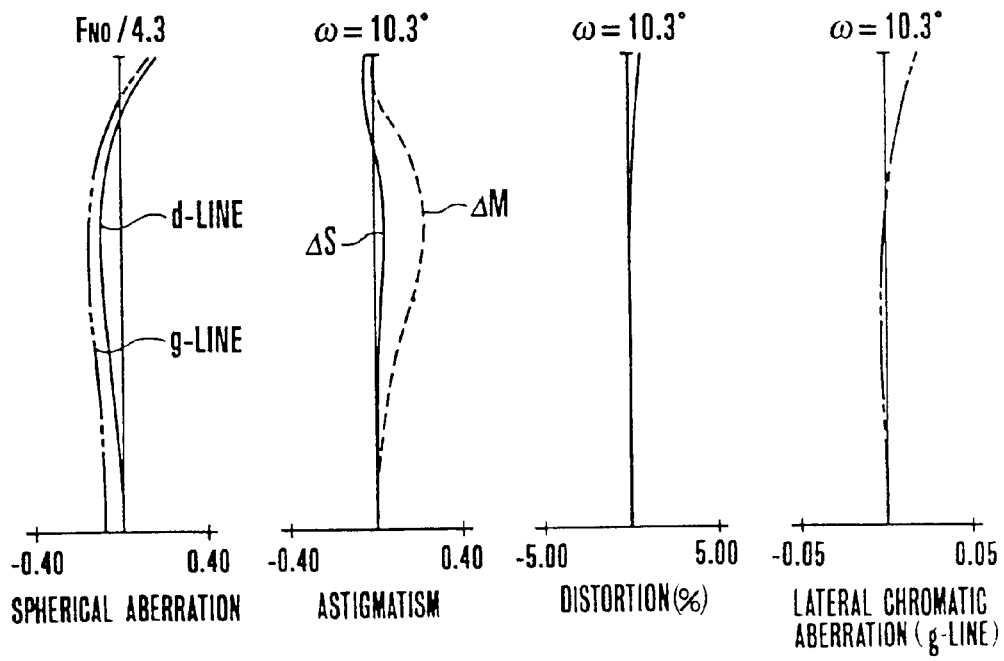
FIG.14(B)(1) FIG.14(B)(2) FIG.14(B)(3) FIG.14(B)(4)
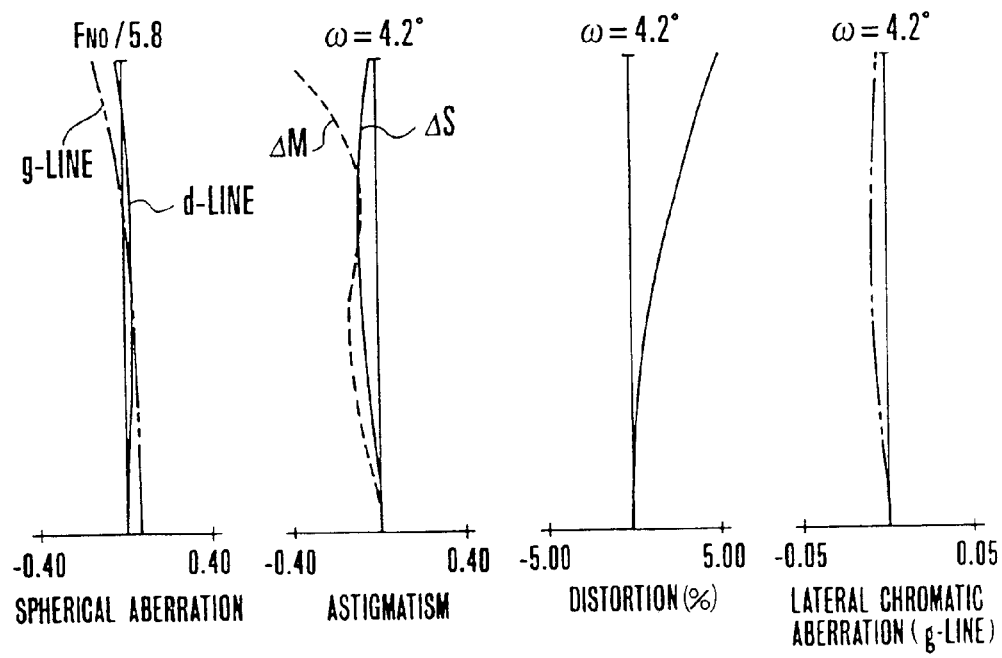
FIG.14(C)(1) FIG.14(C)(2) FIG.14(C)(3) FIG.14(C)(4)

FIG.19(A)(1)
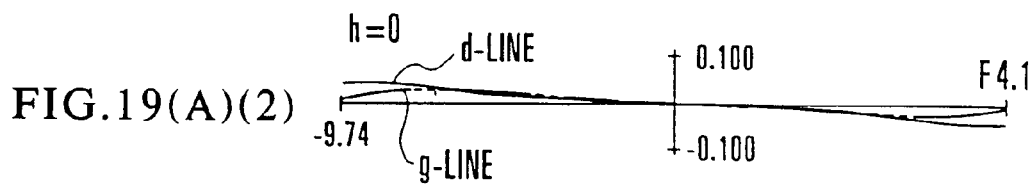
FIG.19(A)(2)
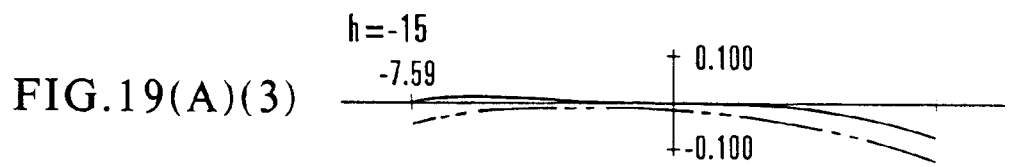
FIG.19(A)(3)
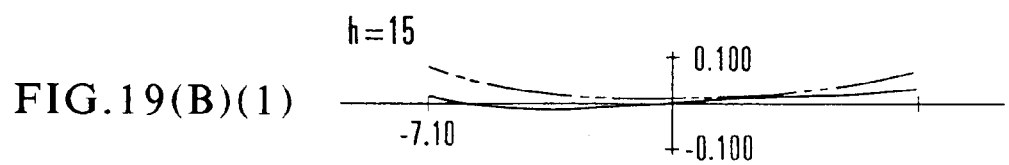
FIG.19(B)(1)
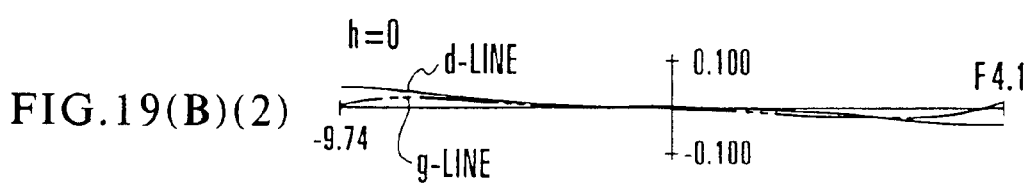
FIG.19(B)(2)
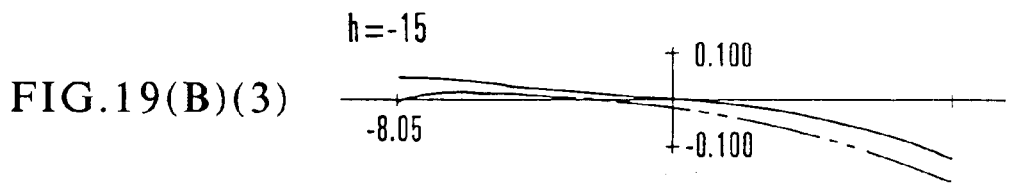
FIG.19(B)(3)

FIG.20(A)(1)
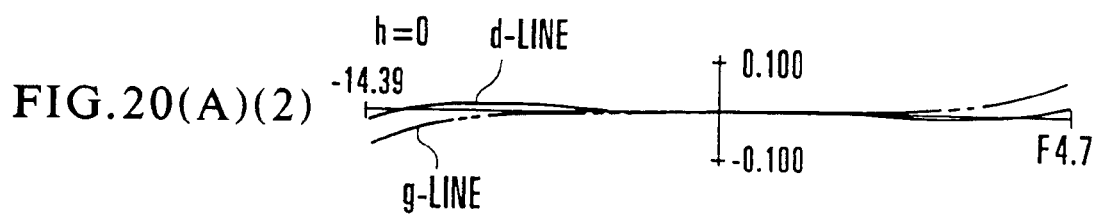
FIG.20(A)(2)
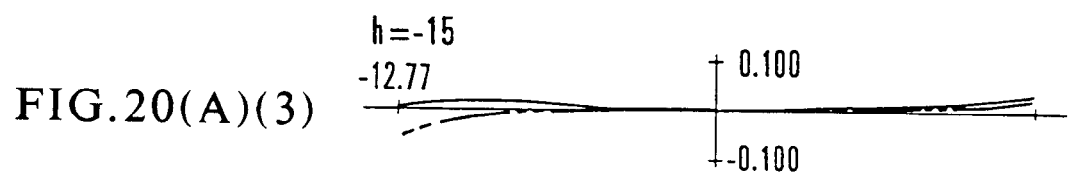
FIG.20(A)(3)
FIG.20(B)(1)
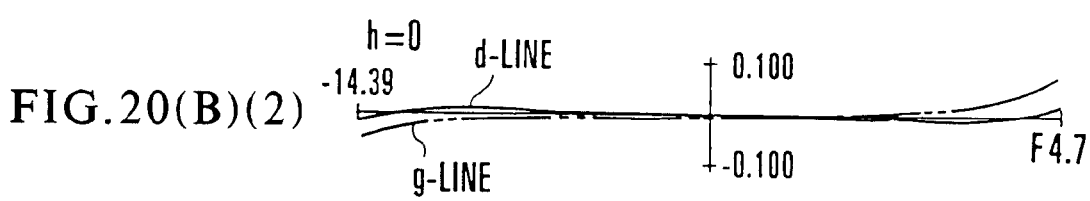
FIG.20(B)(2)
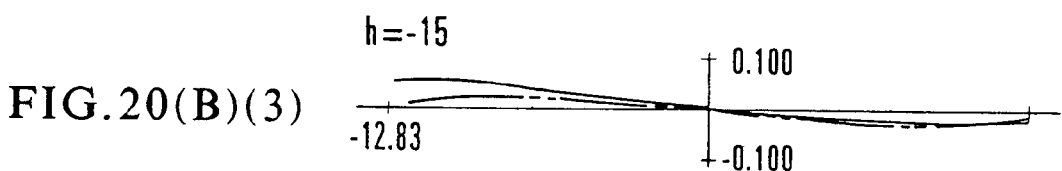
FIG.20(B)(3)

FIG. 21(A)(1)
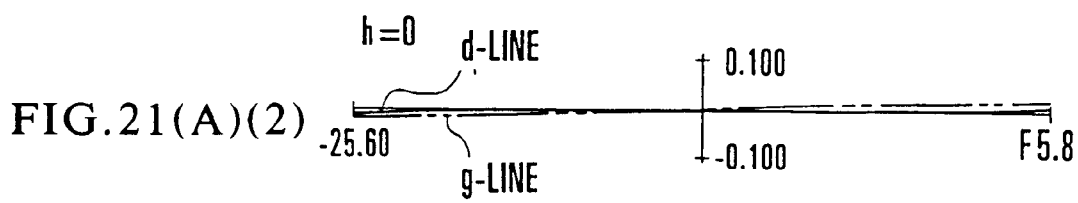
FIG. 21(A)(2)
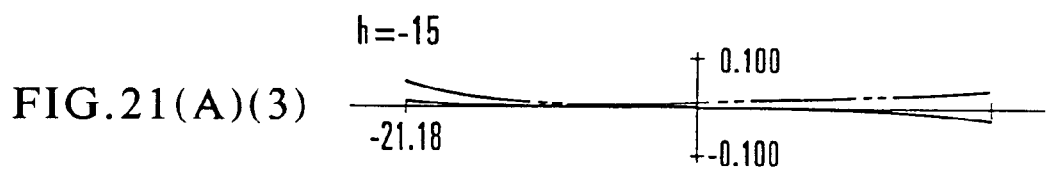
FIG. 21(A)(3)
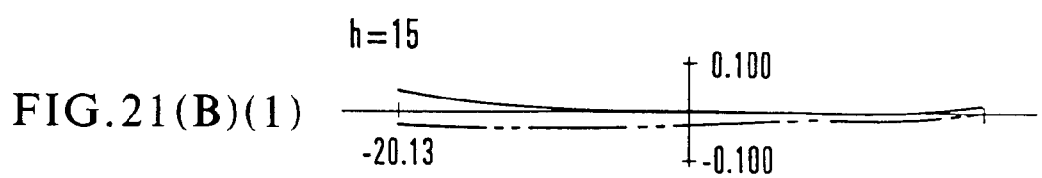
FIG. 21(B)(1)
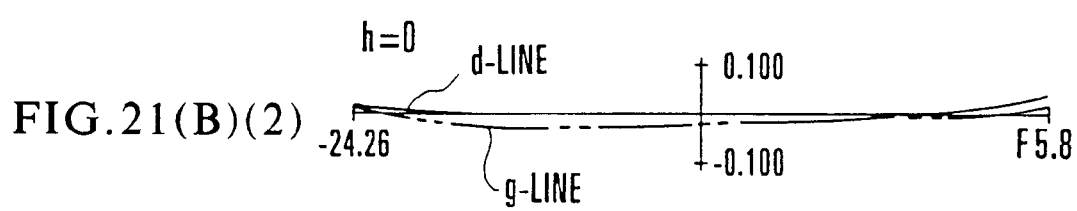
FIG. 21(B)(2)
FIG. 21(B)(3)

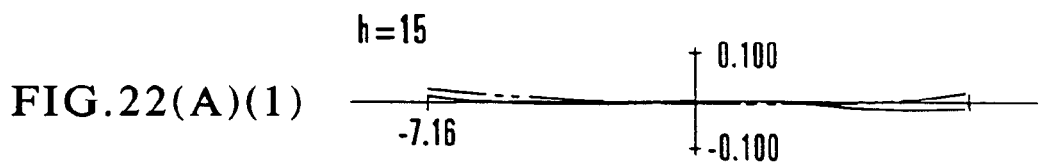
FIG.22(A)(1)
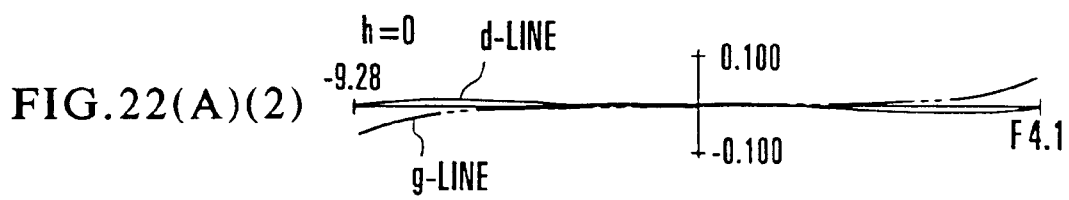
FIG.22(A)(2)
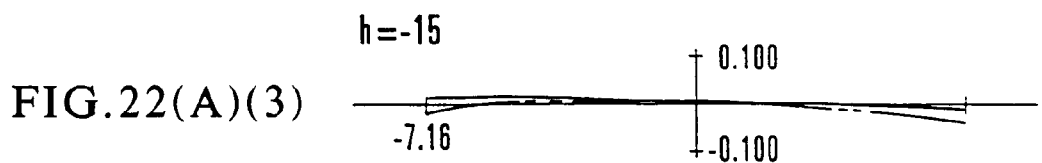
FIG.22(A)(3)
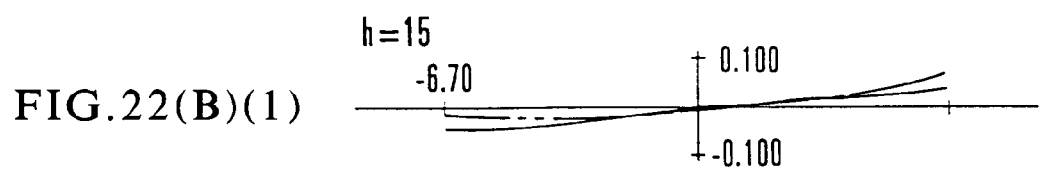
FIG.22(B)(1)
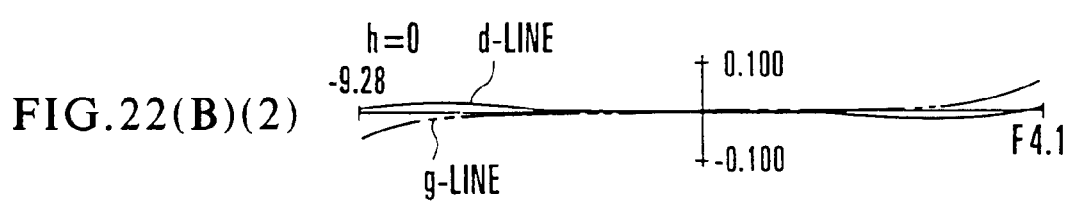
FIG.22(B)(2)
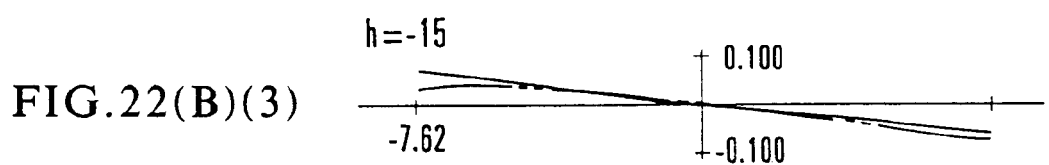
FIG.22(B)(3)

FIG.23(A)(1)
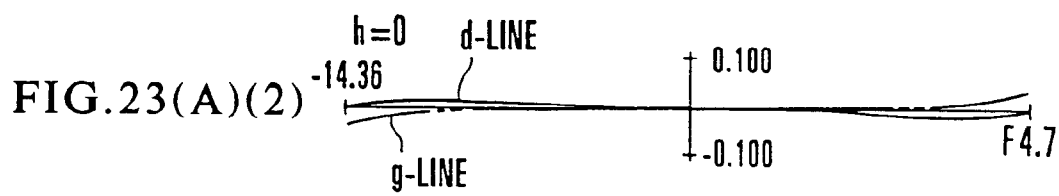
FIG.23(A)(2)
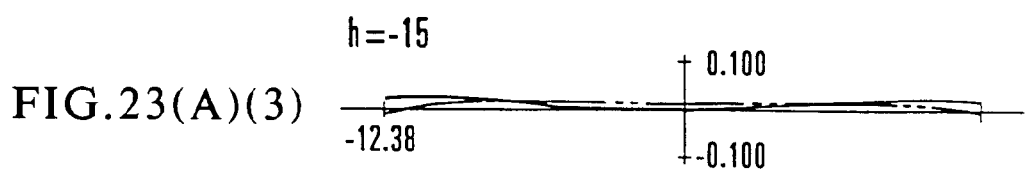
FIG.23(A)(3)
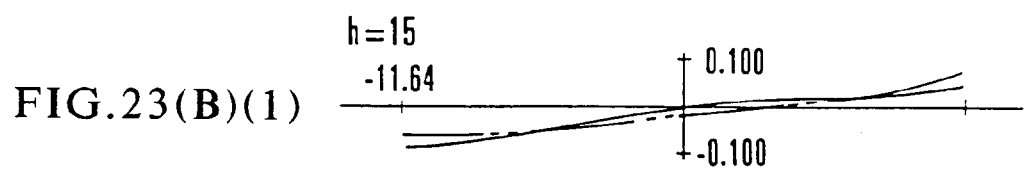
FIG.23(B)(1)
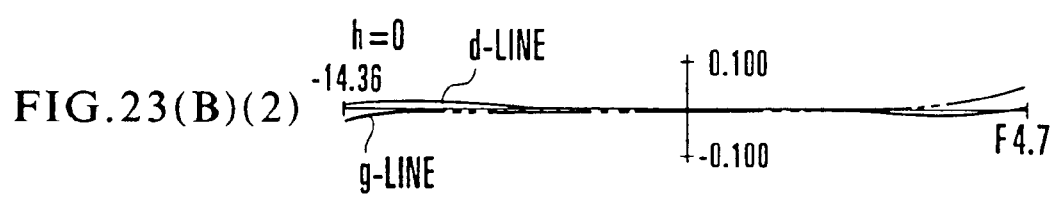
FIG.23(B)(2)
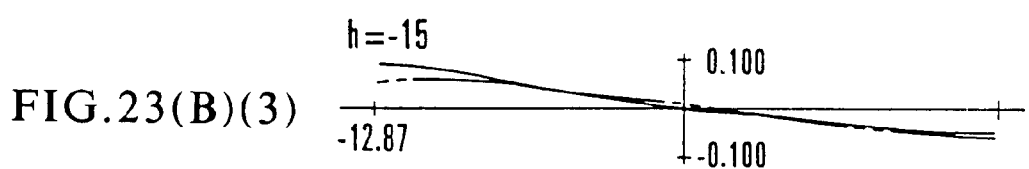
FIG.23(B)(3)

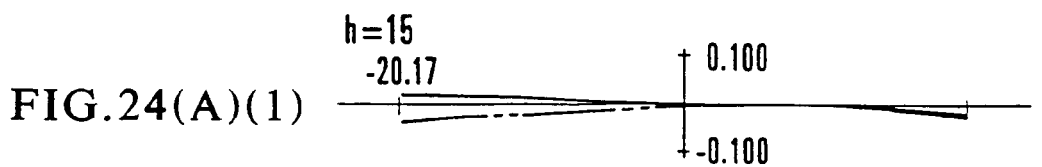
FIG.24(A)(1)
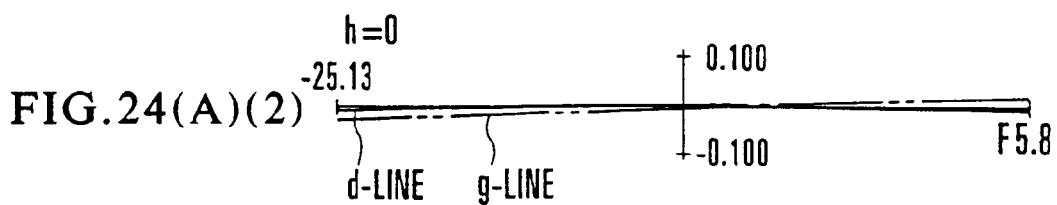
FIG.24(A)(2)
FIG.24(A)(3)
FIG.24(B)(1)
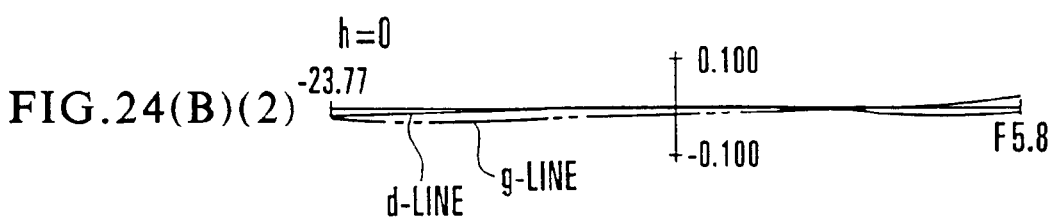
FIG.24(B)(2)
FIG.24(B)(3)

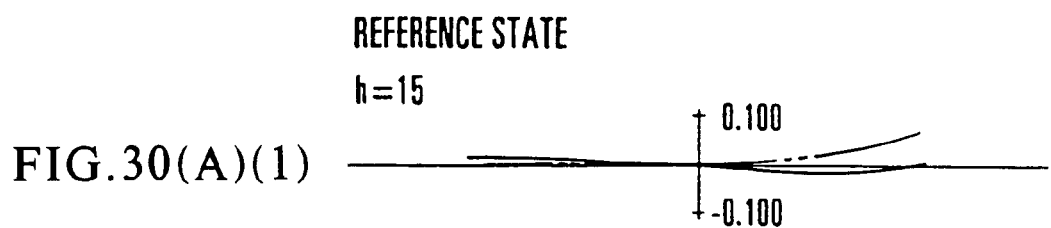
FIG.30(A)(1)
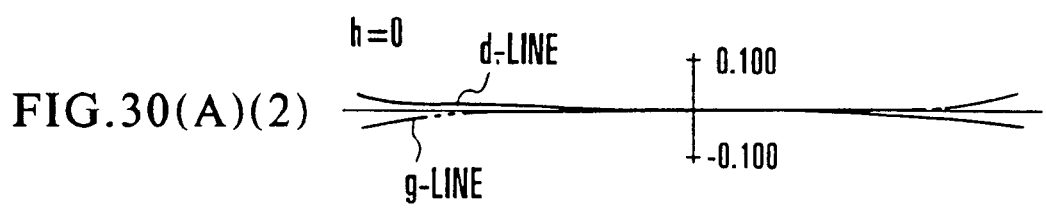
FIG.30(A)(2)
FIG.30(A)(3)
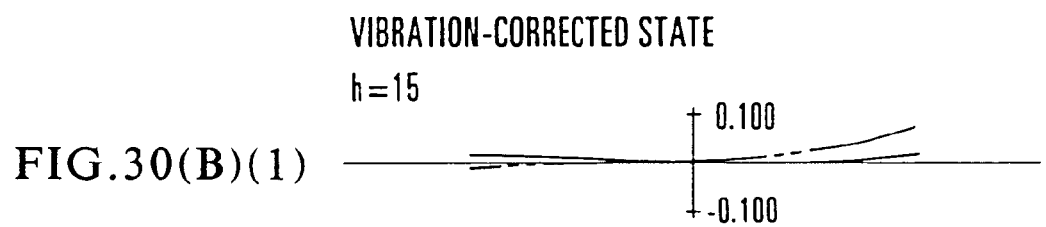
FIG.30(B)(1)
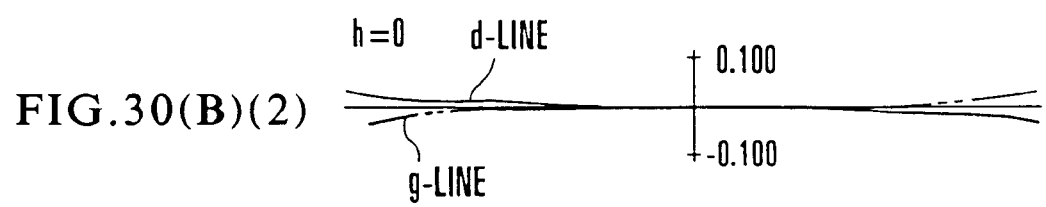
FIG.30(B)(2)
FIG.30(B)(3)

REFERENCE STATE
h=15
FIG.31(A)(1)
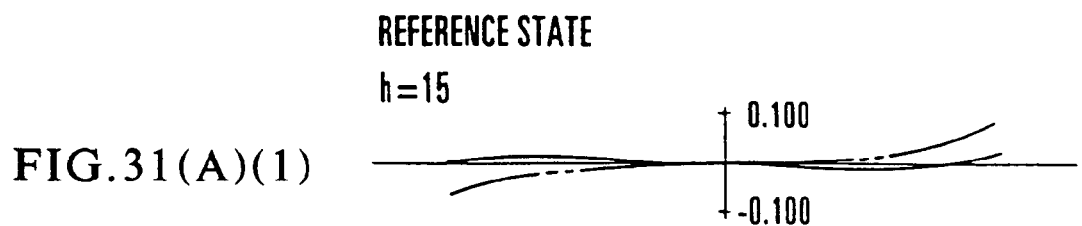
h=0
FIG.31(A)(2)
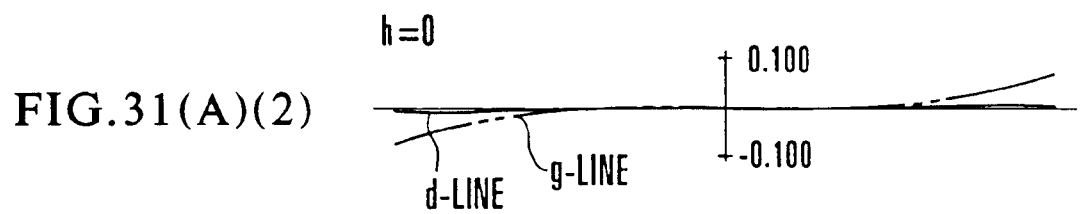
d-LINE  g-LINE
h=-15
FIG.31(A)(3)
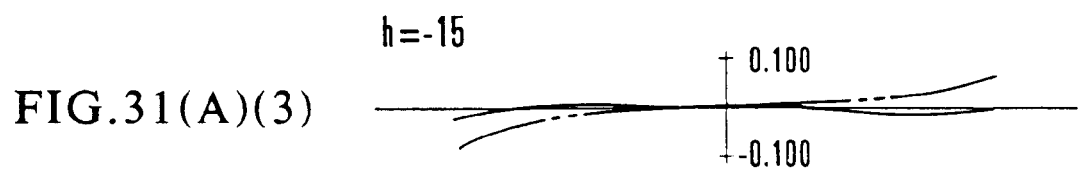
VIBRATION-CORRECTED STATE
h=15
FIG.31(B)(1)
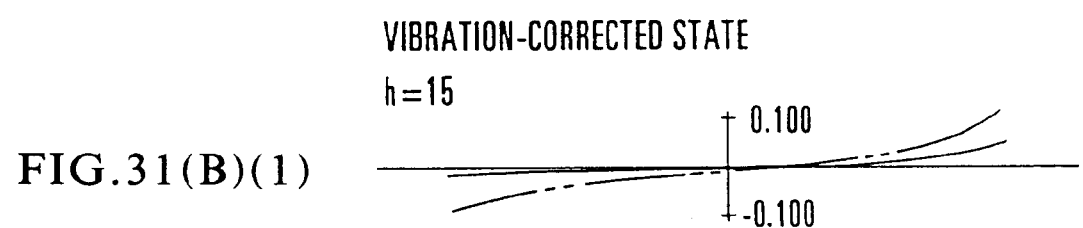
h=0
FIG.31(B)(2)
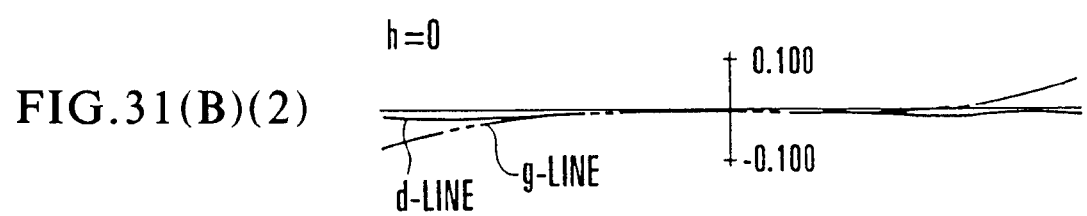
d-LINE  g-LINE
h=-15
FIG.31(B)(3)
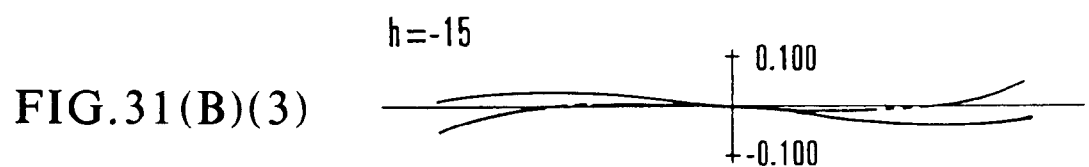

REFERENCE STATE
FIG.32(A)(1) 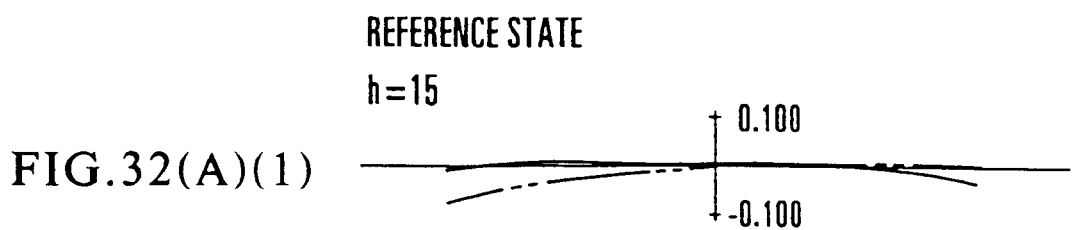
FIG.32(A)(2) 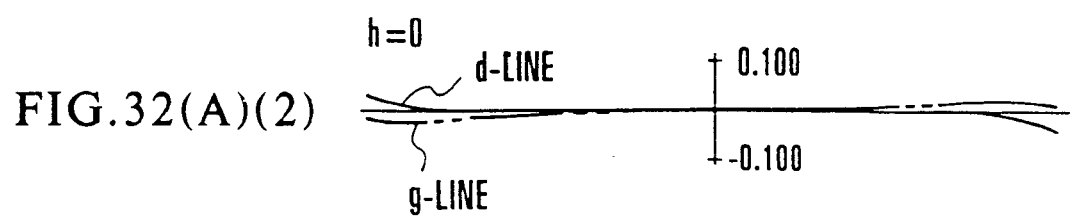
FIG.32(A)(3) 
VIBRATION-CORRECTED STATE
FIG.32(B)(1) 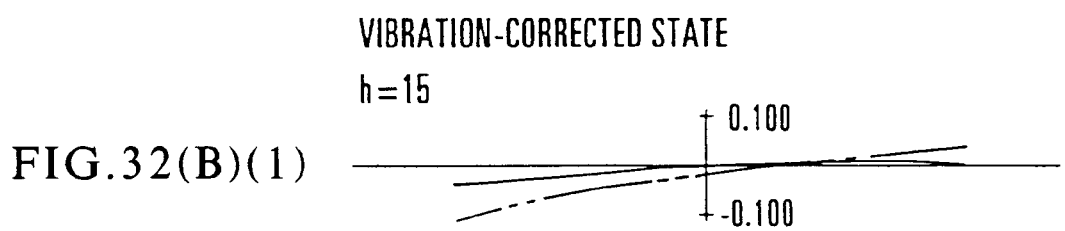
FIG.32(B)(2) 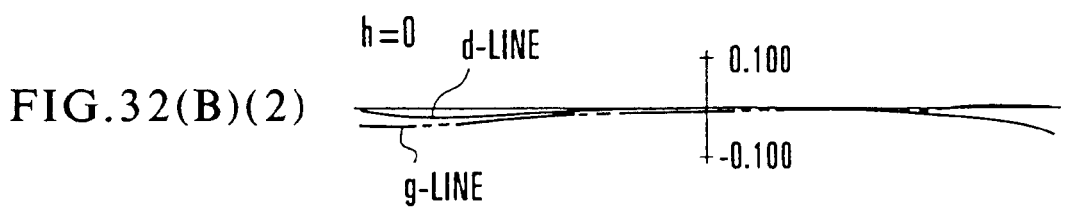
FIG.32(B)(3) 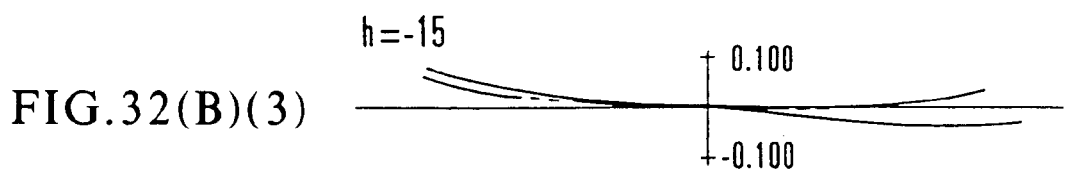

FIG.33(A)(1) REFERENCE STATE h=15
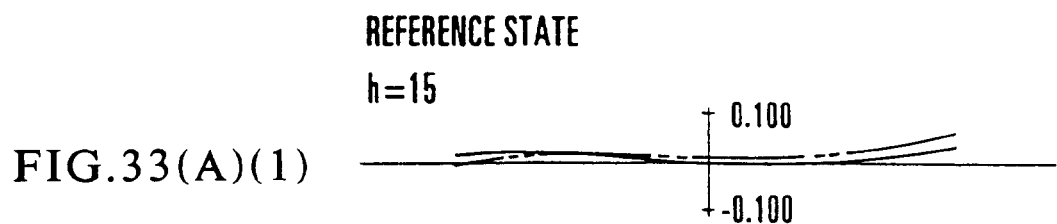
FIG.33(A)(2) h=0
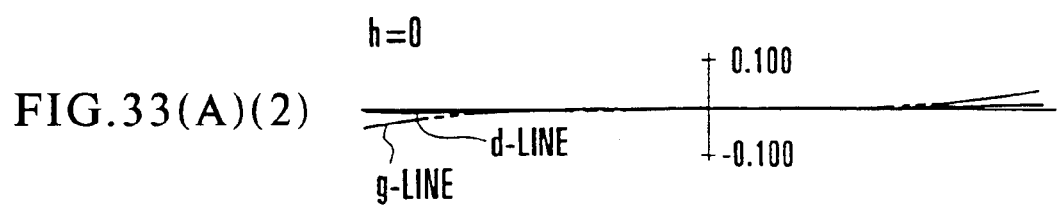
d-LINE
g-LINE
FIG.33(A)(3) h=-15
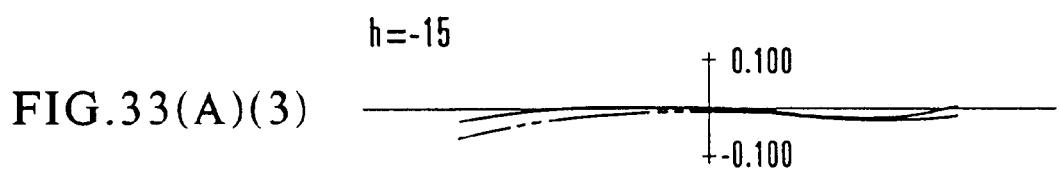
FIG.33(B)(1) VIBRATION-CORRECTED STATE h=15
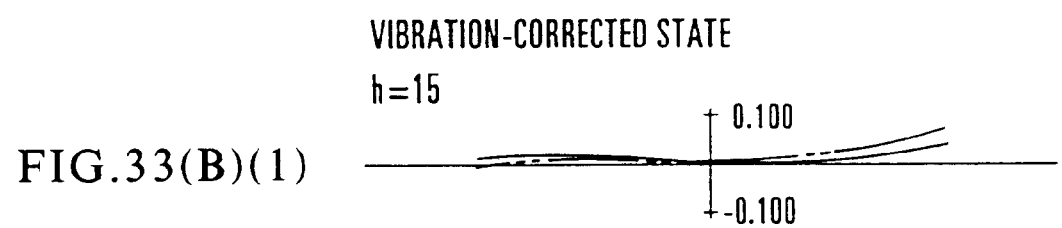
FIG.33(B)(2) h=0
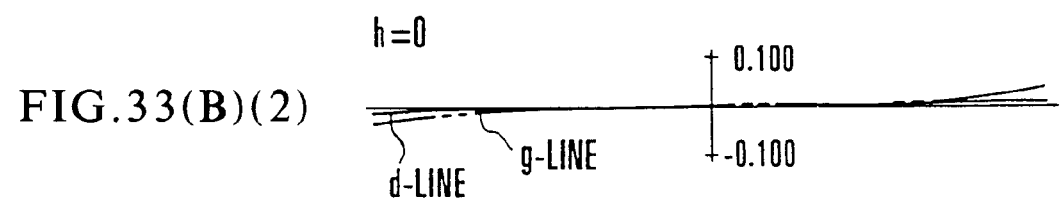
g-LINE
d-LINE
FIG.33(B)(3) h=-15
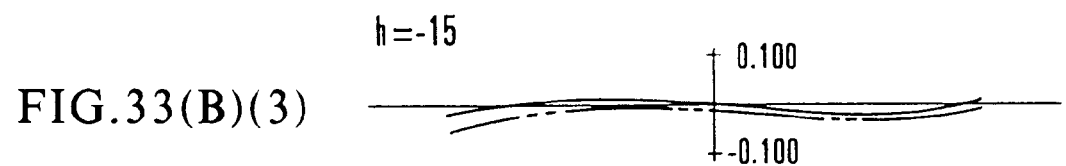

REFERENCE STATE
FIG.34(A)(1) 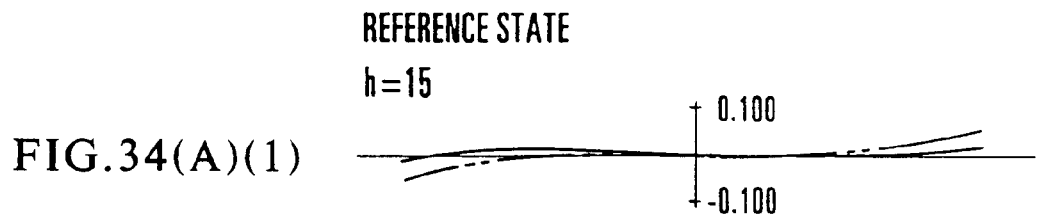
FIG.34(A)(2) 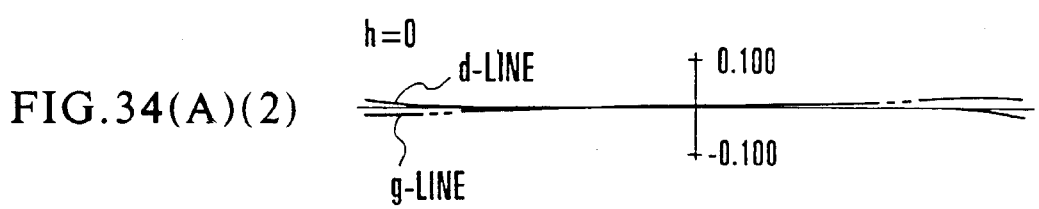
FIG.34(A)(3) 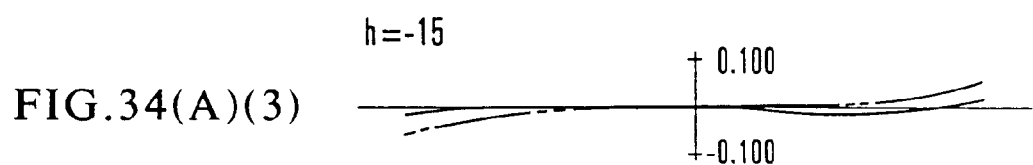
VIBRATION-CORRECTED STATE
FIG.34(B)(1) 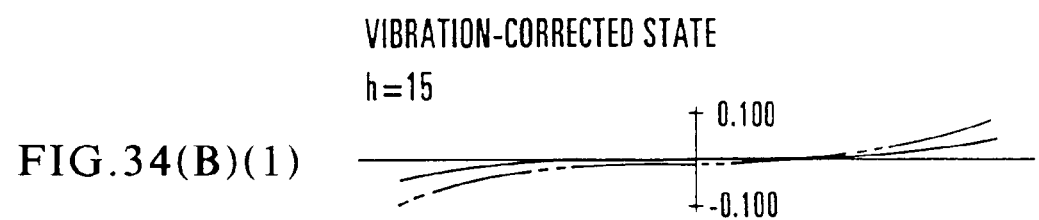
FIG.34(B)(2) 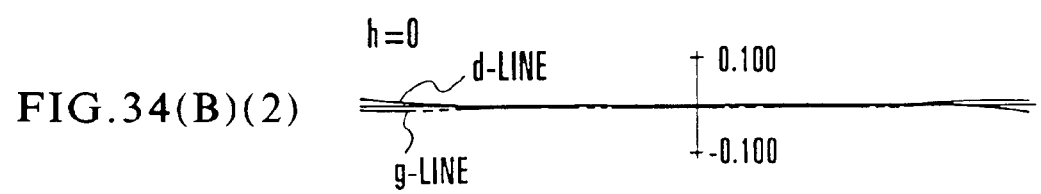
FIG.34(B)(3) 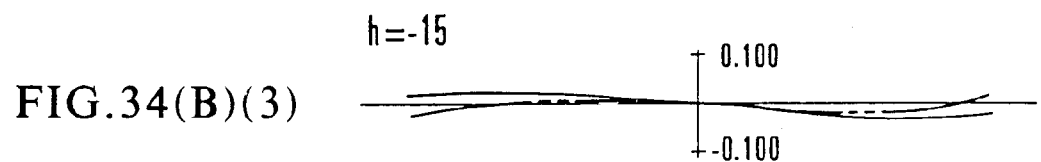

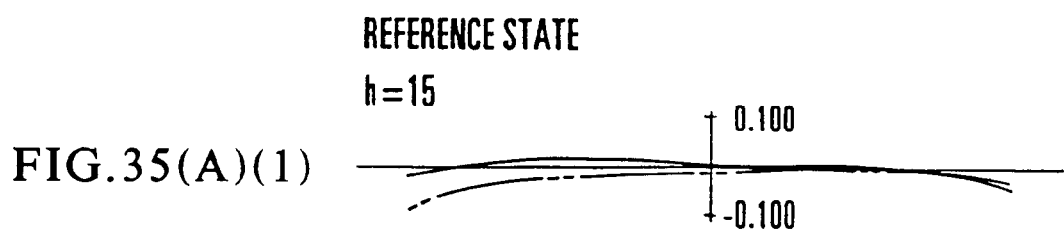
FIG.35(A)(1)
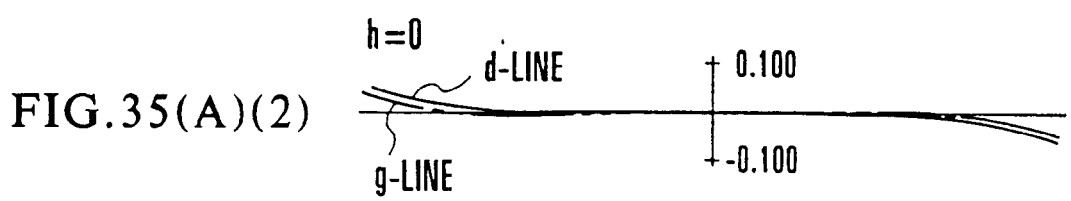
FIG.35(A)(2)
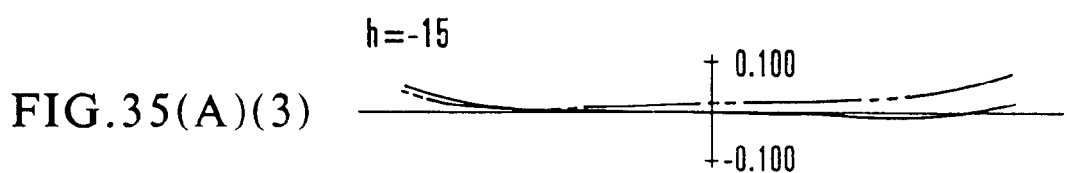
FIG.35(A)(3)
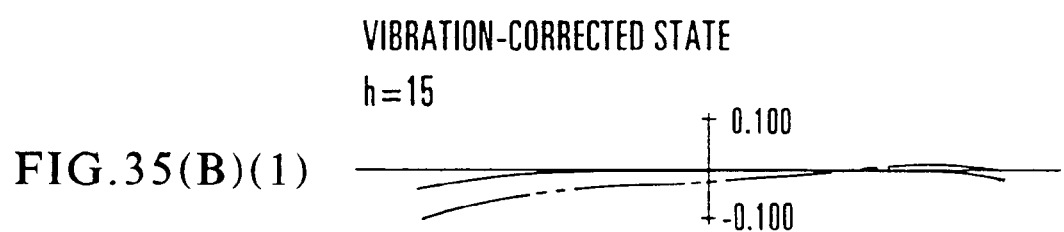
FIG.35(B)(1)
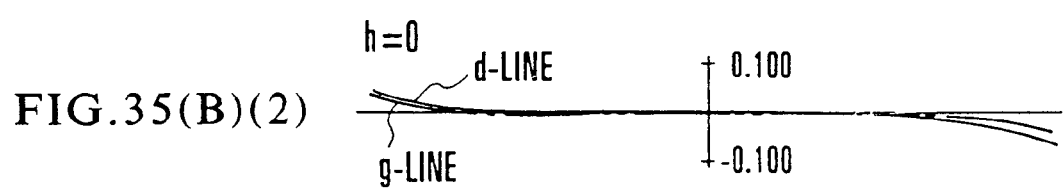
FIG.35(B)(2)
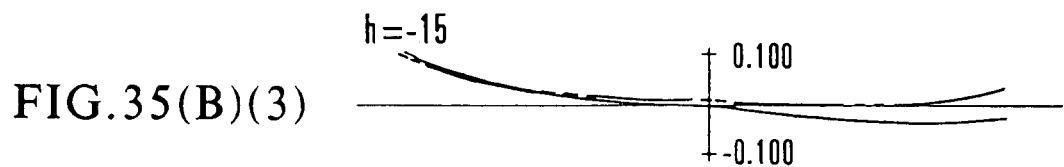
FIG.35(B)(3)

REFERENCE STATE
h=15
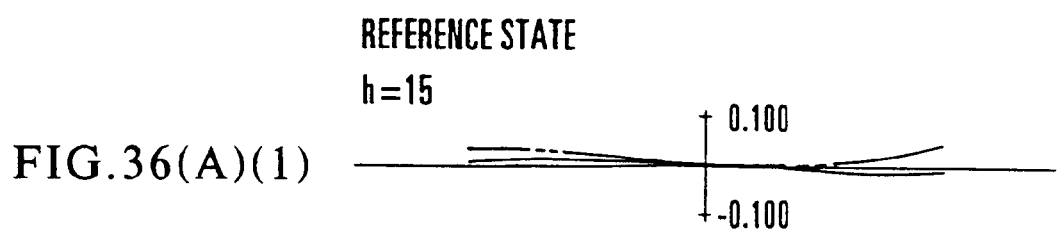
FIG.36(A)(1)
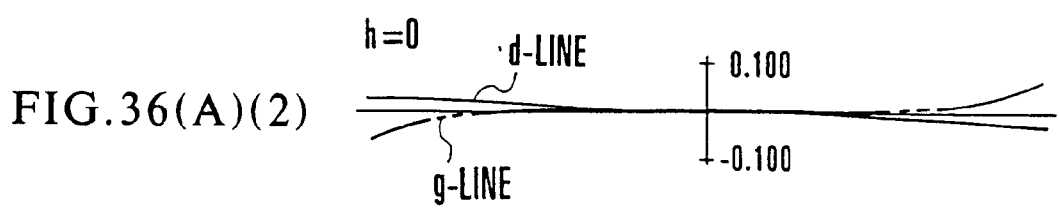
FIG.36(A)(2)
FIG.36(A)(3)
VIBRATION-CORRECTED STATE
h=15
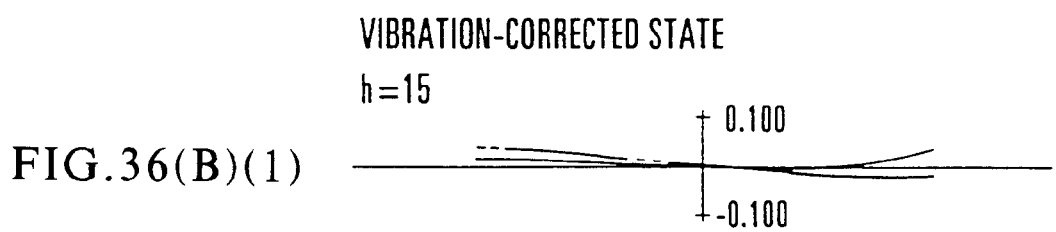
FIG.36(B)(1)
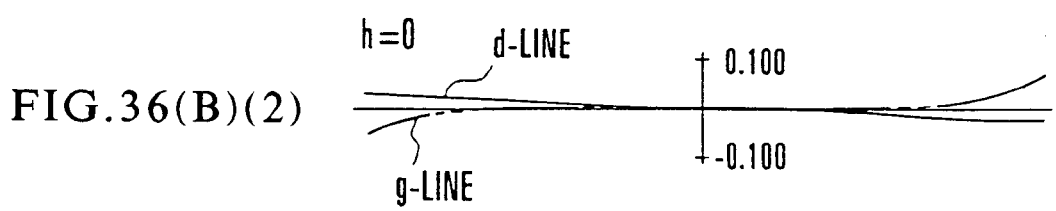
FIG.36(B)(2)
FIG.36(B)(3)

REFERENCE STATE
FIG.37(A)(1) h=15
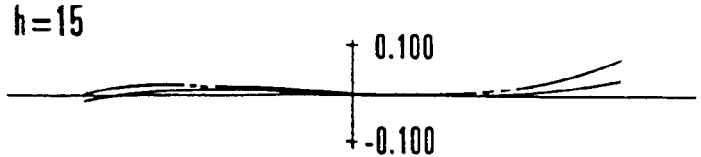
FIG.37(A)(2) h=0
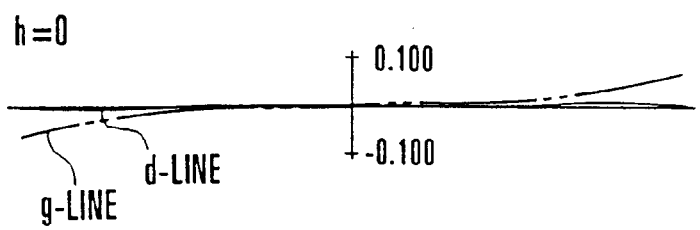
d-LINE
g-LINE
FIG.37(A)(3) h=-15
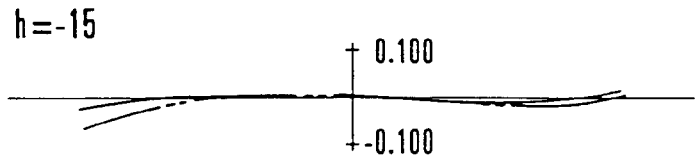
VIBRATION-CORRECTED STATE
FIG.37(B)(1) h=15
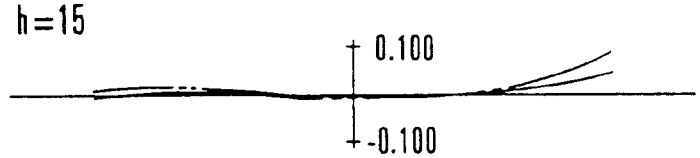
FIG.37(B)(2) h=0
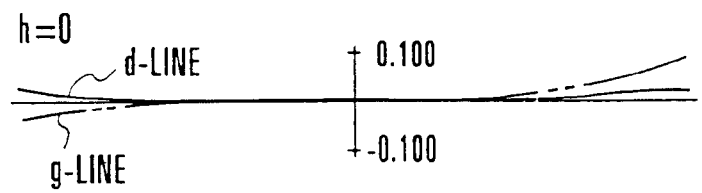
d-LINE
g-LINE
FIG.37(B)(3) h=-15
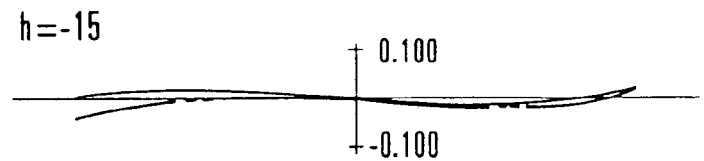

REFERENCE STATE
h=15
FIG.38(A)(1) 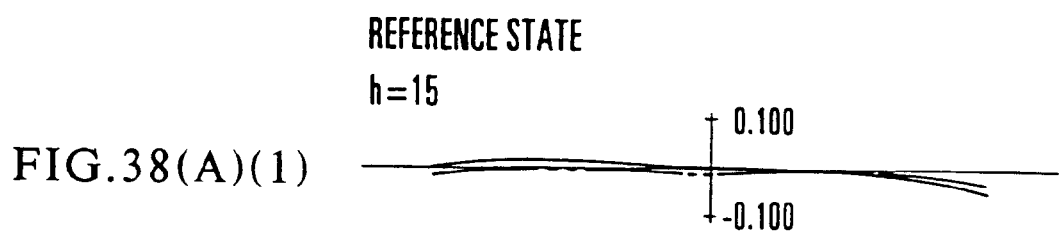
FIG.38(A)(2) 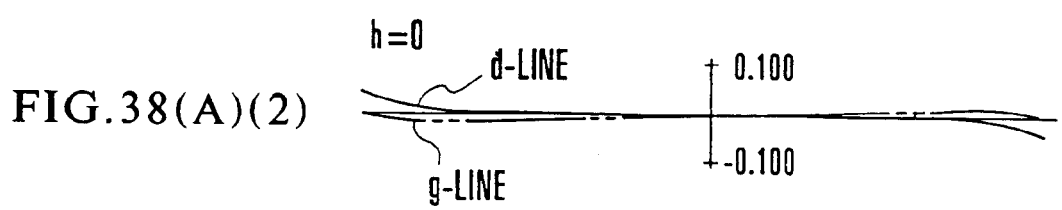
FIG.38(A)(3) 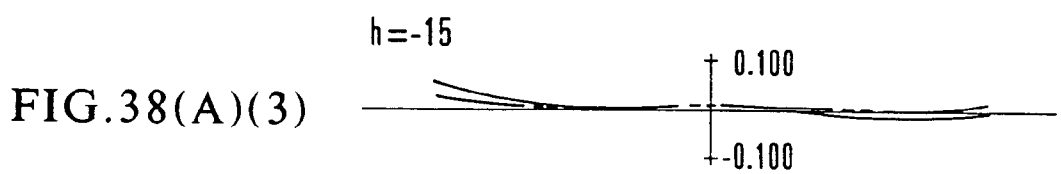
VIBRATION-CORRECTED STATE
h=15
FIG.38(B)(1) 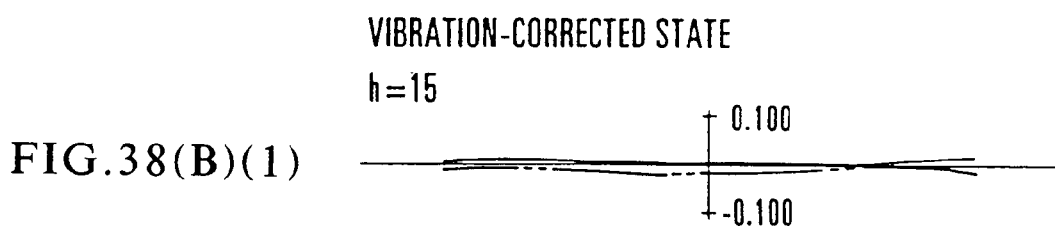
FIG.38(B)(2) 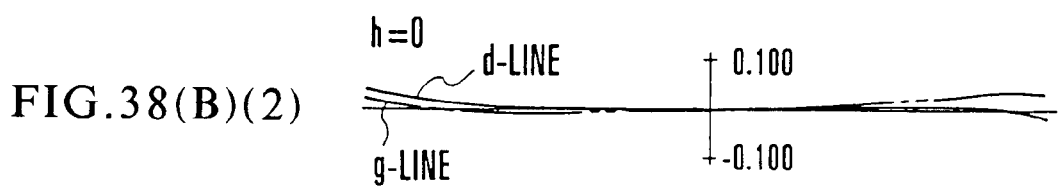
FIG.38(B)(3) 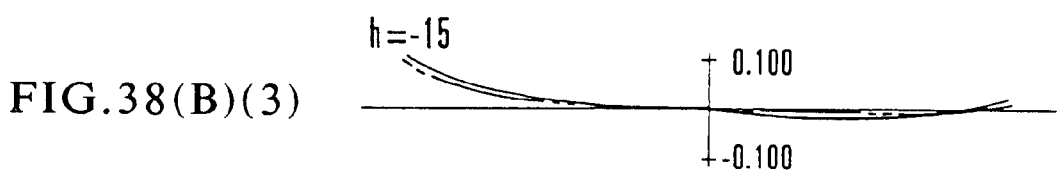

ZOOM LENS HAVING AN IMAGE STABILIZING FUNCTION

This application is a division of application Ser. No. 08/404,870 filed Mar. 15, 1995, now U.S. Pat. No. 6,124,972.

BACKGROUND OF THE INVENTION

1. Field of the Invention

This invention relates to zoom lenses of the telephoto type suited to 35 mm cameras, video cameras or electronic still cameras and, more particularly, to zoom lenses having four to six lens units in total, of which certain ones are movable for zooming, and having as high a range as 4 or thereabout with maintenance of a high optical performance throughout the zooming range, while still permitting improvements of the compact form of the entire system.

2. Description of the Related Art

For photographic cameras and video cameras, there have been demanded zoom lenses of high range with high optical performance. Of these, the telephoto type has been proposed in a wide variety of multi-unit zoom lenses in which three or more lens units are movable for zooming.

For example, a 3-unit zoom lens of plus-minus-plus power arrangement in this order from the object side, a 4-unit zoom lens of plus-minus-plus-plus power arrangement, another 4-unit zoom lens of plus-minus-minus-plus power arrangement, a 5-unit zoom lens of plus-minus-plus-minus-plus power arrangement, another 5-unit zoom lens of plus-minus-plus-plus-minus power arrangement, and many others have been proposed, wherein a plurality of lens units are moved to effect zooming.

Since, in these 3-unit, 4-unit and 5-unit zoom lenses, two or more lens units contribute to a variation of the focal length, so that thereby the requirements of minimizing the bulk and size of the entire lens system and of obtaining a desired zoom ratio can be fulfilled at once.

Still another proposal for using six lens units has been made in Japanese Laid-Open Patent Application No. Hei 4-186212. With this 6-unit zoom lens of plus-minus-plus-minus-plus-minus power arrangement in this order from the object side, the zooming range is increased to as high as 10.

In general, for zoom lenses, it is desired not only to improve the compact form of the entire lens system but also to extend the zooming range (increase the zoom ratio). To achieve a great increase of the zooming range, the number of those lens units which contribute to the variation of the focal length may be increased. In addition, the refractive power of every lens unit may be increased to strengthen the zooming effect in some cases. In other cases, the movement of each of those lens units which contribute to the variation of the focal length may be increased.

In the former case, however, to maintain good stability of aberration correction throughout the zooming range, it becomes necessary to increase the number of constituent lenses, giving rise to a difficult problem of improving the compact form of the entire lens system.

In the latter case, to allow full zooming movements, the air separations have to be much increased. This leads to elongation of the physical length of the complete lens. Particularly in a case where the lens units move in complicated relation, the mounting mechanism for the movable lens units becomes very elaborate, giving rise to a difficult problem of improving the compact form of the entire lens system.

Meanwhile, there have been previous proposals for preventing a photographed or picked-up image from shaking. Optical systems having such a capability, or image stabilizing optical systems, are disclosed in, for example, Japanese Laid-Open Patent Application No. Sho 50-80147, Japanese Patent Publication No. Sho 56-21133 and Japanese Laid-Open Patent Application No. Sho 61-223819.

In Japanese Laid-Open Patent Application No. Sho 50-80147, a zoom lens has two afocal zooming sections, wherein letting the angular magnifications of the first and second sections be denoted by M1 and M2, respectively, these sections are made to move in such relation that $M_1 = 1 - 1/M_2$ is met and at the same time the second zooming section is held in fixed spatial alignment with the original line of sight axis. The shaking of the image is thus corrected to achieve stabilization of the zoom lens against small angle deviation thereof from a desired line of sight.

In Japanese Patent Publication No. Sho 56-21133, vibrations of the optical instrument are sensed by a detector. In response to its output signal, part of the optics deflects to a direction so as to compensate for accidental displacement of the instrument, thus achieving stabilization of an image in space.

In Japanese Laid-Open Patent application No. Sho 61-223819, a photographic system has a variable angle prism of the refraction type arranged at the frontmost position. As the housing containing the photographic system vibrates, this prism varies its apex angle to deflect the image. Thus, the image is stabilized in space for shooting.

Besides these, there are Japanese Patent Publications Nos. Sho 56-34847 and Sho 57-7414, in which an optical member is arranged in part of the photographic system to be held in fixed spatial alignment with the line of sight. As vibrations occur, this optical member and its mating one generate a prism that deflects image light rays. A stabilized image is thus obtained on the focal plane.

Another available method is to utilize an acceleration sensor to detect vibrations of the housing of the photographic system. A lens unit constituting part of the photographic system is made to rotate in the directions perpendicular to an optical axis so that the image is stabilized against jiggles or oscillations at the focal plane.

In general, for the type of photographic system in which one lens unit is made to vibrate in such a way as to prevent the image from shaking, the operating mechanism for image stabilization is required to have capabilities that the tolerable shaking of the image to correct is large enough, that the movement or rotation of that lens unit (shiftable lens unit) is small relative to the oscillation of the image, and that the driving means is small in size and light in weight.

The shiftable lens unit, when decentering, produces decentering coma, decentering astigmatism, decentering chromatic aberrations and decentering curvature of field aberrations. If these aberrations are large, the image is caused to blur, although the shaking of the image is corrected. For example, if large decentering distortion is produced, the image shift in the paraxial zone becomes appreciably different from that in the marginal zone. For this reason, if the paraxial zone alone is taken into consideration in controlling the decentering of the shiftable lens unit to correct the shaking of the image, it is in the marginal zone that a similar phenomenon to the shaking of the image takes place, causing the optical performance to lower objectionably.

In short, for the zoom lenses having the image stabilizing function, it is required that when the shiftable lens unit is moved in orthogonal directions to the optical axis to the decentered position, the amount of decentering aberrations produced is small so the lowering of the optical performance is little and that the required amount of movement of the shiftable lens unit for correcting the equivalent shaking of the image is small, in other words, the so-called decenter sensitivity (ratio of the corrected amount, $\Delta x$, of shaking of the image to the unity of amount of movement $\Delta H$, or ($\Delta x/\Delta H$) is large.

According to the prior art, however, the image stabilizing optical systems of the type using an optical member as arranged, regardless of vibrations, to be held in fixed spatial alignment with the line of sight, are not suited to be used in instruments of small size and light weight, because this optical member is difficult to operatively support-and because such optical systems are difficult to realize in compact form. Another type of image stabilizing optical system using a variable angular prism as arranged in the frontmost position, though having a merit that, when correcting the shaking, all decentering aberrations except chromatic ones are produced to almost nothing, has problems that the driving members become large in size and that the decentering chromatic aberrations produced from the prism are difficult to correct with ease.

Yet another type of image stabilizing optical systems using one lens unit of the photographic optical system for decentering purposes is considered to be amenable to the technique of minimizing the size of the instrument by proper selection and arrangement of the decentering lens unit. However, there is a difficult problem of simultaneously fulfilling the requirements of correcting well all of the aberrations produced by decentering, namely, decentering coma, decentering astigmatism and decentering curvature of field and of realizing reflection of the sufficiently small amount of decentering movement to a sufficiently great effect of stabilizing the image.

SUMMARY OF THE INVENTION

The present invention makes up a zoom lens from six lens units of specific refractive powers in total and sets forth proper rules for the refractive powers of all the lens units and for the relation in which the lens units move to effect zooming. Based on these rules, the number of constituent lenses is reduced to insure that the physical length of the complete lens is shortened in such a manner that a high optical performance is maintained over the entire zooming range. It is, therefore, an object of the invention to provide a zoom lens of the telephoto type having a range of about 4 with the image aberrations improved.

Another object of the invention is to provide a zoom lens having an image stabilizing function and good optical performance. To this end, the zoom lens of the character described above is used as the base. In application to this zoom lens, the method of correcting shaking of the image is by moving part of the zoom lens, or the shiftable lens unit in directions perpendicular to an optical axis. To this purpose, as the shiftable lens unit, a one of small size and light weight is selected to use. In addition, its small decentering movement is reflected to correct large amplitude of shaking of the image. Furthermore, as the shiftable lens unit moves to parallel decenter, any of the decentering aberrations described before is produced to a smaller amount than was heretofore common.

BRIEF DESCRIPTION OF THE DRAWINGS

FIGS. 4(A)(1)–4(A)4, 4(B)(1)–4(B)(4), and 4(C)(1)–4(C)(4) are graphic representations of the various aberrations of the numerical example 1 of the invention.

FIGS. 5(A)(1)–5(A)(4), 5(B)(1)–5(B)(4), and 5(C)(1)–5(C)(4) are graphic representations of the various aberrations of the numerical example 2 of the invention.

FIGS. 6(A)(1)–6(A)(4), 6(B)(1)–6(B)(4), and 6(C)(1)–6(C)(4) are graphic representations of the various aberrations of the numerical example 3 of the invention.

FIGS. 11(A)(1)–11(A)(4), 11(B)(1)–11(B)(4), and 11(C)(1)–11(C)(4) are graphic representations of the various aberrations of the numerical example 4 of the invention.

FIGS. 12(A)(1)–12(A)(4), 12(B)(1)–12(B)(4), and 12(C)(1)–12(C)(4) are graphic representations of the various aberrations of the numerical example 5 of the invention.

FIGS. 13(A)(1)–13(A)(4), 13(B)(1)–13(B)(4), and 13(C)(1)–13(C)(4) graphic representations of the various aberrations of the numerical example 6 of the invention.

FIGS. 14(A)(1)–14(A)(4), 14(B)(1)–(B)(4) 14(C)(1)–14(C)(4) are graphic representations of the various aberrations of the numerical example 7 of the invention.

FIGS. 19(A)(1)–19(A)(3) and 19(B)(1)–19(B)(3) are graphic representations of the aberrations of the numerical example 8 of the invention in the wide-angle end with an image respectively in the reference state and in a corrected state from the vibration of 1 degree.

FIGS. 20(A)(1)–20(A)(3) and 20(B)(1)–20(B)(3) are graphic representations of the aberrations of the numerical example 8 of the invention in a middle position with an image respectively in the reference state and in a corrected state from the vibration of 1 degree.

FIGS. 21(A)(1)–21(A)(3) and 21(B)(1)–21(B)(3) are graphic representations of the aberrations of the numerical example 8 of the invention in the telephoto end with an image respectively in the reference state and in a corrected state from the vibration of 1 degree.

FIGS. 22(A)(1)–22(A)(3) and 22(B)(1)–22(B)(3) are graphic representations of the aberrations of the numerical example 9 of the invention in the wide-angle end with an image respectively in the reference state and in a corrected state from the vibration of 1 degree.

FIGS. 23(A)(1)–23(A)(3) and 23(B)(1)–23(B)(3) are graphic representations of the aberrations of the numerical example 9 of the invention in a middle position with an image respectively in the reference state and in a corrected state from the vibration of 1 degree.

FIGS. 24(A)(1)–24(A)(3) and 24(B)(1)–24(B)(3) are graphic representations of the aberrations of the numerical example 9 of the invention in the telephoto end with an image respectively in the reference state and in a corrected state from the vibration of 1 degree.

FIGS. 30(A)(1)–30(A)(3) and 30(B)(1)–30(B)(3) are graphic representations of the aberrations of the numerical example 10 of the invention in the wide-angle end with an image respectively in the reference state and in a corrected state from the vibration of 1 degree.

FIGS. 31(A)(1)–31(A)(3) and 31(B)(1)–31(B)(3) are graphic representations of the aberrations of the numerical example 10 of the invention in a middle position with an image respectively in the reference state and in a corrected state from the vibration of 1 degree.

FIGS. 32(A)(1)–32(A)(3) and 32(B)(1)–32(B)(3) are graphic representations of the aberrations of the numerical example 10 of the invention in the telephoto end with an image respectively in the reference state and in a corrected state from the vibration of 1 degree.

FIGS. 33(A)(1)–33(A)(3) and 33(B)(1)–33(B)(3) are graphic representations of the aberrations of the numerical example 11 of the invention in the wide-angle end with an image respectively in the reference state and in a corrected state from the vibration of 1 degree.

FIGS. 34(A)(1)–34(A)(3) and 34(B)(1)–34(B)(3) are graphic representations of the aberrations of the numerical example 11 of the invention in a middle position with an image respectively in the reference state and in a corrected state from the vibration of 1 degree.

FIGS. 35(A)(1)–35(A)(3) and 35(B)(1)–35(B)(3) are graphic representations of the aberrations of the numerical example 11 of the invention in the telephoto end with an image respectively in the reference state and in a corrected state from the vibration of 1 degree.

FIGS. 36(A)(1)–36(A)(3) and 36(B)(1)–36(B)(3) are graphic representations of the aberrations of the numerical example 12 of the invention in the wide-angle end with an image respectively in the reference state and in a corrected state from the vibration of 1 degree.

FIGS. 37(A)(1)–37(A)(3) and 37(B)(1)–37(B)(3) are graphic representations of the aberrations of the numerical example 12 of the invention in a middle position with an image respectively in the reference state and in a corrected state from the vibration of 1 degree.

FIGS. 38(A)(1)–38(A)(3) and 38(B)(1)–38(B)(3) are graphic representations of the aberrations of the numerical example 12 of the invention in the telephoto end with an image respectively in the reference state and in a corrected state from the vibration of 1 degree.

DETAILED DESCRIPTION OF THE PREFERRED EMBODIMENTS

Figure 1A:
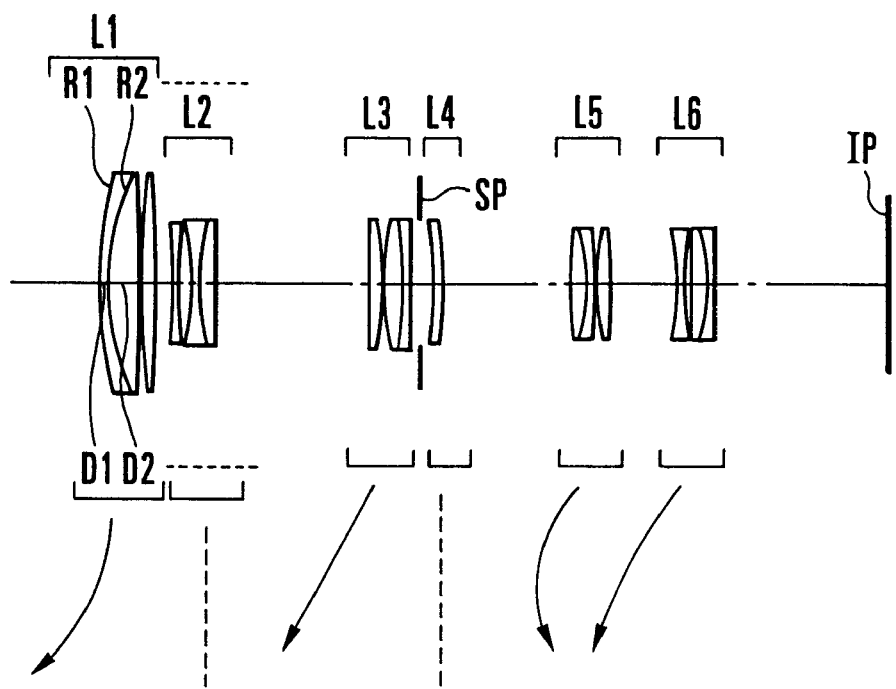
FIGS. 1(A), 1(B) and 1(C) are lens block diagrams of a numerical example 1 of the invention.
Figure 1B:
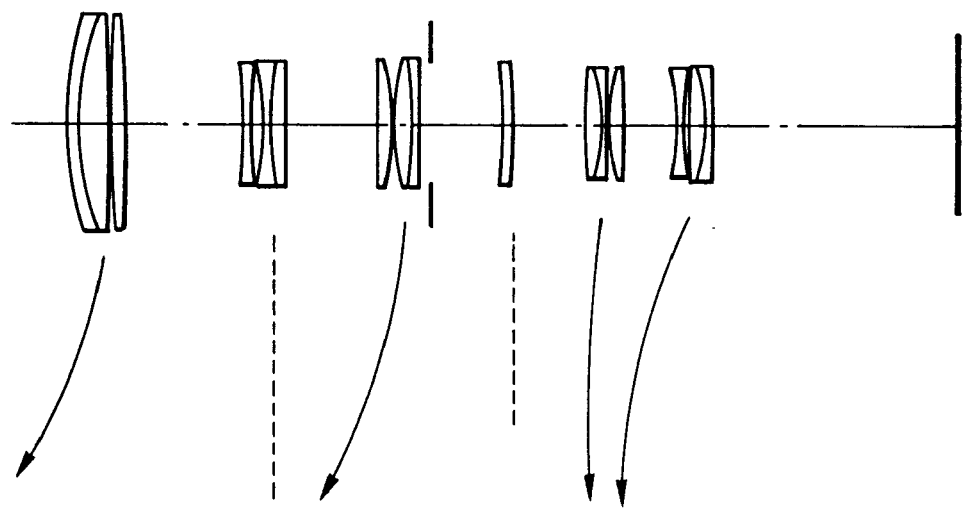
Figure 1C:
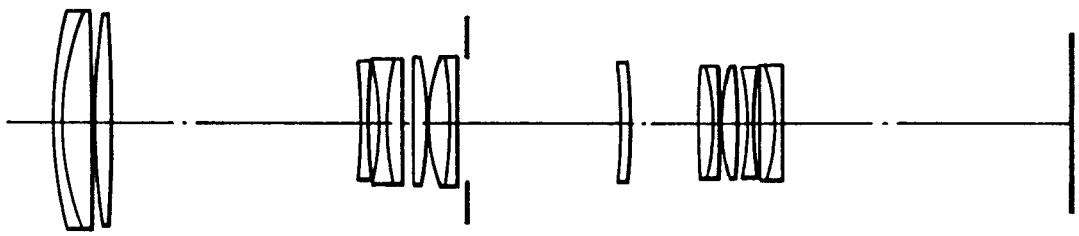
Figure 2A:
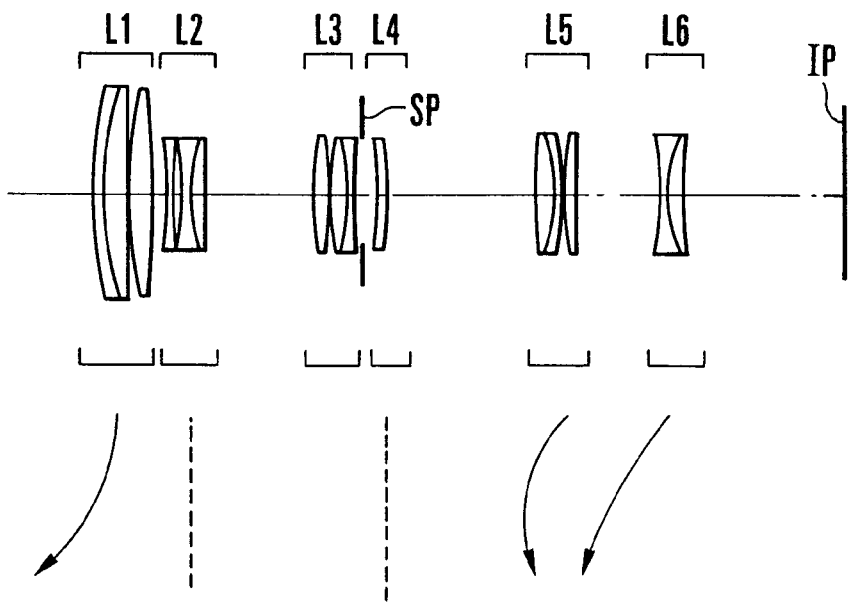
FIGS. 2(A), 2(B) and 2(C) are lens block diagrams of a numerical example 2 of the invention.
Figure 2B:
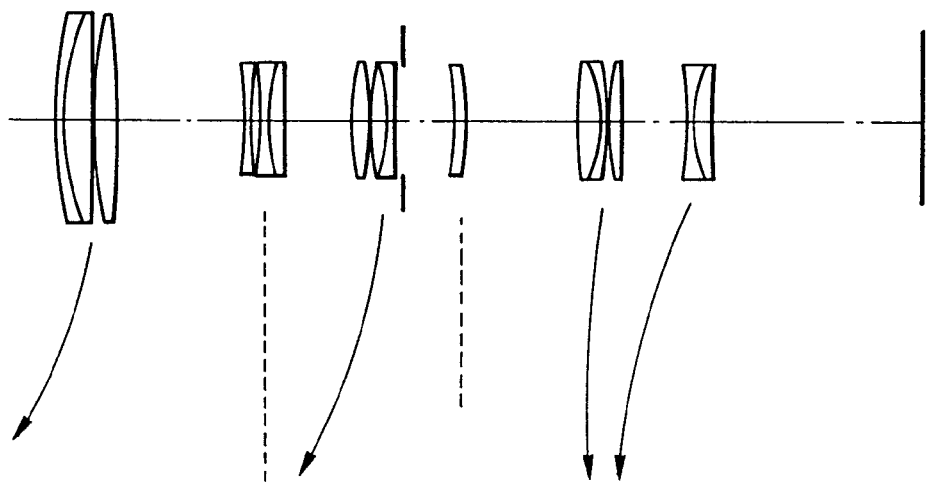
Figure 2C:
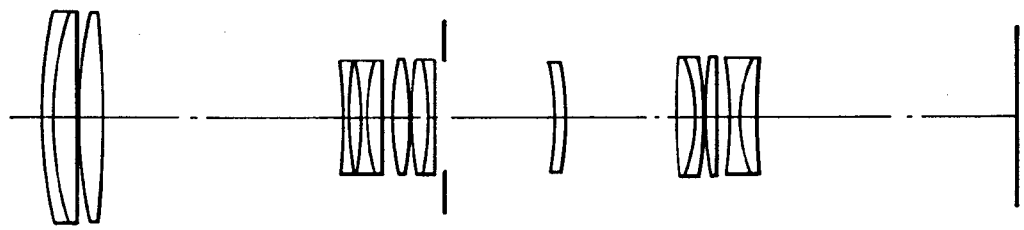
Figure 3A:
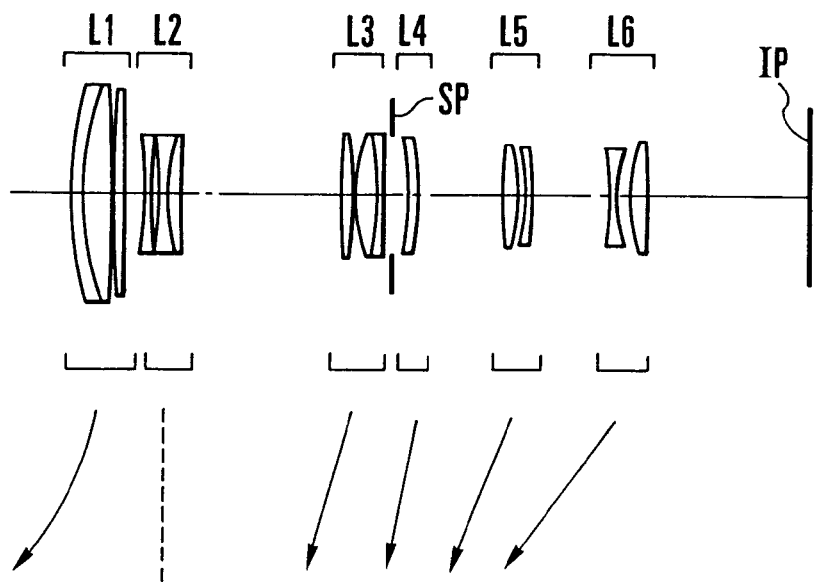
FIGS. 3(A), 3(B) and 3(C) are lens block diagrams of a numerical example 3 of the invention.
Figure 3B:
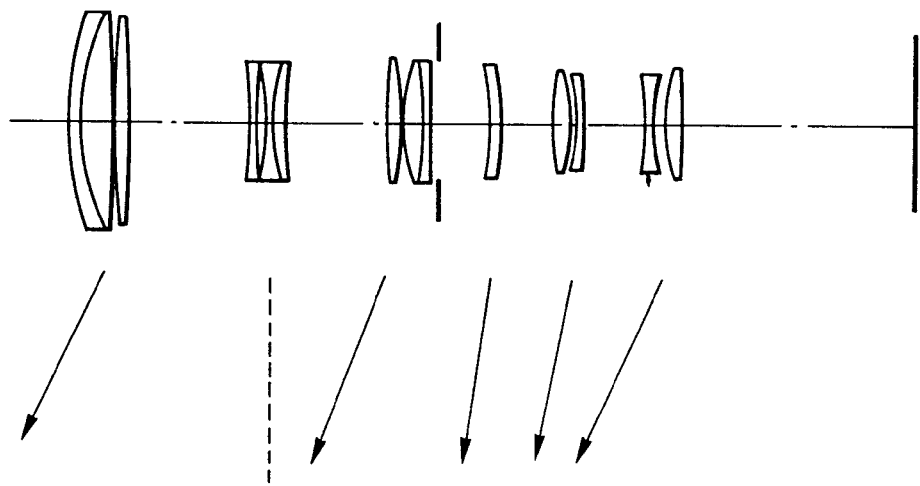
Figure 3C:
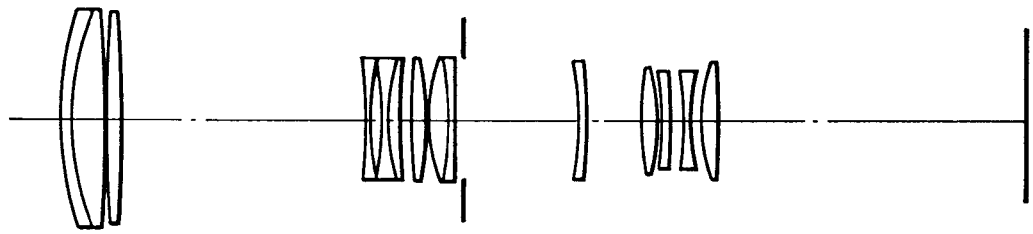
Figure 7A:
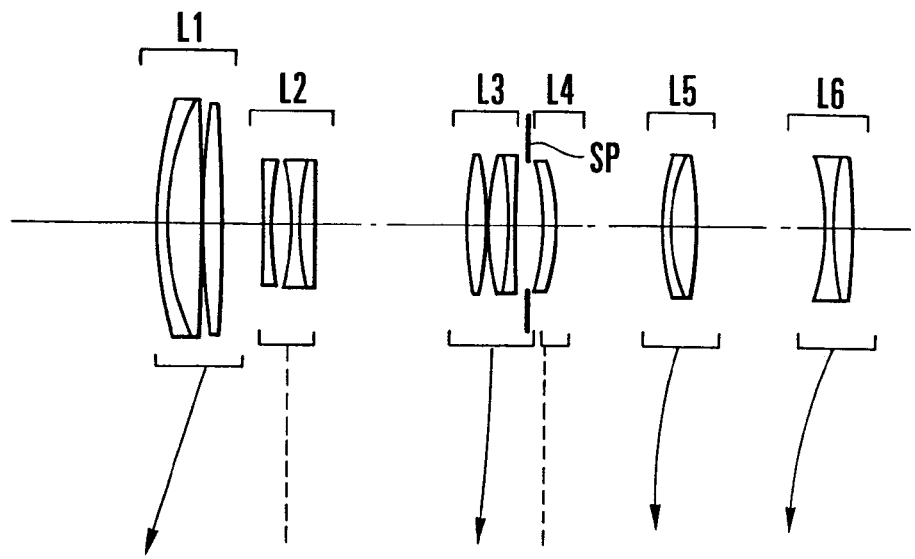
FIGS. 7(A), 7(B) and 7(C) are lens block diagrams of a numerical example 4 of the invention.
Figure 7B:
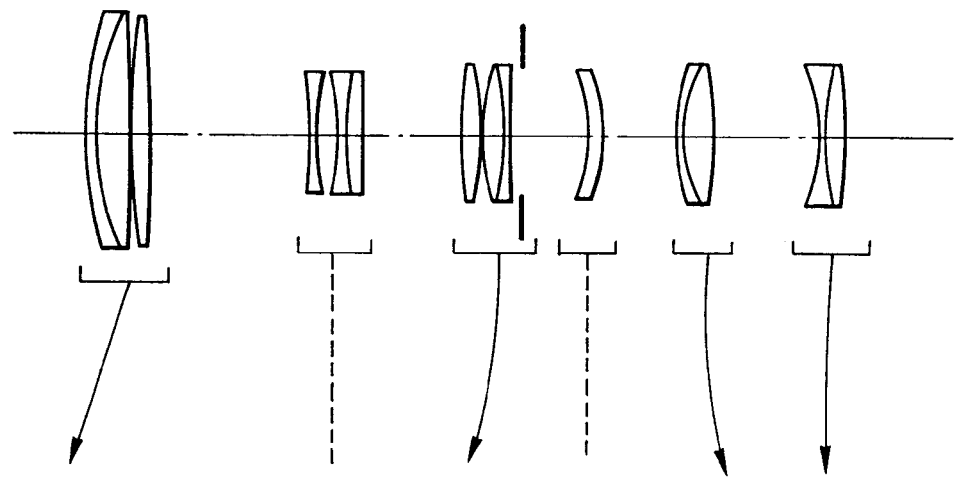
Figure 7C:
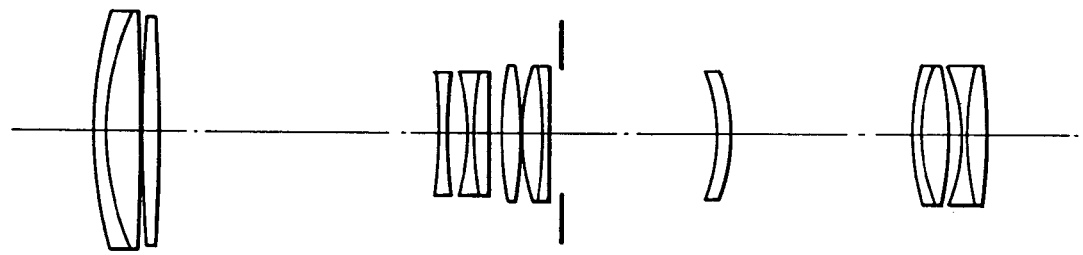
Figure 8A:
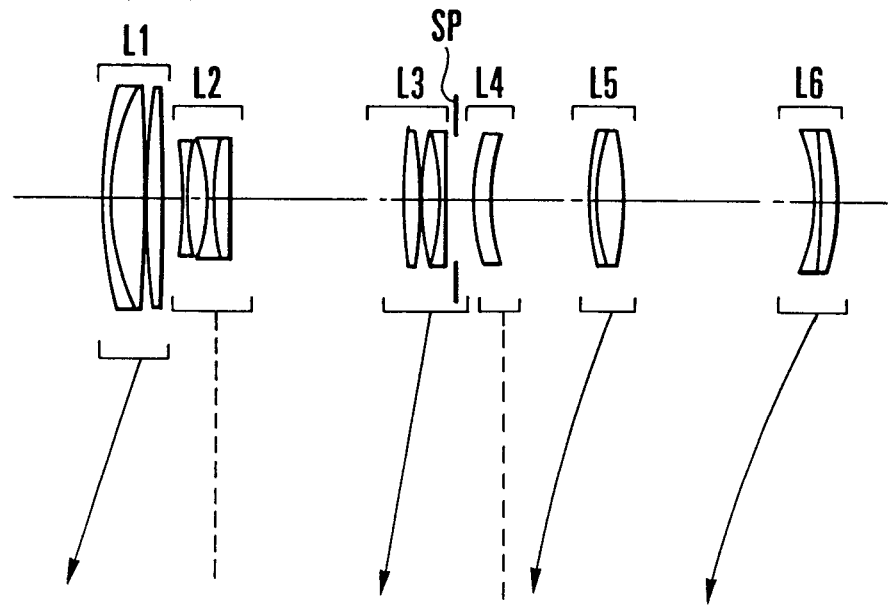
FIGS. 8(A), 8(B) and 8(C) are lens block diagrams of a numerical example 5 of the invention.
Figure 8B:
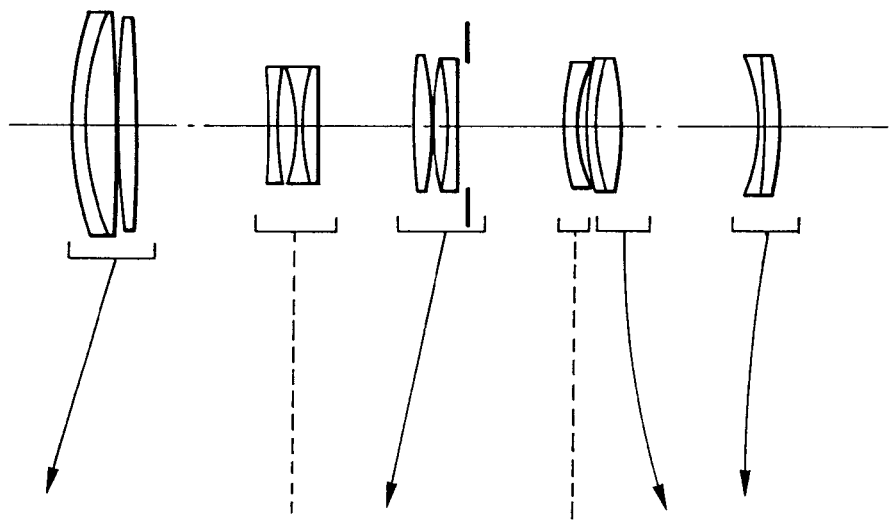
Figure 8C:
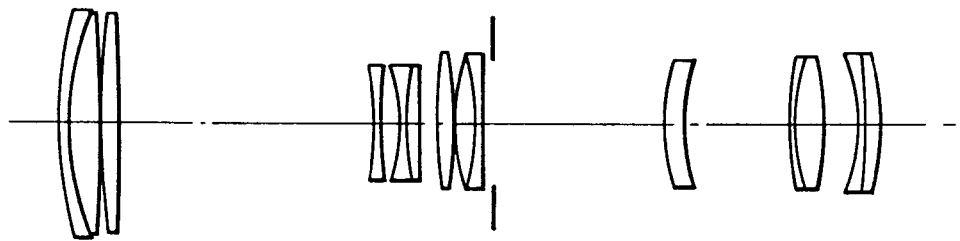
Figure 9A:
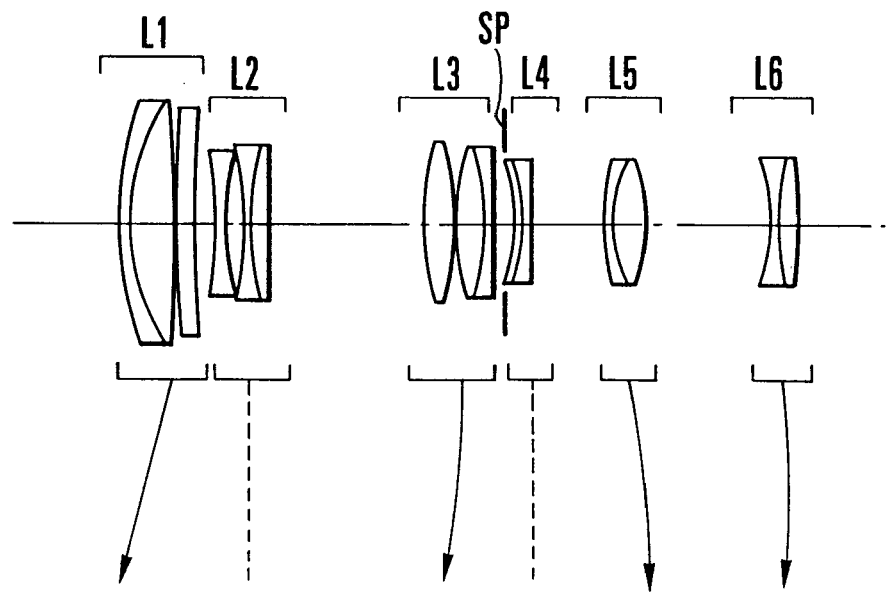
FIGS. 9(A), 9(B) and 9(C) are lens block diagrams of a numerical example 6 of the invention.
Figure 9B:
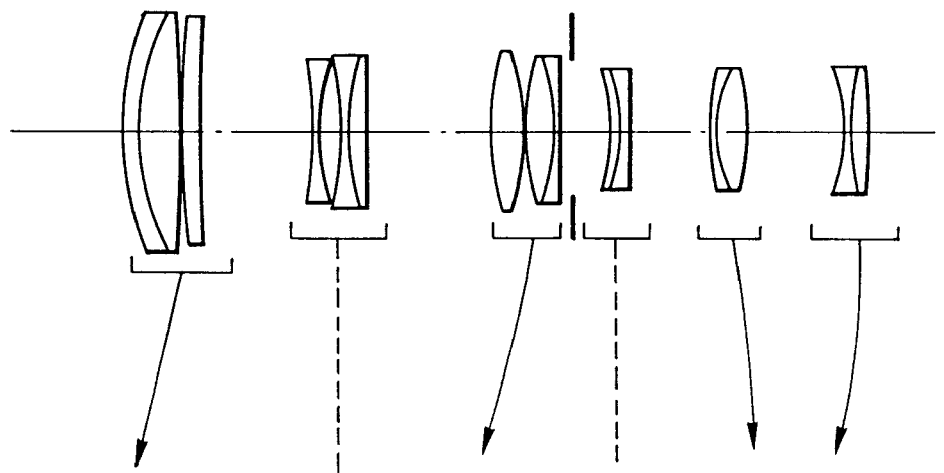
Figure 9C:
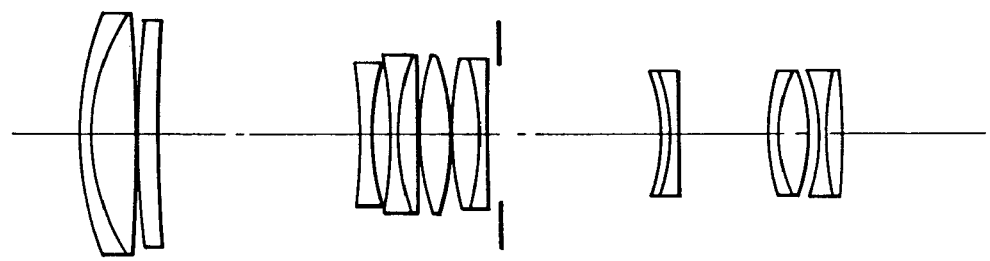
Figure 10A:
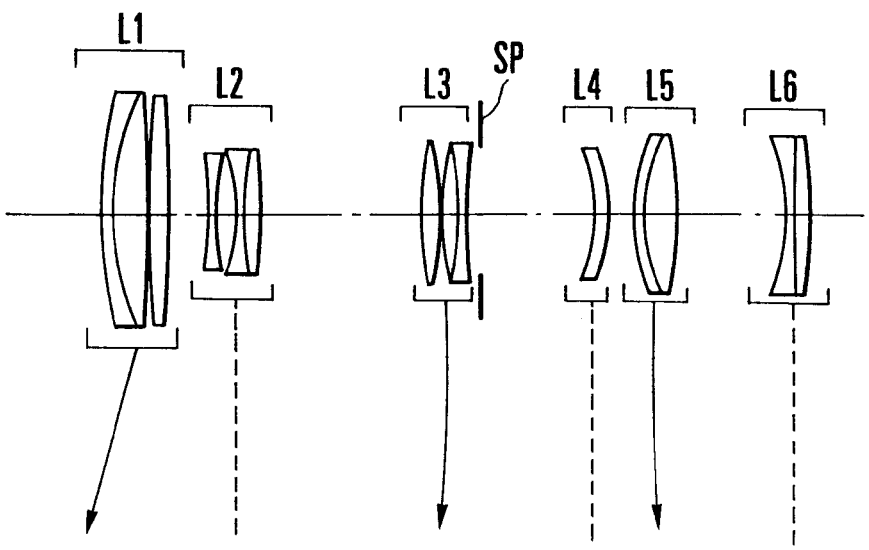
FIGS. 10(A) 10(B) and 10(C) are lens block diagrams of a numerical example 7 of the invention.
Figure 10B:
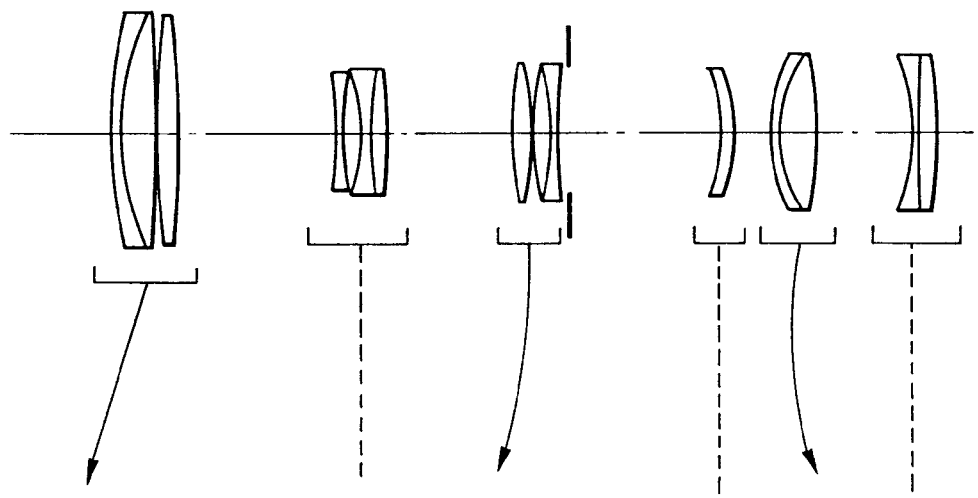
Figure 10C:
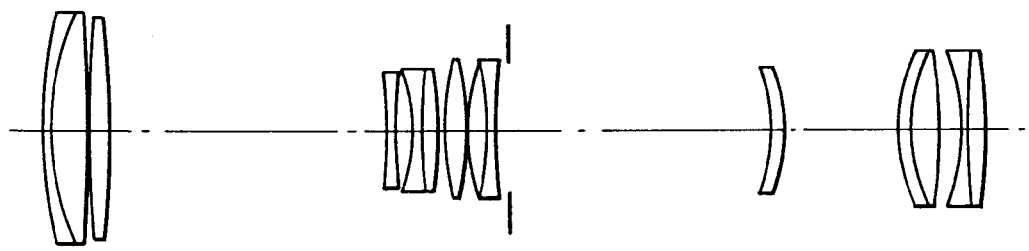

Numerical examples 1 to 3 of zoom lenses of the invention are shown in the longitudinal section views of FIGS. 1(A), 1(B) and 1(C) through FIGS. 3(A), 3(B) and 3(C), respectively. The aberrations of the zoom lenses of the numerical examples 1 to 3 are shown in FIGS. 4(A)(1)–4(A)(4), 4(B)(1)–4(B)(4), and 4(C)(1)–4(C)(4) through FIGS. 6(A)(1)–6(A)(4), 6(B)(1)–6(B)(4), and 6(C)(1)–6(C)(4). Of the section views, the ones of the numbers with suffix (A) are in the wide-angle end, the ones of the numbers with suffix (B) in a middle position and the ones of the numbers with suffix (C) in the telephoto end.

Referring to these figures, the zoom lens comprises, from front to rear, a first lens unit L1 of positive refractive power, a second lens unit L2 of negative refractive power, a third lens unit L3 of positive refractive power, a fourth lens unit L4 of negative refractive power, a fifth lens unit L5 of positive refractive power and a sixth lens unit L6 of negative refractive power. SP stands for a stop and IP for an image plane. The arrows indicate the loci of motion of the lens units when zooming from the wide-angle end to the telephoto end.

In the present embodiment, the lens units L1 to L6 are made selectively movable for zooming, wherein the selection is specified differently from item to item. For every one of these zoom lenses, as zooming goes from the wide-angle end to the telephoto end, the selected ones of the lens units move axially in such relation that the separation between the first and second lens units increases, the separation between the second and third lens units decreases, the separation between the third and fourth lens units increases, the separation between the fourth and fifth lens units decreases and the separation between the fifth and sixth lens units decreases.

In other words, letting the separations between the i-th and (i+1)st lens units for the wide-angle end and the telephoto end be denoted by DiW and DiT, respectively, the lens units are made to move in such relation as to satisfy the following conditions:

D1W<D1T

D2W>D2T

D3W<D3T

D4W>D4T

D5W>D5T

An additional condition to satisfy is:

$$0.3<|f4/fT|<10.0 \quad (1)$$

where f4 is the focal length of the fourth lens unit and fT is the longest focal length of the entire system. When these conditions are satisfied, the effect of varying the focal length is shared in good balance by all the lens units, thereby making it easy to extend the zooming range while still maintaining a shortening of the total length of the entire system to be achieved. Incidentally, the stop SP is made to move in unison with the third lens unit.

In the zoom lens of the invention, for the wide-angle end, the first and second lens units are positioned so closely that their combined refractive power becomes negative. The third and fourth lens units are also closely positioned. Further, the third lens unit and those that follow have their combined refractive power made positive. With these, the entire lens system takes on the retrofocus type.

For the telephoto end, the second and third lens units are positioned so closely that their combined refractive power becomes negative. The fourth and fifth lens units and also the sixth lens unit are positioned close to each other so that their combined refractive power becomes negative or weakly positive. Further, the stop is positioned near the third lens unit.

As the configuration of the lens units is made to vary in such a way, it is in the wide-angle end that, although the refractive power arrangement is made nearly of the retrofocus type, the rearmost or sixth lens unit is permitted to be a negative lens unit, thereby well correcting asymmetric aberrations such as coma. With the same lens configuration, when in the telephoto end, the refractive power arrangement becomes the telephoto type. The lens system thus takes a compact form, while still permitting all aberrations to be corrected well.

In addition, the refractive power of the fourth lens unit is specified by the condition (1) to minimize the variation of aberrations with zooming. The inequalities of condition (1) give a range for the ratio of the focal length of the fourth lens unit to the longest focal length of the entire system and have an aim chiefly to define a refractive power arrangement that assures maintenance of good stability of aberration correction throughout the zooming range.

When the lower limit of the condition (1) is exceeded, as this means that the absolute value of the focal length of the fourth lens unit is too small as compared with the focal length for the telephoto end of the entire system, it becomes necessary to make relatively large the absolute value of the focal length of the sixth lens unit. At this time, particularly in the wide-angle end, the symmetry of the refractive power arrangement is worsened. So, it becomes difficult to correct coma and other asymmetric aberrations. Conversely when the upper limit of the condition (1) is exceeded, as this means that the absolute value of the focal length of the fourth lens unit is too large as compared with the longest focal length of the entire system, it becomes difficult to correct the variation of spherical aberration with zooming, since this correction is done mainly by the fourth lens unit.

For the zoom lens of the invention, use is made of the six lens units whose refractive powers are specified in sign as described above in combination with the variations of the air separations with zooming from the wide-angle end to the telephoto end specified as described above. Further, the refractive power arranged is made to satisfy the condition (1) described above. Thus, all aberrations are corrected well, so that high optical performance is maintained stable over the entire zooming range.

To further improve the variation of aberrations with zooming, and to obtain a high image quality over the entire area of the image frame, the invention sets forth the following additional conditions:

$$0.1 < |f2/fT| < 0.18 \tag{2}$$

$$0.12 < |f6/fT| < 0.3 \tag{3}$$

where f2 and f6 are the focal lengths of the second and sixth lens units, respectively.

The inequalities of condition (2) are concerned with the ratio of the focal length of the second lens unit which has the negative refractive power to the longest focal length of the entire system, and the inequalities of condition (3) are concerned with the ratio of the focal length of the sixth lens unit which has the negative refractive power to the longest focal length of the entire system.

The conditions (2) and (3) are combined with the condition (1) described before to individually specify the focal lengths of the negative lens units distributed over the entire system. This combination represents the refractive power arrangement for the zoom lens that can achieve the object of the invention.

When the lower limit of the condition (2) is exceeded, as this means that the absolute value of the second lens unit is too small, it becomes difficult mainly in the telephoto end to correct coma and astigmatism. Conversely when the upper limit is exceeded, as this means that the absolute value of the foal length of the second lens unit is too large, the zooming movement of the first lens unit must be increased. So, the physical length of the complete lens increases objectionably.

When the lower limit of the condition (3) is exceeded, as this means that the absolute value of the sixth lens unit is too small, distortion of the pincushion type increases mainly in the telephoto end. When the absolute value of the focal length of the sixth lens unit is too large as exceeding the upper limit, it is in the general case that the total length of the complete lens increases objectionably.

The foregoing has been described in connection with the demerits resulting from the departure of the focal lengths of the lens units from the ranges of the conditions (2) and (3). However, virtually, the above-described factors are related to one another complicatedly. After the condition (1) is satisfied, when the conditions (2) and (3) are satisfied, it becomes easy to correct various aberrations well in such a manner that the zoom ratio is kept high enough to 4 or thereabout and the compact form is maintained.

In the present invention, at least one of the second and fourth lens units may be made stationary during zooming. If so, regardless of the use of the 6-unit type, the structure of the lens barrel can be simplified. (In the numerical examples 1 and 2, the second and fourth lens units remain stationary. In the numerical example 3, the second lens unit remains stationary.)

Also, in the present invention, the fourth lens unit is constructed with a single negative lens of meniscus form convex toward the image side under the control of the condition (1). By this, variation of mainly spherical aberration with zooming is corrected well.

Besides these, in the invention, the third lens unit is constructed with a positive lens and a cemented lens of a positive lens and a negative lens to form two groups with three members. The fifth lens unit is constructed with a cemented lens of a positive lens and a negative lens and a positive lens to form two groups with three members, or with a positive lens and a negative lens to form two groups with two members. The sixth lens unit is constructed with a negative lens and a cemented lens of a positive lens and a negative lens to form two groups with three members, or with a cemented lens of a negative lens and a positive lens to form one group with two members, or with a negative lens and a positive lens to form two groups with two members. With these, the variation of aberrations with zooming is corrected for high optical performance throughout the entire zooming range.

It should be noted that, as will be described more fully later, the lens system is amenable to the image stabilizing capability by decentering the second lens unit.

Next, numerical examples 1 to 3 of the invention are shown. In the numerical data for the examples 1 to 3, Ri is the radius of curvature of the i-th lens surface, when counted from the object side, Di is the i-th axial lens thickness or air separation, when counted from the object side and Ni and vi are respectively the refractive index and Abbe number of the glass of the i-th lens element, when counted from the object side. The values of the factors in the above-described conditions for the numerical examples are listed in Table-1.

NUMERICAL EXAMPLE 1

Focal Length: 76.51–292.00
F-Number: 4.00–5.86

| | | | |
|---|---|---|---|
| R1 = 103.34 | D1 = 2.8 | N1 = 1.80518 | ν1 = 25.4 |
| R2 = 65.53 | D2 = 6.6 | N2 = 1.51633 | ν2 = 64.2 |
| R3 = 1941.34 | D3 = 0.2 | | |
| R4 = 212.98 | D4 = 4.2 | N3 = 1.48749 | ν3 = 70.2 |
| R5 = −305.81 | D5 = Variable | | |
| R6 = −115.87 | D6 = 1.5 | N4 = 1.77250 | ν4 = 49.6 |
| R7 = 131.18 | D7 = 2.8 | | |
| R8 = −57.65 | D8 = 1.5 | N5 = 1.60311 | ν5 = 60.7 |
| R9 = 60.38 | D9 = 3.4 | N6 = 1.84666 | ν6 = 23.8 |
| R10 = 313.25 | D10 = Variable | | |
| R11 = 366.28 | D11 = 3.4 | N7 = 1.48749 | ν7 = 70.2 |
| R12 = −89.07 | D12 = 0.2 | | |
| R13 = 50.08 | D13 = 5.2 | N8 = 1.60311 | ν8 = 60.7 |
| R14 = −90.47 | D14 = 1.5 | N9 = 1.33400 | ν9 = 37.2 |
| R15 = −5450.60 | D15 = 2.0 | | |
| R16 = (Stop) | D16 = Variable | | |
| R17 = −85.14 | D17 = 2.5 | N10 = 1.51633 | ν10 = 64.2 |
| R18 = −114.60 | D18 = Variable | | |
| R19 = 124.60 | D19 = 4.4 | N11 = 1.60311 | ν11 = 60.7 |
| R20 = −38.67 | D20 = 1.5 | N12 = 1.80518 | ν12 = 25.4 |
| R21 = −181.93 | D21 = 0.2 | | |
| R22 = 56.62 | D22 = 3.4 | N13 = 1.51633 | ν13 = 64.2 |
| R23 = −206.31 | D23 = Variable | | |
| R24 = −51.93 | D24 = 1.5 | N14 = 1.77250 | ν14 = 49.6 |
| R25 = 71.28 | D25 = 1.4 | | |
| R26 = 641.53 | D26 = 4.0 | N15 = 1.80518 | ν15 = 25.4 |
| R27 = −38.69 | D27 = 1.5 | N16 = 1.69680 | ν16 = 55.5 |
| R28 = −907.33 | | | |

| Variable | Focal Length | | |
|---|---|---|---|
| Separations | 76.51 | 135.00 | 292.00 |
| D5 | 4.00 | 28.11 | 59.00 |
| D10 | 36.01 | 21.37 | 2.49 |
| D16 | 3.00 | 17.63 | 36.52 |
| D18 | 30.24 | 16.59 | 15.51 |
| D23 | 16.09 | 12.99 | 2.99 |

NUMERICAL EXAMPLE 2

Focal Length: 76.53–291.99
F-Number: 4.05–5.78

| | | | |
|---|---|---|---|
| R1 = 117.46 | D1 = 2.8 | N1 = 1.80518 | ν1 = 25.4 |
| R2 = 70.46 | D2 = 6.1 | N2 = 1.51633 | ν2 = 64.2 |
| R3 = 896.98 | D3 = 0.2 | | |
| R4 = 110.38 | D4 = 5.4 | N3 = 1.48749 | ν3 = 70.2 |
| R5 = −444.29 | D5 = Variable | | |
| R6 = −103.08 | D6 = 1.5 | N4 = 1.77250 | ν4 = 49.6 |
| R7 = 79.32 | D7 = 2.8 | | |
| R8 = −70.54 | D8 = 1.5 | N5 = 1.60311 | ν5 = 60.7 |
| R9 = 43.52 | D9 = 3.6 | N6 = 1.84666 | ν6 = 23.8 |
| R10 = 188.82 | D10 = Variable | | |
| R11 = 70.72 | D11 = 4.1 | N7 = 1.60311 | ν7 = 60.7 |
| R12 = −95.89 | D12 = 0.2 | | |
| R13 = 69.47 | D13 = 4.6 | N8 = 1.60311 | ν8 = 60.7 |
| R14 = −58.59 | D14 = 1.5 | N9 = 1.83400 | ν9 = 37.2 |
| R15 = 275.47 | D15 = 2.0 | | |
| R16 = (Stop) | D16 = Variable | | |
| R17 = −56.86 | D17 = 2.5 | N10 = 1.51633 | ν10 = 64.2 |
| R18 = −84.28 | D18 = Variable | | |
| R19 = 137.95 | D19 = 5.4 | N11 = 1.60311 | ν11 = 60.7 |
| R20 = −33.51 | D20 = 1.5 | N12 = 1.76182 | ν12 = 26.5 |
| R21 = −91.67 | D21 = 0.2 | | |
| R22 = 66.61 | D22 = 3.3 | N13 = 1.60311 | ν13 = 60.7 |
| R23 = −2072.51 | D23 = Variable | | |
| R24 = −67.27 | D24 = 1.5 | N14 = 1.77250 | ν14 = 49.6 |
| R25 = 29.73 | D25 = 4.0 | N15 = 1.80518 | ν15 = 25.4 |
| R26 = 92.37 | | | |

| Variable | Focal Length | | |
|---|---|---|---|
| Separations | 76.53 | 126.57 | 291.99 |
| D5 | 4.00 | 28.75 | 59.00 |
| D10 | 26.33 | 18.10 | 2.56 |
| D16 | 4.00 | 12.23 | 27.77 |
| D18 | 35.64 | 28.12 | 27.11 |
| D23 | 20.82 | 16.71 | 3.47 |

NUMERICAL EXAMPLE 3

Focal Length: 75.99–291.99
F-Number: 4.05–5.75

| | | | |
|---|---|---|---|
| R1 = 94.35 | D1 = 2.8 | N1 = 1.80518 | ν1 = 25.4 |
| R2 = 61.27 | D2 = 7.3 | N2 = 1.51633 | ν2 = 64.2 |
| R3 = −757.11 | D3 = 0.2 | | |
| R4 = 313.60 | D4 = 3.6 | N3 = 1.48749 | ν3 = 70.2 |
| R5 = −481.24 | D5 = Variable | | |
| R6 = −114.27 | D6 = 1.5 | N4 = 1.77250 | ν4 = 49.6 |
| R7 = 146.02 | D7 = 2.5 | | |
| R8 = −71.58 | D8 = 1.5 | N5 = 1.60311 | ν5 = 60.7 |
| R9 = 41.03 | D9 = 3.3 | N6 = 1.84666 | ν6 = 23.8 |
| R10 = 109.42 | D10 = Variable | | |
| R11 = 127.60 | D11 = 3.6 | N7 = 1.48749 | ν7 = 70.2 |
| R12 = −84.87 | D12 = 0.2 | | |
| R13 = 42.12 | D13 = 5.3 | N8 = 1.51633 | ν8 = 64.2 |
| R14 = −76.46 | D14 = 1.5 | N9 = 1.83400 | ν9 = 37.2 |
| R15 = 1363.46 | D15 = 2.0 | | |
| R16 = (Stop) | D16 = Variable | | |
| R17 = −65.36 | D17 = 2.5 | N10 = 1.51633 | ν10 = 64.2 |
| R18 = −78.94 | D18 = Variable | | |
| R19 = 76.31 | D19 = 4.1 | N11 = 1.69680 | ν11 = 55.5 |
| R20 = −43.97 | D20 = 1.7 | | |
| R21 = −38.11 | D21 = 1.5 | N12 = 1.84666 | ν12 = 23.8 |
| R22 = −111.62 | D22 = Variable | | |
| R23 = −58.91 | D23 = 1.5 | N13 = 1.77250 | ν13 = 49.6 |
| R24 = 35.27 | D24 = 3.0 | | |
| R25 = 44.47 | D25 = 3.7 | N14 = 1.74077 | ν14 = 27.8 |
| R26 = −473.11 | | | |

| Variable | Focal Length | | |
|---|---|---|---|
| Separations | 75.99 | 135.00 | 291.99 |
| D5 | 4.00 | 29.99 | 59.00 |
| D10 | 38.88 | 24.09 | 2.48 |
| D16 | 4.00 | 12.96 | 28.08 |
| D18 | 20.43 | 13.00 | 13.16 |
| D22 | 19.05 | 15.18 | 2.99 |

TABLE 1

| Condition No. | Factor | Numerical Example | | |
|---|---|---|---|---|
| | | 1 | 2 | 3 |
| (1) | \|f4/fT\| | 2.262 | 1.197 | 2.689 |
| (2) | \|f2/fT\| | 0.155 | 0.135 | 0.149 |
| (3) | \|f6/fT\| | 0.166 | 0.177 | 0.231 |

According to the invention, as described above, the zoom lens is constructed with six lens units of specified refractive powers in total, wherein proper rules are set forth for the refractive powers of the lens units and for the relation in which the lens units move when zooming, so that the number of constituent lenses is reduced to a minimum to insure that a shortening of the total length of the entire lens system is achieved, while still permitting high optical performance to be maintained throughout the entire zooming range. Thus, a zoom lens of the telephoto type having a range of about 4 is achieved.

Another embodiment in which further improvements are made is described below.

Numerical examples 4 to 7 of zoom lenses of the invention are shown in FIGS. 7(A), 7(B) and 7(B) through FIGS. 10(A), 10(B) and 10(C). The aberrations of the zoom lenses of the numerical examples 4 to 7 are shown in FIGS. 11(A)(1)–11(A)(4), 11(B)(1)–11(B)(4), and 11(C)(1)–11(C)(4) through FIGS. 14(A)(1)–14(A)(4), 14(B)(1)–14(B)(4), and 14(C)(1)–14(C)(4), with suffix (A) in the wide-angle end, suffix (B) in a middle position and suffix (C) in the telephoto end.

The zoom lens comprises, from front to rear, a first lens unit L1 of positive refractive power, a second lens unit L2 of negative refractive power, a third lens unit L3 of positive refractive power, a fourth lens unit L4 of negative refractive power, a fifth lens unit L5 of positive refractive power and a sixth lens unit L6 of negative refractive power. SP stands for a stop. The arrows indicate the loci of motion of the lens units when zooming from the wide-angle end to the telephoto end.

One of the characteristic features of the present embodiment is that, for zooming purposes, certain ones of the lens units are made to move in such relation as illustrated.

In more detail, when zooming from the wide-angle end to the telephoto end, the separation between the first and second lens units increases, the separation between the second and third lens units decreases, the separation between the third and fourth lens units increases, the separation between the fourth and fifth lens unit increases and the separation between the fifth and sixth lens units decreases.

Along with this, an additional condition is set forth as follows:

$$0.3 < \ln Z_2 / \ln Z < 1 \quad (4)$$

where ln represents natural logarithm wherein $Z_2$ is the zoom ratio of the second lens unit and Z is the zoom ratio a of the entire system.

When these features or conditions are satisfied, a proper effect of varying the focal length is produced, thereby making it easier to extend the zooming range, while still permitting a shortening of the total length of the entire system to be achieved. The stop SP is made axially movable in unison with the third lens unit.

It is to be noted that, for the numerical examples 4, 5 and 6, the second and fourth lens units remain stationary during zooming. For the numerical example 7, the second, fourth and sixth lens units remain stationary during zooming.

In the zoom lens of the invention, for the wide-angle end, the first and second lens units are positioned so closely that their combined refractive power becomes negative. The third and fourth lens units and also the fifth lens unit are positioned close to each other. In addition, the third and those that follow have their overall refractive power made negative. With these, the lens system takes on as a whole the retrofocus type.

For the telephoto end, the first and second lens units are spaced apart greatly. The second and third lens units are positioned so closely that their combined refractive power becomes negative. The fifth and sixth lens units are positioned so closely that their combined refractive power becomes negative or weakly positive. The stop is positioned adjacent to the third lens unit. With these, the lens system takes on as a whole the telephoto type.

In the present invention, by using the lens configuration as such, the refractive power arrangement is made to be nearly of the retrofocus type in the wide-angle end. Nonetheless, the rearmost or sixth lens unit is permitted to be a negative lens unit, thereby well correcting coma and other asymmetric aberrations. Along with this, it is in the telephoto end that as the refractive power arrangement takes on the telephoto type, compact form is produced and at the same time spherical aberration and others are corrected well.

In particular, the separation between the fourth and fifth lens units is made wider in the telephoto end than in the wide-angle end. This decreases the amount of spherical aberration produced from the fifth lens unit in the telephoto end, thus reducing the contribution of the sixth lens unit to the correction of spherical aberration for the telephoto end.

Next, an explanation is given to the technical significance of the above-described condition (4). The factor in this condition represents how much share the second lens unit should take in varying the focal length of the entire system. Mainly in view of correcting well the variation of all aberrations with zooming, the inequalities of condition (4) give a possible range for the contribution of the second lens unit to the variation of the focal length. When the lower limit of the condition (4) is exceeded, as this means that the second lens unit takes too small a share in varying the focal length, or the zoom ratio of the second lens unit is too small as compared with the zoom ratio of the entire system, the contribution of third lens unit and those that follow to the variation of the focal length becomes greater. In the case of laying a large proportion of the zoom ratio on the third lens unit and those that follows, because the total movement of each of these lens units cannot be taken so much long, such a violation would result in strengthening the refractive power of every one of the lens units. As a result, all aberrations could be hardly corrected without having to increase the number of constituent lenses objectionably.

Conversely when the upper limit of the condition (4) is exceeded, as this means that the second lens unit takes too large a share in varying the focal length, or the zoom ratio of the second lens unit is too high as compared with the zoom ratio of the entire system, the third lens unit and the later has to perform inverse variation of the focal length, thus worsening the efficiency with which to vary the focal length. In order to perform a great variation of the focal length by the second lens unit, the movement of the second lens unit has to increase greatly. This is disadvantageous at improving the compact form. Further, as the varied amount of aberrations by the first and second lens units increases, the number of constituent lenses in each lens unit is caused to increase objectionably.

Incidentally, in the invention, on correction of aberrations, it is further preferable to alter the range for the factor of the condition (4) as follows:

$$0.5 < \ln Z_2 / \ln Z < 1 \quad (4a)$$

The zoom lens of the invention uses six lens units whose refractive powers are of the signs described above, and zooming is performed by varying the separations as specified above when zooming from the wide-angle end to the telephoto end. Further, by determining the contribution to the variation of the focal length based on the condition (4). The aberrations are corrected particularly well and high optical performance is obtained throughout the entire zooming range.

In the invention, to further reduce the range of variation of aberrations with zooming and to obtain high optical performance throughout the entire area of the image frame, it is preferred to satisfy the following condition:

$$0.5 < f1/\sqrt{fW \times fT} < 3.0 \quad (5)$$

where F1 is the focal length of the first lens unit, and fW and fT are the shortest and longest focal lengths of the entire system.

The inequalities of condition (5) are to determine the relationship between the focal length of the first lens unit of positive refractive power and the focal lengths of the entire system for the wide-angle and telephoto ends. Being combined with the before described condition (4), the condition (5) gives a range for the refractive power of the first lens unit, as is necessary for the second lens unit to contribute to the variation of the focal length. When the lower limit of the condition (5) is exceeded, as this means that the focal length of the first lens unit is too small, it becomes difficult to correct coma and astigmatism mainly in the telephoto end. Conversely when the focal length of the first lens unit is too long as exceeding the upper limit, the zooming movement of the first lens unit must be increased largely, causing the total length of the entire system to increase objectionably.

In the invention, at least one of the second, fourth and sixth lens units is made stationary during zooming. With this, despite the use of the 6-unit type or a relatively large number of lens units, it is made possible to limit the number of movable lens units for zooming to a minimum.

In the invention, the fourth lens unit is constructed with a single lens or a cemented lens of meniscus form convex toward the object side or image side, thereby well correcting the variation of mainly spherical aberration with zooming. The third lens unit is constructed with a positive lens and cemented lens of a positive lens and a negative lens to form two groups with three members. The fifth lens unit is constructed with a cemented lens of a negative lens and a positive lens to form one group with two members. The sixth lens unit is constructed with a cemented lens of a negative lens and a positive lens to form one group with two members. With these, the variation of aberrations with zooming is corrected for high optical performance throughout the entire zooming range.

Next, numerical examples 4 to 7 of the invention are shown. In the numerical data for the examples 4 to 7, Ri is the radius of curvature of the i-th lens surface, when counted from the object side, Di is the i-th axial thickness or air separation, when counted from the object side, and Ni and νi are respectively the refractive index and Abbe number of the glass of the i-th lens element, when counted from the object side.

NUMERICAL EXAMPLE 4

Focal Length: 76.50–293.52; F-number: 4.1–5.8

| | | | |
|---|---|---|---|
| R1 = 88.37 | D1 = 2.8 | N1 = 1.80518 | ν1 = 25.4 |
| R2 = 58.63 | D2 = 6.8 | N2 = 1.51633 | ν2 = 64.2 |
| R3 = 2198.36 | D3 = 0.2 | | |
| R4 = 184.51 | D4 = 4.6 | N3 = 1.48749 | ν3 = 70.2 |
| R5 = −437.16 | D5 = Variable | | |
| R6 = −109.28 | D6 = 1.5 | N4 = 1.77250 | ν4 = 49.6 |
| R7 = 68.67 | D7 = 4.5 | | |
| R8 = −43.04 | D8 = 1.5 | N5 = 1.51633 | ν5 = 64.2 |
| R9 = 71.91 | D9 = 3.5 | N6 = 1.84666 | ν6 = 23.8 |
| R10 = −762.51 | D10 = Variable | | |
| R11 = 91.13 | D11 = 4.3 | N7 = 1.60311 | ν7 = 60.7 |
| R12 = −79.05 | D12 = 0.2 | | |
| R13 = 55.87 | D13 = 4.5 | N8 = 1.48749 | ν8 = 70.2 |
| R14 = −78.29 | D14 = 1.5 | N9 = 1.83400 | ν9 = 37.2 |
| R15 = 302.40 | D15 = 2.5 | | |
| R16 = (Stop) | D16 = Variable | | |
| R17 = −37.76 | D17 = 2.5 | N10 = 1.51633 | ν10 = 64.2 |
| R18 = −42.46 | D18 = Variable | | |
| R19 = 50.91 | D19 = 2.0 | N11 = 1.80518 | ν11 = 25.4 |
| R20 = 30.74 | D20 = 6.0 | N12 = 1.51633 | ν12 = 64.2 |
| R21 = −106.16 | D21 = Variable | | |
| R22 = −41.02 | D22 = 1.5 | N13 = 1.77250 | ν13 = 49.6 |
| R23 = 73.44 | D23 = 3.7 | N14 = 1.80518 | ν14 = 25.4 |
| R24 = −197.05 | | | |

| Variable Separations | Focal Length | | |
|---|---|---|---|
| | 76.50 | 133.51 | 293.52 |
| D5 | 4.00 | 31.50 | 59.00 |
| D10 | 32.94 | 21.72 | 2.50 |
| D16 | 4.00 | 15.22 | 34.44 |
| D18 | 17.41 | 11.35 | 34.10 |
| D22 | 27.83 | 22.54 | 3.00 | ln $Z_2$/ln Z=0.8975; f1/$\sqrt{fW \cdot fT}$=0.8742

NUMERICAL EXAMPLE 5

Focal Length: 76.52–299.96; F-number: 4.1–5.8

| | | | |
|---|---|---|---|
| R1 = 101.86 | D1 = 2.8 | N1 = 1.80518 | ν1 = 25.4 |
| R2 = 66.06 | D2 = 6.8 | N2 = 1.51633 | ν2 = 64.2 |
| R3 = −2991.10 | D3 = 0.2 | | |
| R4 = 160.98 | D4 = 4.6 | N3 = 1.48749 | ν3 = 70.2 |
| R5 = −491.58 | D5 = Variable | | |
| R6 = −141.58 | D6 = 1.5 | N4 = 1.77250 | ν4 = 49.6 |
| R7 = 63.57 | D7 = 4.5 | | |
| R8 = −45.92 | D8 = 1.5 | N5 = 1.51633 | ν5 = 64.2 |
| R9 = 55.41 | D9 = 3.5 | N6 = 1.84666 | ν6 = 23.8 |
| R10 = 549.96 | D10 = Variable | | |
| R11 = 101.98 | D11 = 4.3 | N7 = 1.60311 | ν7 = 60.7 |
| R12 = −97.26 | D12 = 0.2 | | |
| R13 = 60.55 | D13 = 4.5 | N8 = 1.48749 | ν8 = 70.2 |
| R14 = −58.42 | D14 = 1.5 | N9 = 1.83400 | ν9 = 37.2 |
| R15 = 2309.85 | D15 = 2.5 | | |
| R16 = (Stop) | D16 = Variable | | |
| R17 = 62.59 | D17 = 4.0 | N10 = 1.51633 | ν10 = 64.2 |
| R18 = 46.98 | D18 = Variable | | |
| R19 = 75.37 | D19 = 2.0 | N11 = 1.80518 | ν11 = 25.4 |
| R20 = 47.71 | D20 = 6.0 | N12 = 1.51112 | ν12 = 60.5 |
| R21 = −107.42 | D21 = Variable | | |
| R22 = −43.25 | D22 = 1.5 | N13 = 1.77250 | ν13 = 49.6 |
| R23 = −137.02 | D23 = 3.7 | N14 = 1.80518 | ν14 = 25.4 |
| R24 = −69.56 | | | |

| Variable Separations | Focal Length | | |
|---|---|---|---|
| | 76.52 | 156.31 | 299.96 |
| D5 | 4.00 | 31.50 | 59.00 |
| D10 | 41.16 | 22.48 | 3.90 |
| D16 | 4.00 | 22.68 | 41.26 |
| D18 | 17.90 | −3.18 | 20.03 |
| D22 | 45.25 | 31.82 | 8.27 | ln $Z_2$/ln Z=0.8799; f1/$\sqrt{fW \cdot fT}$=0.8644

NUMERICAL EXAMPLE 6

Focal Length: 77.37–291.70; F-number: 4.1–5.8

| | | | |
|---|---|---|---|
| R1 = 72.66 | D1 = 2.8 | N1 = 1.80518 | ν1 = 25.4 |
| R2 = 47.75 | D2 = 9.0 | N2 = 1.51633 | ν2 = 64.2 |
| R3 = −421.68 | D3 = 0.2 | | |
| R4 = 189.95 | D4 = 4.6 | N3 = 1.48749 | ν3 = 70.2 |
| R5 = 439.01 | D5 = Variable | | |

-continued

| | | | |
|---|---|---|---|
| R6 = −94.89 | D6 = 1.5 | N4 = 1.77250 | ν4 = 49.6 |
| R7 = 51.91 | D7 = 4.5 | | |
| R8 = −73.79 | D8 = 1.5 | N5 = 1.51633 | ν5 = 64.2 |
| R9 = 54.29 | D9 = 3.5 | N6 = 1.84666 | ν6 = 23.8 |
| R10 = 535.37 | D10 = Variable | | |
| R11 = 55.67 | D11 = 6.5 | N7 = 1.60311 | ν7 = 60.7 |
| R12 = −57.70 | D12 = 0.2 | | |
| R13 = 54.57 | D13 = 6.2 | N8 = 1.48749 | ν8 = 70.2 |
| R14 = −46.16 | D14 = 1.5 | N9 = 1.83400 | ν9 = 37.2 |
| R15 = 589.80 | D15 = 2.5 | | |
| R16 = (Stop) | D16 = Variable | | |
| R17 = −37.95 | D17 = 2.0 | N10 = 1.80518 | ν10 = 25.4 |
| R18 = −29.85 | D18 = 2.0 | N11 = 1.51633 | ν11 = 64.2 |
| R19 = −404.46 | D19 = Variable | | |
| R20 = 55.41 | D20 = 2.0 | N12 = 1.80518 | ν12 = 25.4 |
| R21 = 26.63 | D21 = 6.0 | N13 = 1.51633 | ν13 = 64.2 |
| R22 = −48.33 | D22 = Variable | | |
| R23 = −36.80 | D23 = 1.5 | N14 = 1.77250 | ν14 = 49.6 |
| R24 = 66.11 | D24 = 3.7 | N15 = 1.80518 | ν15 = 25.4 |
| R25 = −179.29 | | | |

| Variable | Focal Length | | |
|---|---|---|---|
| Separations | 77.37 | 114.23 | 291.70 |
| D5 | 4.00 | 24.00 | 44.00 |
| D10 | 33.17 | 26.84 | 0.60 |
| D16 | 2.01 | 8.33 | 34.58 |
| D19 | 10.91 | 12.19 | 14.95 |
| D23 | 27.29 | 20.54 | 2.18 | ln $Z_2$/ln $Z$=0.5623; f1/$\sqrt{fW \cdot fT}$=0.8626

NUMERICAL EXAMPLE 7

Focal Length: 76.60–291.94; F-number: 4.1–5.8

| | | | |
|---|---|---|---|
| R1 = 105.68 | D1 = 2.8 | N1 = 1.80518 | ν1 = 25.4 |
| R2 = 66.24 | D2 = 6.8 | N2 = 1.51633 | ν2 = 64.2 |
| R3 = −729.65 | D3 = 0.2 | | |
| R4 = 207.49 | D4 = 4.6 | N3 = 1.48749 | ν3 = 70.2 |
| R5 = −314.15 | D5 = Variable | | |
| R6 = −98.99 | D6 = 1.5 | N4 = 1.77250 | ν4 = 49.6 |
| R7 = 71.80 | D7 = 4.5 | | |
| R8 = −33.15 | D8 = 1.5 | N5 = 1.51633 | ν5 = 64.2 |
| R9 = 81.89 | D9 = 3.5 | N6 = 1.84666 | ν6 = 23.8 |
| R10 = −162.12 | D10 = Variable | | |
| R11 = 72.84 | D11 = 4.3 | N7 = 1.60311 | ν7 = 60.7 |
| R12 = −67.18 | D12 = 0.2 | | |
| R13 = 56.13 | D13 = 4.5 | N8 = 1.48749 | ν8 = 70.2 |
| R14 = −56.03 | D14 = 1.5 | N9 = 1.83400 | ν9 = 37.2 |
| R15 = 146.88 | D15 = 2.5 | | |
| R16 = (Stop) | D16 = Variable | | |
| R17 = −36.43 | D17 = 2.5 | N10 = 1.51633 | ν10 = 64.2 |
| R18 = −43.73 | D18 = Variable | | |
| R19 = 45.08 | D19 = 2.0 | N11 = 1.80518 | ν11 = 25.4 |
| R20 = 31.75 | D20 = 7.0 | N12 = 1.51112 | ν12 = 60.5 |
| R21 = −111.22 | D21 = Variable | | |
| R22 = −41.36 | D22 = 1.5 | N13 = 1.77250 | ν13 = 49.6 |
| R23 = 193.42 | D23 = 3.7 | N14 = 1.80518 | ν14 = 25.4 |
| R24 = −149.01 | | | |

| Variable | Focal Length | | |
|---|---|---|---|
| Separations | 76.60 | 119.14 | 291.94 |
| D5 | 4.00 | 31.50 | 59.00 |
| D10 | 35.27 | 27.29 | 2.12 |
| D16 | 25.05 | 33.04 | 58.20 |
| D18 | 5.62 | 8.76 | 25.13 |
| D21 | 24.30 | 21.17 | 4.79 | ln $Z_2$/ln $Z$=0.9199; F1/$\sqrt{fW \cdot fT}$=0.8614

According to the invention, as described above, the zoom lens is constructed with six lens units of specified refractive power arrangement, and proper rules are set forth for the refractive powers of the lens units and for the relation in which the lens groups move to effect zooming. With these, the number of constituent lenses is reduced and the total length of the entire system is shortened, while still permitting high optical performance to be maintained throughout the entire zooming range. Thus, a zoom lens of the telephoto type having a range of about 4 with improvements of the image quality and compact form is achieved.

Next, the above-described zoom lens is improved in order to insure that part of this zoom lens can be decentered to stabilize the image. Such a zoom lens is described below.

Figure 15:
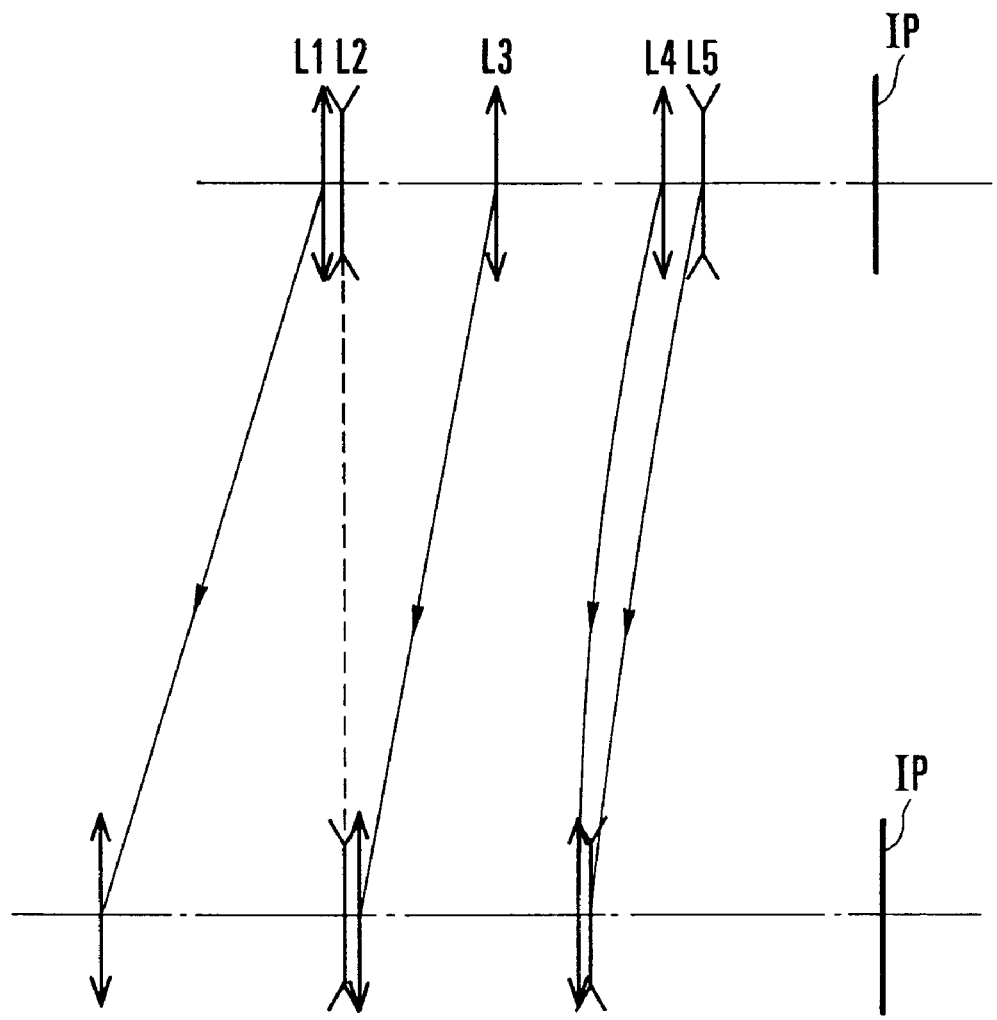
FIG. 15 is a schematic diagram of the paraxial refractive power arrangements of a numerical example 8 of a zoom lens of the invention.
Figure 16A:
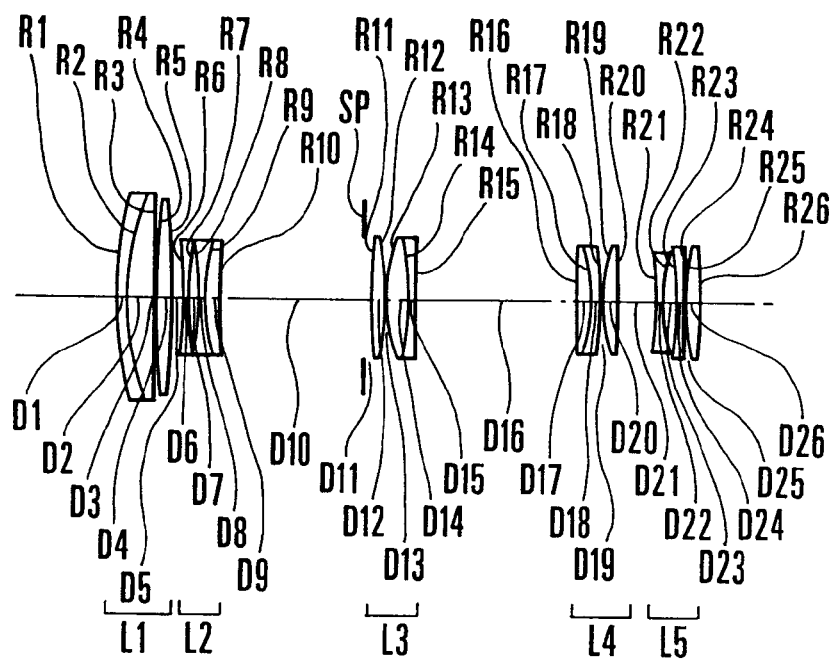
FIGS. 16(A), 16(B) and 16(C) are lens block diagrams of the numerical example 8 of the invention.
Figure 16B:
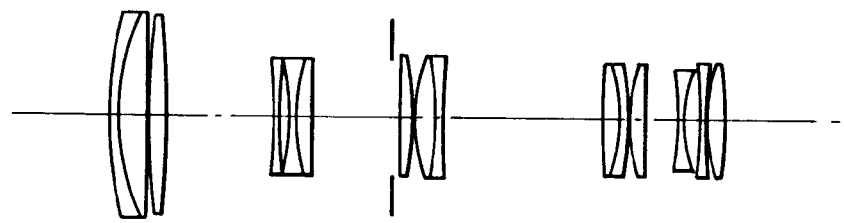
Figure 16C:
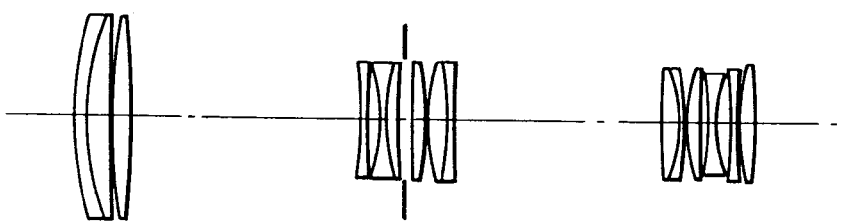
Figure 17:
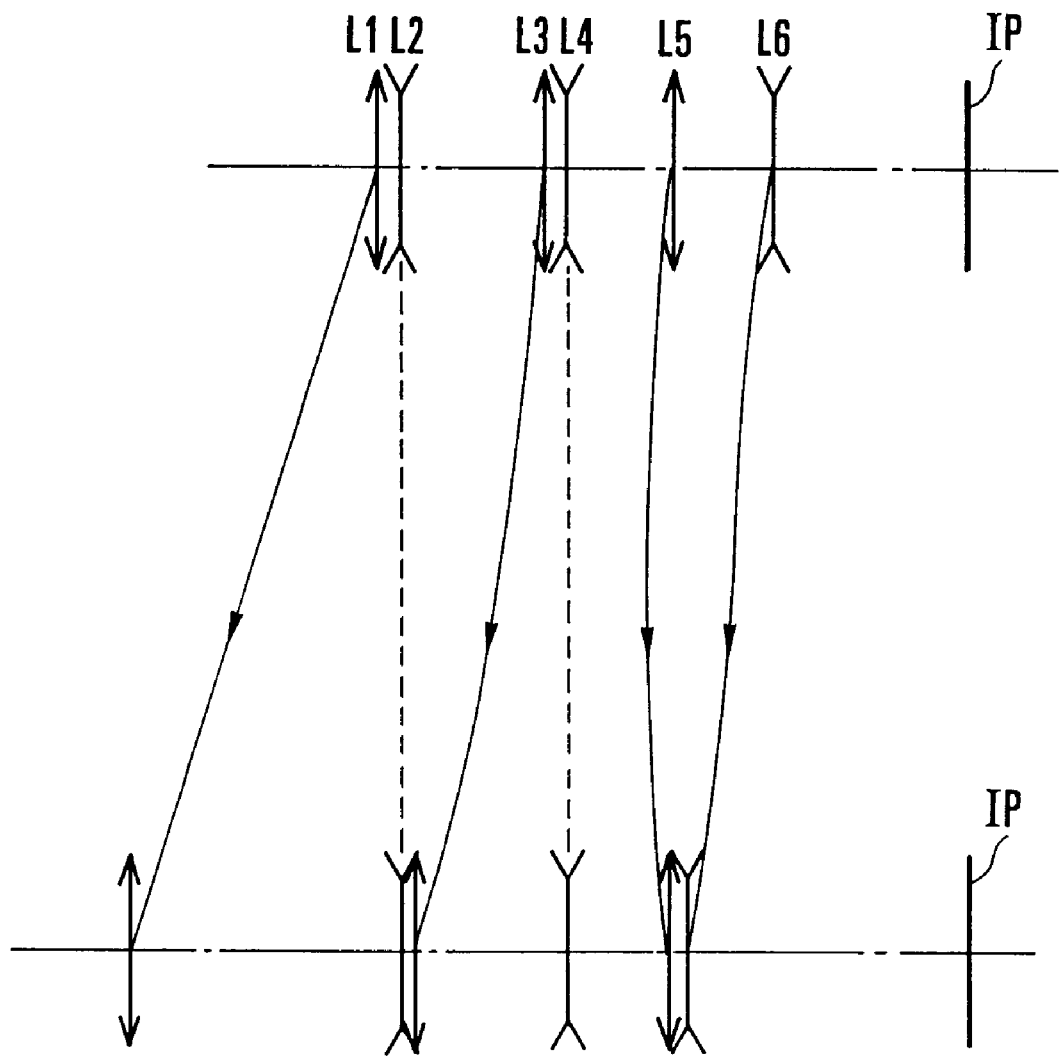
FIG. 17 is a schematic diagram of the paraxial refractive power arrangements of a numerical example 9 of a zoom lens of the invention.
Figure 18A:
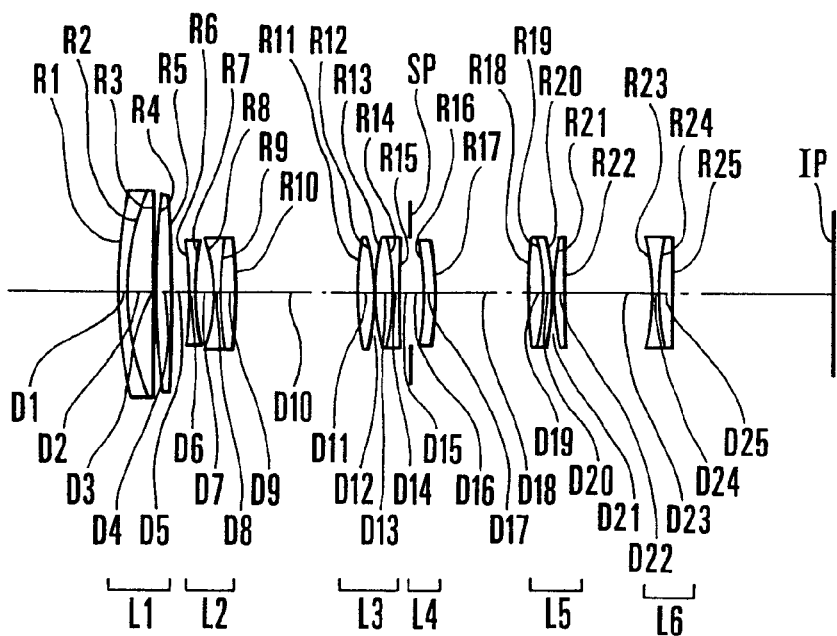
FIGS. 18(A), 18(B) and 18(C) are lens block diagrams of the numerical example 9 of the invention.
Figure 18B:
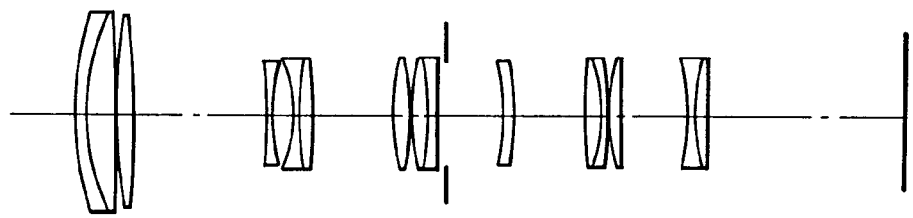
Figure 18C:
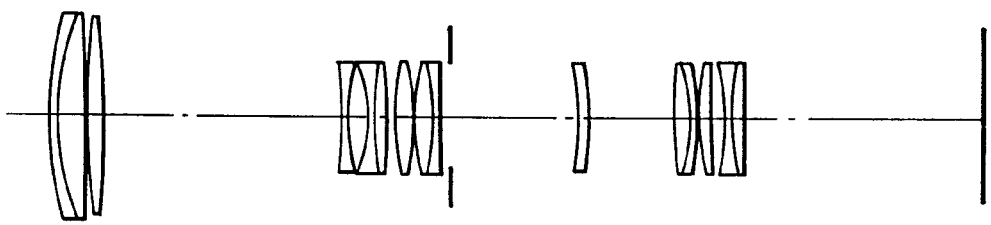

FIG. 15 is a diagram of geometry to explain the variation of paraxial refractive power arrangement and FIGS. 16(A), 16(B) and 16(C) are longitudinal section views of a numerical example 8 of a zoom lens employing the form of FIG. 15. FIG. 17 and FIGS. 18(A), 18(B) and 18(C) are a diagram of geometry and longitudinal section views of a numerical example 9 of a zoom lens. In FIG. 15 and FIG. 17, the upper half represents the wide-angle side, and the lower half the telephoto side. The arrows indicate the loci of the lens units when zooming from the wide-angle end to the telephoto end. Of the lens block diagrams, FIGS. 16(A) and 18(A) are in the wide-angle end, FIGS. 16(B) and 18(B) are in a middle position and FIGS. 16(C) and 18(C) in the telephoto end.

In the numerical example 8 of FIG. 15 and FIGS. 16(A), 16(B) and 16(C), the zoom lens comprises, from front to rear, a first lens unit L1 of positive refractive power, a second lens unit L2 of negative refractive power, a third lens unit L3 of positive refractive power, a fourth lens unit L4 of positive refractive power and a fifth lens unit L5 of negative refractive power. SP stands for a stop and IP for an image plane. When zooming from the wide-angle end to the telephoto end, the second lens unit remains stationary, while the first, third, fourth and fifth lens units move axially in differential relation as indicated by the arrows. The second lens unit is used as a decentering lens unit arranged on vibrations of the optical system to move in directions perpendicular to an optical axis to correct the shaking of an image.

In the numerical example 9 of FIG. 17 and FIGS. 18(A), 18(B) and 18(C), the zoom lens comprises, from front to rear, a first lens unit L1 of positive refractive power, a second lens unit L2 of negative refractive power, a third lens unit L3 of positive refractive power, a fourth lens unit L4 of negative, refractive power, a fifth lens unit L5 of positive refractive power and a sixth lens unit L6 of negative refractive power. SP stands for a stop and IP for an image plane. When zooming from the wide-angle end to the telephoto end, the second and fourth lens units remain stationary, while the first, third, fifth and sixth lens units move axially in differential relation as indicated by the arrows. The second lens unit is used as a decentering lens unit arranged on vibrations of the optical system to move in directions perpendicular to an optical axis to correct the shaking of an image.

As is understandable from the foregoing, the invention uses at least three lens units in constructing a zoom lens. Of these, at least two are made to move along a common optical axis to effect zooming. In the space between the two movable lens units for zooming there is positioned a lens unit stationary during zooming. This lens unit is made to move to directions perpendicular to the optical axis in such a way that when the optical system vibrates, the shaking of an image is corrected.

In particular, in the invention, a zoom lens comprises, from front to rear, a first lens unit having a positive refractive power and axially movable for zooming, a second lens unit having a negative refractive power and stationary during zooming, and a rear lens unit comprised of at least one lens sub-unit, or a plurality of lens sub-units, axially movable for zooming and whose overall refractive power is positive, wherein the second lens unit is made to move in directions perpendicular to the optical axis to correct the shaking of an image when the optical system vibrates.

With the features described above, the invention is to correct the shaking of the image with respect to a shooting line, and at the same time to minimize the decentering aberrations the second lens unit produces when moved (decentered) in the directions perpendicular to the optical axis, thus maintaining good optical performance.

In the numerical example 8 of FIG. 15 and FIGS. 16(A), 16(B) and 16(C), letting the separation between the i-th and (i+1)st lens units for the wide-angle end and the telephoto end be denoted by DiW and DiT, respectively, when zooming from the wide-angle end to the telephoto end, the selected ones of the lens units are moved in such relation as to satisfy the following conditions:

D1W<D1T

D2W>D2T

D4W>D4T

In the numerical example 8, during zooming, the lens units are moved so as to satisfy the above-described conditions, thereby obtaining a zoom lens of high zoom ratio with minimization of the entire lens system. It is to be noted that, in the present embodiment, the second lens unit may otherwise be made axially movable for zooming. According to this, it becomes easier to extend the zooming range, and the variation of aberrations with zooming can be corrected well.

In the numerical example 9 of FIG. 17 and FIGS. 18(A), 18(B) and 18(C), letting the separation between the i-th and (i+1)st lens units for the wide angle end and the telephoto end be denoted by DiW and DiT, respectively, when zooming from the wide-angle end to the telephoto end, the selected ones of the lens units are moved in such relation as to satisfy the following conditions:

D1W<D1T

D2W>D2T

D3W<D3T

D5W>D5T

In the numerical example 9, during zooming, the lens units are moved in such relation as to satisfy the conditions described above, thereby minimizing the size of the entire lens system, so that a zoom lens of high range is obtained. It is to be noted that in the present embodiment, the second lens unit may otherwise be made axially movable for zooming. According to this, it becomes easier to extend the zooming range. Also, the variation of aberrations with zooming can be corrected well.

In the numerical examples 8 and 9, it is preferred to set forth additional conditions in order to fulfill the requirements of minimizing the bulk and size of the entire lens system and of reducing the decentering aberrations when the shaking of an image is corrected for good stability of optical performance.

(i) The focal length fa of the aforesaid decentering lens unit lies in a range given by the following condition:

$$0.15 < |fa/\sqrt{fW \cdot fT}| < 0.5 \quad (6)$$

where fW and fT are the shortest and longest focal lengths of the entire system, respectively.

The inequalities of condition (6) give a range for the ratio of the focal length of the decentering lens unit (second lens unit) to the shortest and longest focal lengths of the zoom lens. When the lower limit of the condition (6) is exceeded, as this means that the focal length of the decentering lens unit is too short, it becomes difficult to correct well the variation of aberrations with zooming. So, the zoom ratio cannot be much extended as desired. Another problem is that a few lens elements do not suffice for making up the decentering lens unit. So, it is not suited to improve the compact form.

Conversely when the upper limit of condition (6) is exceeded, as this means the focal length of the decentering lens unit is too long, it is advantageous at correcting various aberrations, but the sensitivity of the decentering lens to decentering (the ratio of the deviation of the decentering lens unit to the deviation of the image with respect to the line of sight) becomes impossible to increase. For this reason, the movement of the decentering lens unit for correcting the shaking must be increased. Moreover, the zooming movement of each lens unit increases largely. This is contradictory to improvement of the compact form.

The inequalities of condition (7) give a range for the ratio of the overall focal length for the wide-angle end of those lens units which are positioned ahead of the decentering lens unit that moves in the directions perpendicular to the optical axis when stabilizing an image to the overall focal length of the decentering lens unit and those that are positioned on the object side of the decentering lens unit. The inequalities of condition (8) give a range for the same except for the telephoto end.

The factors in the conditions (7) and (8) virtually represent the ratio of the reduced angles of inclination of the axial light ray in the paraxial zone before and after the decentering lens unit that moves in the directions perpendicular to the optical axis when correcting the shaking. When the refractive power arrangement satisfies these conditions, good correction of decentering aberrations results. Therefore, when the values of the factors fall outside the ranges defined by the conditions (7) and (8), problems arise in that a simple lens construction can no longer correct decentering aberrations well and that the decentering sensitivity can no longer be increased sufficiently.

It is to be noted in connection with the conditions (7) and (8) that the reason why the condition (7) is wider in the numerical range than the condition (8) is that the displacement of the image for an equivalent angle of vibration is smaller when in the wide-angle end than in the telephoto end and, therefore, the amount of decentering aberrations produced, too, becomes lesser.

Next, the optical features of the zoom lens having the image stabilizing function of the invention are described below.

In general, if part of the optical system or one lens unit is parallel decentered to correct the shaking of an image, the image quality is caused to lower by the decentering aberrations produced. Now assuming that in any refractive power arrangement, a lens unit is made movable in directions perpendicular to the optical axis for the purpose of correcting the shaking of an image, an explanation will be made about the production of decentering aberrations from the standpoint of the aberration theory on the basis of the method revealed by Yoshiya Matsui at the 23rd lecture meeting on applied physics in Japan (1962).

When part of the zoom lens, say lens unit P, is parallel decentered by E, the amount of aberrations ΔY1 the entire system produces is expressed by an equation (a) of the sum of the amount of aberrations ΔY that occurs before the decentering and the amount of decentering aberrations ΔY(E) produced by the decentering. Here, the amount of aberrations ΔY is expressed by spherical aberration (I), coma (II), astigmatism (III), Petzval sum (P) and distortion (Y). The amount of decentering aberrations ΔY(E) is expressed by an equation (c) of primary decentering coma (IIE), primary decentering astigmatism (IIIE), primary decentering curvature of field (PE), primary decentering distortion (VE1), primary decentering distortion added aberration (VE2), and primary original point movement (ΔE).

Equations (d) to (i) for the aberrations (ΔE) to (VE2) are expressed under the condition that for the zoom lens having the lens unit P made to parallel decenter, the on-axial and off-axial light rays are incident on the lens unit P at an angle $\alpha_p$, $\alpha a_p$, by using the aberration coefficients $I_p$, $II_p$, $III_p$, $P_p$ and $V_p$ of the lens unit P and also, as those lens units which are positioned on the image side of the lens unit P are all taken as one q-th lens unit, by using its aberration coefficients $I_q$, $II_q$, $III_q$, $P_q$ and $V_q$.

$$\Delta Y1 = \Delta Y + \Delta Y(E) \quad (a)$$

$$\Delta Y = -(1/(2\alpha_{K}'))((N_1 \tan \omega)^3 \cos \phi\omega \cdot V + (N_1 \tan \omega)^2 R(2 \cos \phi\omega \cos(\phi_R - \phi\omega) \cdot III + \cos \phi_R(III+P)) + (N_1 \tan \omega)R^2(2 \cos \phi_R \cos(\phi_R - \phi\omega) + \cos \phi\omega) \cdot II + R^3 \cos \phi \cdot I) \quad (b)$$

$$\Delta Y(E) = -(E/(2\alpha_{K}'))((N_1 \tan \omega)^2((2 + \cos 2\phi\omega)(VE1) - (VE2)) + 2(N_1 \tan \omega)R((2 \cos(\phi_R - \phi\omega) + \cos(\phi_R + \phi\omega))(IIIE) + \cos \phi_R \cos \phi\omega \cdot (PE)) + R^2(2 + \cos 2\phi_R)(IIE)) - (E/(2\alpha_{K}'))(\Delta E) \quad (c)$$

$$(\Delta E) = -2(\alpha'_p - \alpha_p) = -2h_p \phi_p \quad (d)$$

$$(IIE) = \alpha a_p II_q - \alpha_p(II_p + II_q) - \alpha a_p' I_q + \alpha a_p(I_p + I_q) = h_p \phi_p II_q - \alpha_p II_p - (h a_p \phi_p I_q - \alpha a_p I_p) \quad (e)$$

$$(III) = \alpha'_p III_q - \alpha_p(III_p + III_q) - \alpha a_p' II_q + \alpha a_p(II_p + II_q) = h_p \phi_p III_q - \alpha_p III_p - (h a_p \phi_p II_q - \alpha a_p II_p) \quad (f)$$

$$(PE) = \alpha'_p p_q - \alpha_p(P_p + P_q) = h_p \phi_p P_q - \alpha_p P_p \quad (g)$$

$$(VE1) = \alpha'_p V_q - \alpha_p(V_p + V_q) - \alpha a_p' III_q + \alpha a_p(III_p + III_q) = h_p \phi_p V_q - \alpha_p V_p - (h a_p \phi_p III_q - \alpha a_p III_p) \quad (h)$$

$$(VE2) = \alpha a_p P_q - \alpha a_p(P_p + P_q) = h a_p \phi_p P_q - \alpha a_p P_p \quad (i)$$

From the equations described above, to minimize the decentering aberrations produced, it is necessary to make small the values of all the aberration coefficients $I_p$, $II_p$, $III_p$, $P_p$ and $V_p$ of the lens unit P, or to determine them in good balance so that the aberration coefficients cancel each other out as shown by the equations (a) to (i).

Figure 25:
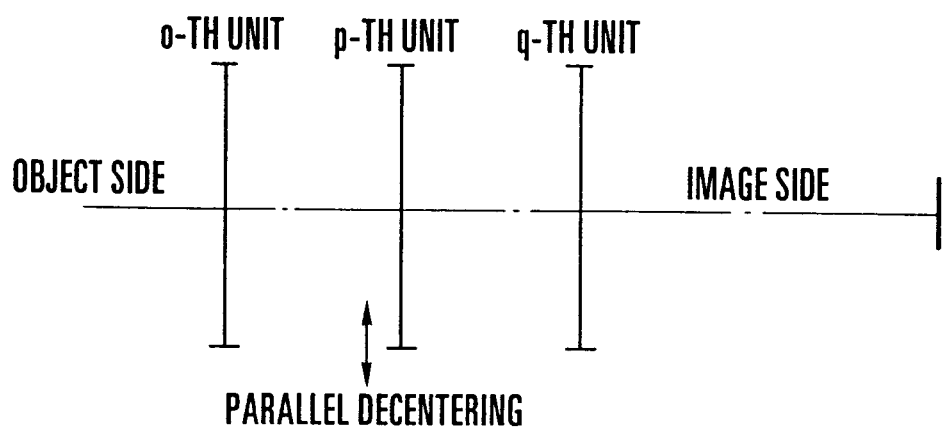
FIG. 25 is a diagram to explain the correction of decentering aberrations according to the invention.

Next, the optical action of the zoom lens having the image stabilizing function of the invention is described by taking a model on the assumption that the photographic optical system shown in FIG. 25 is moved in part in a direction perpendicular to the optical axis to effect decentering, when the shaking of the image is corrected.

First, to realize a sufficiently large correction by a sufficiently small decentering movement, it is necessary to make sufficiently large the primary original point movement (ΔE) described above. With this in mind, a condition is considered for correcting the primary decentering field curvature (PE). FIG. 25 shows a photographic optical system comprising, from front to rear, an o-th lens unit, a p-th lens unit and a q-th lens unit, totaling three lens units. Of these, the p-th lens unit is parallel moved in the direction perpendicular to the optical axis to correct the shaking of the image.

Here, the refractive powers of the o-th, p-th and q-th lens units are denoted by $\phi_o$, $\phi_p$ and $\phi_q$, respectively, the angles of incidence of the paraxial on-axial and off-oxial light rays on any of these lens units by α and αa, the heights of incidence of the paraxial on-axial and off-axial light rays by h and ha. The aberration coefficients, too, are expressed by using similar suffixes. It is also assumed that the lens units each are constructed with a small number of lens elements, and that each of the aberration coefficients tends to be under-corrected individually.

Under such a premise, on looking at the Petzval sum of each of the lens units, the Petzval sums $P_o$, $P_p$ and $P_q$ of the lens units are proportional to the refractive powers $\phi_o$, $\phi_p$ and $\phi_q$ of the lens units, approximately satisfying the following relationships:

$$P_o = C\phi_o$$
$$P_p = C\phi_p$$
$$P_q = C\phi_q \text{ (where C is a constant)} \quad (1)$$

Therefore, the primary decentering field curvature (PE) that is produced when the p-th lens unit is parallel decentered, can be rearranged by inserting the equations described above as follows:

$$(PE) = C\phi_p(h_p \phi_q - \alpha_p) \quad (m)$$

To correct the decentering field curvature (PE), therefore, either $\phi_p = 0$ or $\phi_q = \alpha_p/h_p$ must be put. If $\phi_p = 0$ is used, the original point movement (ΔE) of first degree becomes "0" and correction of the shaking becomes impossible to perform. So, a solution to satisfy $\phi_q = \alpha_p/h_p$ has to be sought for. Because $h_p > 0$, it is at least necessary to make ap and $\alpha_p$ and $\phi_q$ of the same sign.

(i) For $\alpha_p > 0$

To correct the decentering field curvature, $\phi_q > 0$ results. Again, inevitably $\phi_o > 0$ results. Further, at this time, if $\phi_p > 0$, $0 < \alpha_p < \alpha'_p < 1$. Hence, the primary original point movement (ΔE) is given by the following expression:

$$(\Delta E) = -2(\alpha_p' - \alpha_p) > -2 \quad (n)$$

That is, the decenter sensitivity (the ratio of the deviation of the image to the unity of deviation of the decentering lens unit) becomes smaller than "1". If $\phi_p = 0$, as described before, the decenter sensitivity is "0". Therefore, in such a case, it is necessary to have $\phi_p < 0$.

(ii) For $\alpha_p < 0$

To correct the decentering field curvature (PE), $\phi_q < 0$ results. Again, inevitably $\phi_o < 0$ results. Therefore, further inevitably, $\phi_p > 0$ results.

From the above, to make sufficiently large the primary original point movement (ΔE) and make it possible to correct the primary decentering field curvature (PE), the optical system must take one of the following refractive power arrangements:

| Lens Unit: | | o | p | q |
|---|---|---|---|---|
| Power Arrangement | a: | plus | minus | plus |
| | b: | minus | plus | minus |

Figure 26A:
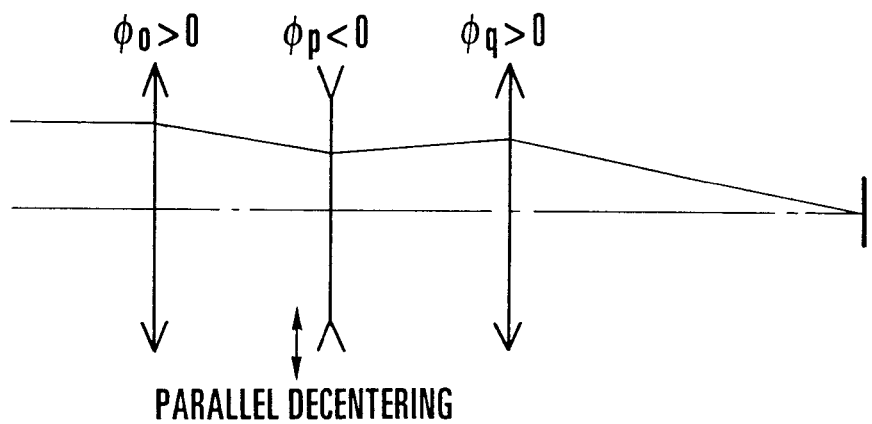
FIGS. 26(A) and 26(B) are diagrams to explain the correction of decentering aberrations according to the invention.
Figure 26B:
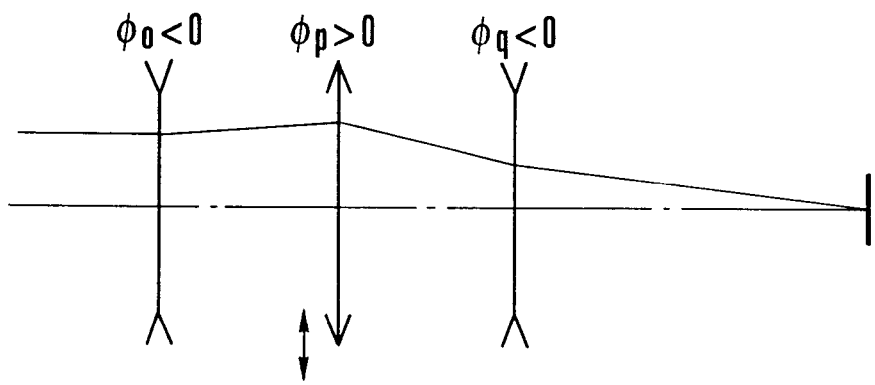
Figure 27A:
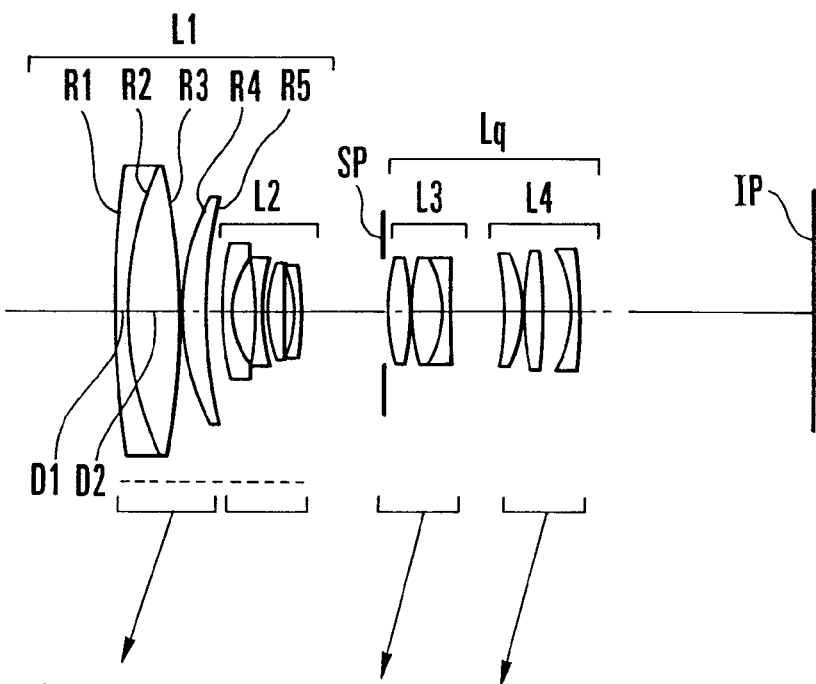
FIGS. 27(A), 27(B) and 27(C) are lens block diagrams of a numerical example 10 of the invention.
Figure 27B:
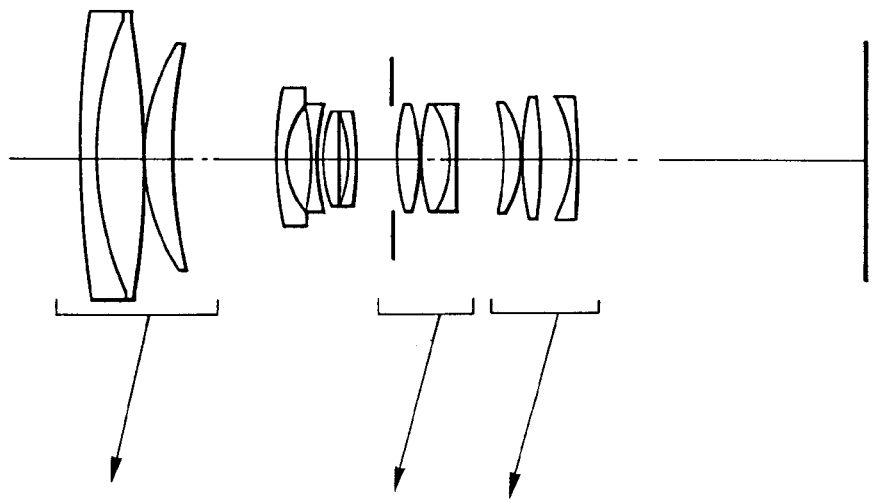
Figure 27C:
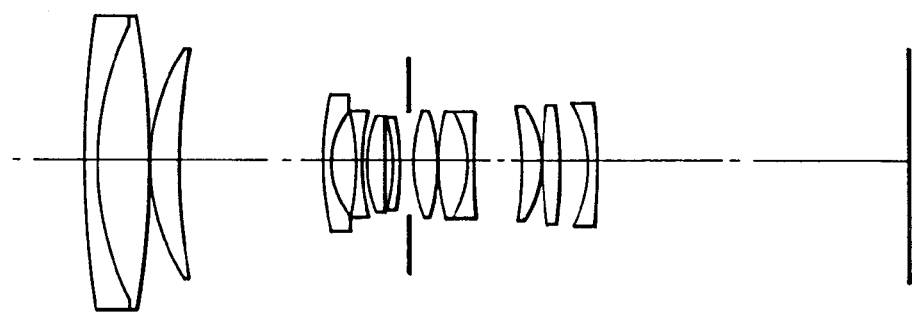
Figure 28A:
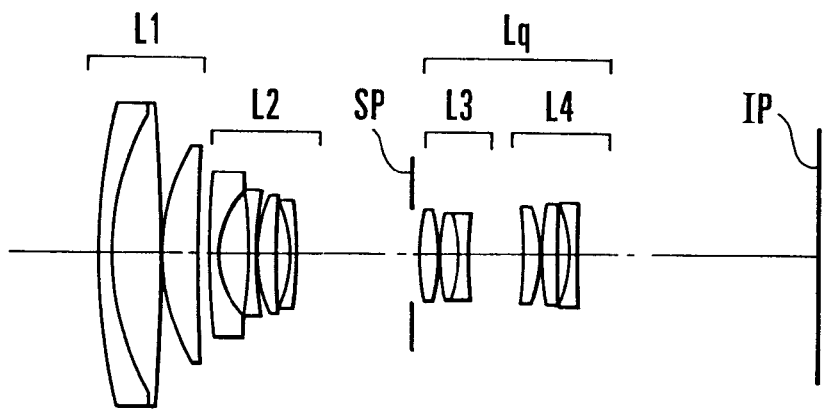
FIGS. 28(A), 28(B) and 28(C) are lens block diagrams of a numerical example 11 of the invention.
Figure 28B:
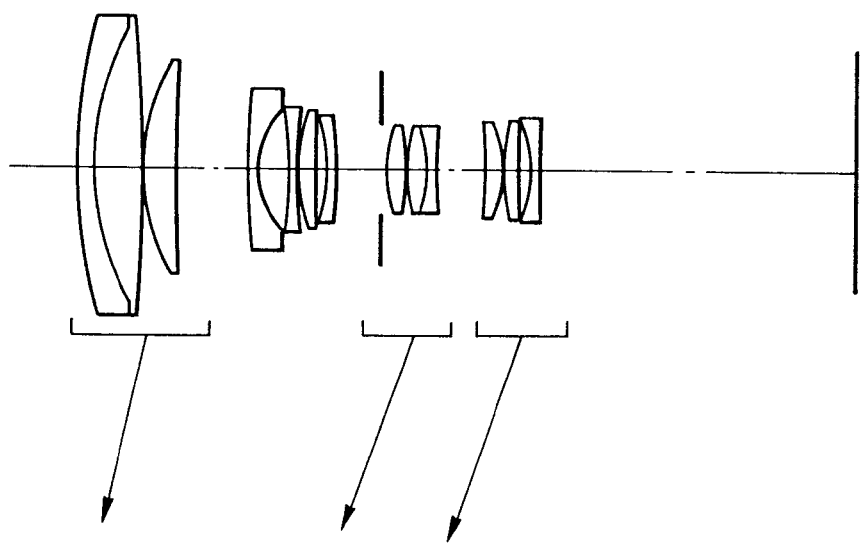
Figure 28C:
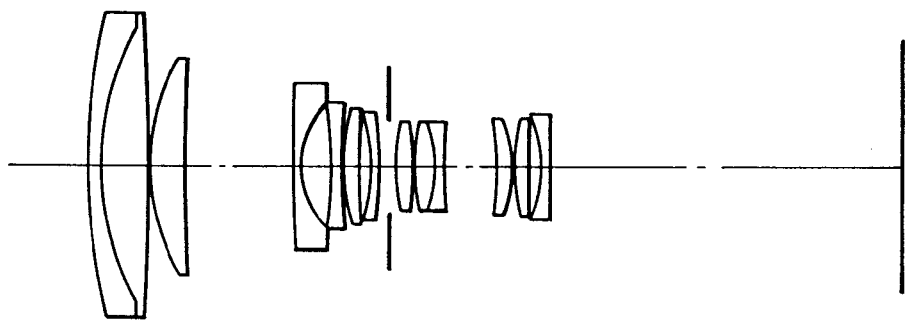
Figure 29A:
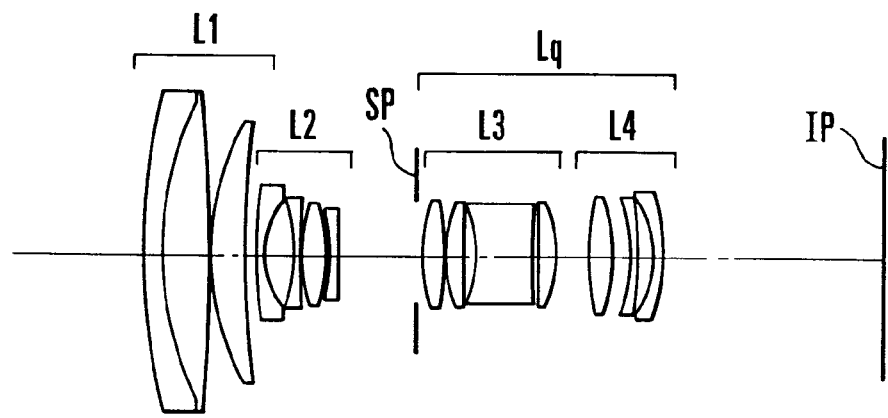
FIGS. 29(A), 29(B) and 29(C) are lens block diagrams of a numerical example 12 of the invention.
Figure 29B:
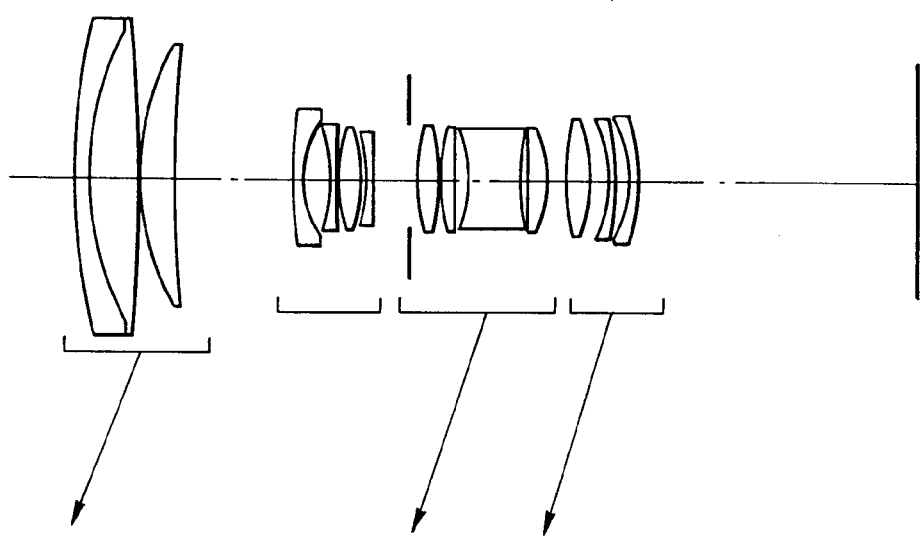
Figure 29C:
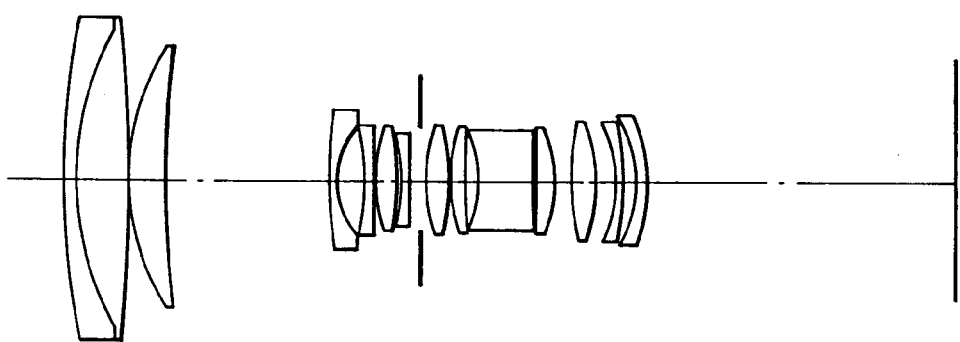

These refractive power arrangements are illustrated in FIGS. 26(A) and 26(B) respectively.

In the invention, using such a refractive power arrangement, the zoom lens is constructed. In general, for the zoom lens, proper rules for the refractive powers of all the lens units are set forth in order that a sufficiently large effect of varying the focal length is realized with the entire system in the compact form and at the same time all aberrations are corrected well. To this purpose, it is better that those lens units which contribute to the variation of the focal length have relatively strong refractive powers. Also to correct well the variation of aberrations with zooming, it is better that those lens units which have their residual aberrations minimized within themselves are selected to be movable for zooming.

Which one of the lens units of the zoom lens should be selected to parallel decenter in directions perpendicular to the optical axis when the shaking of an image is corrected is an important problem. To form such a zoom lens, from the standpoints of providing the possibility of sufficiently increasing the decenter sensitivity and of making it relatively easy to correct decentering aberrations, there is a method that one of the movable lens units for zooming is applied directly to the parallel decentering lens unit.

Meanwhile, for the purpose of improving the compact form of the housing itself, it is desirable that, as the parallel decentering lens unit, a lens unit of relatively short outer diameter is selected. To prevent the operating mechanism from becoming complicated, it is also desirable to select the fixed lens unit for zooming as the parallel decentering lens unit.

In the invention, from the standpoints described above, the zoom lens configuration to be used has the refractive power power arrangement shown in FIG. 26(A) or 26(B), and the o-th and q-th lens units are axially moved during zooming, while the p-th lens unit remains stationary.

In the present invention, not only the movable lens units for zooming are constructed in such a fundamental form, but also the o-th and q-th lens units each may be either in the form of one lens unit, or divided into a plurality of lens units. According to this, it is possible to realize a zoom lens which is well corrected for all aberrations. Though each of the foregoing embodiments has been described as arranging the second lens unit to parallel decenter, it is to be understood that, instead of the parallel decentering, it may be rotated about a point on the optical axis so that the shaking of the image is corrected.

Next, numerical examples 8 and 9 of the invention are shown. In the numerical data for the examples 8 and 9, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

NUMERICAL EXAMPLE 8

| R1 = 101.63 | D1 = 2.8 | N1 = 1.80518 | v1 = 25.4 |
| R2 = 65.89 | D2 = 6.8 | N2 = 1.51633 | v2 = 64.2 |
| R3 = 1548.89 | D3 = 0.2 | | |
| R4 = 207.11 | D4 = 4.2 | N3 = 1.48749 | v3 = 70.2 |
| R5 = −337.94 | D5 = Variable | | |
| R6 = −125.77 | D6 = 1.5 | N4 = 1.77250 | v4 = 49.6 |
| R7 = 151.03 | D7 = 2.8 | | |
| R8 = −67.50 | D8 = 1.5 | N5 = 1.61800 | v5 = 63.4 |
| R9 = 44.49 | D9 = 3.4 | N6 = 1.84666 | v6 = 23.8 |
| R10 = 125.21 | D10 = Variable | | |
| R11 = (Stop) | D11 = 1.5 | | |
| R12 = 157.70 | D12 = 3.7 | N7 = 1.48749 | v7 = 70.2 |
| R13 = −86.24 | D13 = 0.2 | | |
| R14 = 46.44 | D14 = 5.7 | N8 = 1.60311 | v8 = 60.7 |
| R15 = −78.17 | D15 = 1.5 | N9 = 1.83400 | v9 = 37.2 |
| R16 = 308.70 | D16 = Variable | | |
| R17 = 159.74 | D17 = 4.6 | N10 = 1.60311 | v10 = 60.7 |
| R18 = −35.11 | D18 = 1.5 | N11 = 1.80518 | v11 = 25.4 |
| R19 = −118.95 | D19 = 0.2 | | |
| R20 = 38.80 | D20 = 4.0 | N12 = 1.51633 | v12 = 64.2 |
| R21 = 2284.84 | D21 = Variable | | |
| R22 = −68.32 | D22 = 1.5 | N13 = 1.77250 | v13 = 49.6 |
| R23 = 34.06 | D23 = 3.6 | | |
| R24 = −162.72 | D24 = 1.5 | N14 = 1.69680 | v14 = 55.5 |
| R25 = 98.00 | D25 = 0.2 | | |
| R26 = 49.20 | D26 = 4.3 | N15 = 1.80518 | v15 = 25.4 |
| R27 = −185.92 | | | |

| Variable | Focal Length | | |
|---|---|---|---|
| Separations | 76.72 | 135.00 | 291.89 |
| D5 | 3.50 | 28.15 | 58.50 |
| D10 | 37.00 | 21.31 | 2.00 |
| D16 | 40.60 | 40.85 | 52.20 |
| D21 | 9.70 | 8.40 | 2.00 |

$|fa/\sqrt{fW \cdot fT}|=0.295$

NUMERICAL EXAMPLE 9

| R1 = 104.82 | D1 = 2.8 | N1 = 1.80518 | v1 = 25.4 |
| R2 = 65.22 | D2 = 6.6 | N2 = 1.51633 | v2 = 64.2 |
| R3 = 1064.41 | D3 = 0.2 | | |
| R4 = 157.35 | D4 = 4.6 | N3 = 1.51633 | v3 = 64.2 |
| R5 = −339.86 | D5 = Variable | | |
| R6 = −172.44 | D6 = 1.5 | N4 = 1.77250 | v4 = 49.6 |
| R7 = 63.56 | D7 = 4.9 | | |
| R8 = −34.89 | D8 = 1.5 | N5 = 1.51633 | v5 = 64.2 |
| R9 = 78.96 | D9 = 3.5 | N6 = 1.84666 | v6 = 23.8 |
| R10 = −270.70 | D10 = Variable | | |
| R11 = 63.23 | D11 = 4.4 | N7 = 1.60311 | v7 = 60.7 |
| R12 = −77.78 | D12 = 0.2 | | |
| R13 = 57.33 | D13 = 4.8 | N8 = 1.48749 | v8 = 70.2 |
| R14 = −59.18 | D14 = 1.5 | N9 = 1.83400 | v9 = 37.2 |
| R15 = 210.50 | D15 = 3.0 | | |
| R16 = (Stop) | D16 = Variable | | |
| R17 = −58.16 | D17 = 2.5 | N10 = 1.60311 | v10 = 60.7 |
| R18 = −77.22 | D18 = Variable | | |
| R19 = 177.20 | D19 = 4.2 | N11 = 1.60311 | v11 = 60.7 |
| R20 = −42.39 | D20 = 1.5 | N12 = 1.80518 | v12 = 25.4 |
| R21 = −88.25 | D21 = 0.2 | | |
| R22 = 56.85 | D22 = 2.8 | N13 = 1.51633 | v13 = 64.2 |
| R23 = 218.49 | D23 = Variable | | |
| R24 = −44.17 | D24 = 1.5 | N14 = 1.77250 | v14 = 49.6 |
| R25 = 51.97 | D25 = 3.3 | N15 = 1.80518 | v15 = 25.4 |
| R26 = 2229.01 | | | |

| Variable | Focal Length | | |
|---|---|---|---|
| Separations | 76.12 | 135.00 | 291.49 |
| D5 | 4.00 | 33.38 | 59.00 |
| D10 | 31.30 | 20.57 | 2.00 |
| D16 | 4.00 | 14.73 | 33.30 |
| D18 | 23.80 | 18.20 | 21.60 |
| D23 | 22.40 | 17.35 | 3.99 |

$|fa/\sqrt{fW \cdot fT}|=0.275$

According to the invention, the rules of design are set forth as described above. When the shaking of an image is corrected by moving part of the zoom lens in directions perpendicular to the optical axis, a lens unit of small size and light weight is used as the movable lens for decentering. Moreover, the large shaking of the image can be corrected by a small movement of the decentering lens unit. Further, when the decentering lens unit is decentered nearly parallel, the produced amount of each of the decentering aberrations described above is small. Thus, a zoom lens having the image stabilizing capability and good optical performance can be achieved.

In particular, according to the invention, all decentering aberrations are well corrected, and a sufficiently large correction is realized by a sufficiently small decentering movement. The lens units other than the lens unit movable for decentering are made to move axially to effect zooming. With these, a zoom lens having the image stabilizing capability which is small in size and light in weight and able to produce an image of high quality can be achieved.

Next, another embodiment is described where further improvements are made.

FIGS. 27(A), 27(B) and 27(C) to FIGS. 29(A), 29(B) and 29(C) are longitudinal section views of numerical examples 10 to 12 of zoom lenses of the invention. In these drawings, (A) shows the zooming position for the wide angle end, (B) for a middle focal length, and (C) for the telephoto end. The zoom lens comprises, from front to rear, a first lens unit L1 of positive refractive power, a second lens unit L2 of negative refractive power, a third lens unit L3 of positive refractive power and a fourth lens unit L4 of positive refractive power. A stop SP is positioned on the object side of the third lens unit L2 and arranged on zooming to move in unison with the third lens unit L3. IP stands for an image plane. The third lens unit L3 and the fourth lens unit L4 constitute a rear lens unit $L_q$. When zooming from the wide-angle end to the telephoto end, the first lens unit L2, the third lens unit L3 and the fourth lens unit L4 move axially toward the object side. When the zoom lens vibrates, the shaking of the image is corrected (the image is stabilized) by moving the second lens unit L2 as the decentering lens unit in directions perpendicular to the optical axis.

In the invention, the refractive powers of all the lens units, the refractive power arrangement and other design parameters are determined so as to include a wide angle region in which the shortest focal length fW is shorter than the diagonal length of the image frame.

In the invention, the focal length $f_p$ of the second lens unit satisfies the following condition:

$$0.15 < |f_p/(fW \times fT)^{1/2}| < 0.50 \qquad (9)$$

where fW and fT are the shortest and longest focal lengths of the entire system, respectively.

The inequalities of condition (9) give a range for the ratio of the focal length of the second lens unit as the decentering lens unit to the shortest and longest focal lengths of the entire system. When the lower limit of the condition (9) is exceeded, as this means that the focal length of the decentering lens unit is too short, a problem arises in that it becomes difficult to correct the variation of aberrations with zooming and that the zoom ratio cannot be made high enough. Another problem is that the decentering lens unit cannot be constructed with a few lens elements, being not suited to improve the compact form.

Conversely when the upper limit of the condition (9) is exceeded, as this means that the focal length of the decentering lens unit is too long, it is advantageous at correcting various aberrations, but the decenter sensitivity of the decentering lens unit (the ratio of the movement of the decentering lens unit to the displacement of the image) cannot be made large. For this reason, it becomes necessary to increase the movement of the decentering lens unit for image stabilization. Another problem arises in that the zooming movement of each of the lens units increases greatly, being not suited to improve the compact form.

Besides these, in the invention, the second lens unit is made stationary during zooming to thereby facilitate minimization of the size of the housing for the zoom lens and its operating mechanism and to assure improvements of the precision accuracy of the mounting mechanism for the lens system by limiting the probability of occurrence of inclination of the lens units to a minimum.

(A) Next, in the invention, in a case where the third lens unit L3 and the fourth lens unit L4 are treated as a rear lens unit having at least one lens unit, the features are described below.

(A-1) In the invention, the focal length $f_o$ of the first lens unit, the focal length $f_q$ for the telephoto end of the rear lens unit and the principal point interval $e_T$ for the telephoto end between the first and second lens units satisfy the following condition:

$$0.5 < |f_q/(f_o - e_T)| < 1.2 \qquad (10)$$

The inequalities of condition (10) are to properly determine each of the focal lengths of the first lens unit and the rear lens unit which are positioned before and after the second lens unit as the decentering lens unit. In particular, on the assumption that the Petzval sum of each of the lens units is nearly proportional to the refractive power, when this condition is satisfied, it is made possible to correct decentering aberrations well, in other words, to achieve the before-described object by a simple lens configuration. When the upper or lower limit of the condition (10) is exceeded, as this means that the refractive power arrangement over all the lens units is improper, it becomes difficult to realize a zoom lens having the image stabilizing function with the wide-angle region of the compact form. In the condition (10), the lower limit may be altered to 0.6, and the upper limit to 1.0. If so, it becomes easier to realize a zoom lens having a substantially good image stabilizing function.

(A-2) The Petzval sums $P_q$ and $P_q$ of the second lens unit and the rear lens unit, respectively, satisfy the following condition:

$$1.1 < |P_p/P_q| < 1.7 \qquad (11)$$

The inequalities of condition (11) give a range for the ratio of the Petzval sums of the decentering lens unit L2 and the rear lens unit that directly follows. When the lower limit of the condition (11) is exceeded, as this means that the absolute value of the Petzval sum of the decentering lens unit is relatively small, it becomes difficult to correct decentering field curvature. Conversely when the upper limit of the condition (11) is exceeded, as this means that the absolute value of the Petzval sum of the decentering lens unit is relatively large, the Petzval sum of the entire lens system is liable to take a negative value. Therefore, it becomes difficult to well correct field curvature in the non-decentering state.

Also, in the condition (11), the lower limit may be altered to 1.2, and the upper limit to 1.6. If so, it becomes easier to realize a substantially further improved zoom lens. Also, in the condition (11), the lower limit may be further increased to 1.3 and the upper limit to 1.6. If lens materials that satisfy this condition are selected, and the refractive power arrangement is properly determined, it becomes easier to further improve the correction of decentering field curvature.

(B) In another case where the third lens unit L3 and the fourth lens unit L4 are considered to be independent of each other, the invention has features described below.

(B-1) The focal length $f_o$ of the first lens unit, the overall focal length $f_q$ for the telephoto end of the third and fourth lens units and the principal point interval $e_T$ for the telephoto end between the first and second lens units satisfy the following condition:

$$0.5 < |f_q/(f_o - e_T)| < 1.2 \tag{1a}$$

This condition should be satisfied from a similar reason to that of the condition (10).

(B-2) The Petzval sum $P_p$ of the second lens unit and the total sum $P_q$ of the Petzval sum s of the third and fourth lens units satisfy the following condition:

$$1.1 < |P_p/P_q| < 1.7 \tag{12}$$

The inequalities of condition (12) give a range for the ratio of the Petzval sum of the decentering lens unit L2 to the Petzval sum of the lens units that follow toward the image side, or the third and fourth lens units. When the lower limit of the condition (12) is exceeded, as this means that the absolute value of the Petzval sum of the decentering lens unit is relatively small, it becomes difficult to correct decentering field curvature. Conversely when the upper limit of the condition (12) is exceeded, as this means that the absolute value of the Petzval sum of the decentering lens unit is relatively large, the Petzval sum of the entire optical system is liable to take a negative value and it becomes difficult to correct field curvature well in the non-decentering state.

Also in the condition (12), the lower limit may be altered to 1.2 and the upper limit to 1.6. If so, it becomes easier to realize a substantially improved zoom lens. Also, in the condition (12), the lower limit may be further increased to 1.3 and the upper limit to 1.6. If lens materials which satisfy this condition are selected, and the refractive power arrangement is proper, it becomes easier to well correct decentering aberration.

As has been described before, an optical system which accomplishes the objects of the invention employs the refractive power arrangement shown in FIG. 26(A). of course, the q-th lens unit described before may be either one or even divided into a plurality of lens units. The latter is more common for realizing a zoom lens well corrected for aberrations.

So, in the invention, the zoom lens comprises, from front to rear, a first lens unit of positive refractive power, a second lens unit of negative refractive power and a rear lens unit comprised of one or a plurality of lens units and having a positive overall refractive power, totaling at least three lens units, wherein the second lens unit is moved in directions perpendicular to the optical axis when the shaking is corrected.

Here, the equation (m) is explained again. In the ordinary photographic lens, if the object lies at infinity, the initial values for the paraxial light ray can be set as follows:

$$\alpha_o = 0 \tag{o}$$

$$h_o = 1 \tag{p}$$

Here, using the paraxial ray tracing formula, the following equations are obtained:

$$\alpha_p = \alpha_o + h_o\phi_o = \phi_o \tag{q}$$

$$h_p = h_o + e_o\alpha_p = 1 - {}_o\phi_o \tag{r}$$

where $e_o$ is the principal point interval between the first and second lens units.

By inserting the equations (q) and (r) into the equation (m), the following equation is obtained:

$$(PE) = c\phi_p((1 - e_o\phi_o)\phi_q - \phi_o) \tag{s}$$

Therefore, to well correct primary decentering field curvature (PE), $$(1/\phi_q)/((1/\phi_o) - e_o) \approx 1 \tag{t}$$

should be established.

That is, it is desirable to determine the focal length $f_o$ of the first lens unit, the focal length $f_q$ of the rear lens unit and the principal point interval $e_o$ so as to satisfy the following relationship:

$$f_q/(f_o - e_o) \approx 1 \tag{u}$$

Though the foregoing has been described on the assumption that the Petzval sum of every lens unit is proportional to the refractive power, it is in the rear lens unit that this proportional relationship is not always established, depending on the material of the lens and th e number of constituent lenses. If this proportional relationship is regarded as approximately valid, the equation (u) defines a condition of correcting primary decentering field curvature (PE).

Based on th e consideration described above, the invention is applied to a type of zoom lens that includes a wide-angle region in which the shortest focal length of the entire system is shorter than the diagonal length of the image frame. The zoom lens comprises, from front to rear, a first lens unit of positive refractive power, a second lens unit of negative refractive power and a rear lens unit comprised of one or two or more lens units and whose overall refractive power is positive, totaling at least three lens units, wherein the second lens unit is made to move in directions perpendicular to an optical axis to thereby stabilize the image. Another rule of lens design is set forth for the focal length $f_o$ of the first lens unit, the focal length $f_q$ prof the rear lens unit and the principal point interval $e_T$ between the first and second lens units for the telephoto end. When this rule or condition (10) is satisfied, a zoom lens having an image stabilizing function which has solved the subject described before is realized.

The inequalities of condition (10) has an equivalent significance to that of the equation (u) described before. Its upper and lower limits are determined empirically. It should be pointed out that, instead of the principal point interval $e_o$ in the equation (u), the factor in the condition (10) uses the principal point interval for the telephoto end. The reason for this is that the decenter sensitivity is higher when in the telephoto end than when in the wide-angle end and therefore that the produced amount of decentering aberrations for an equivalent decentering movement increases greatly with a high possibility when in the telephoto end. It is, of course, desirable that, even for the wide-angle end, the zoom lens configuration is made likewise to nearly satisfy the equation (u).

The invention is still to apply such principles to more specific zoom lenses. In the invention, as the zoom lens having the image stabilizing function, choice is given mainly to standard zoom lenses whose range includes from the wide-angle region to the telephoto region. As a model embodying one form of this, the zoom lens is made up, comprising, from front to rear, a first lens unit of positive refractive power, a second lens unit of negative refractive power, a third lens unit of positive refractive power and a fourth lens unit of positive refractive power, that is, in the 4-unit form.

First, as the lens unit which is made to move in directions perpendicular to the optical axis to stabilize the image, on the assumption that the refractive power arrangement of FIG. 26(A) is used, the second lens unit of negative refractive power is selected. Then, the refractive powers of all the lens units are determined so as to satisfy the condition (10) described before. To allow the decenter sensitivity of the decentering lens unit to become high enough, the refractive power of the decentering lens unit, too, is determined so as to satisfy the condition (9). With these in mind, a fundamental framework for the zoom lens having the image stabilizing function is realized.

To further improve the correction of decentering aberrations, particularly decentering curvature of field, produced when the decentering lens unit is decentered, it becomes necessary to more rigorously reduce the decentering field curvature (PE) expressed by the equation (g) described before. In the equation (g), $\alpha_p$ and $\alpha_p'$ are the reduced angles of inclination of the paraxial light rays and their values are determined roughly depending on the refractive power arrangement over all the lens units. What refractive power arrangement to select for the given lens units suffers some degrees of limitation under the condition that the zoom lens should be realized to a sufficiently compact form and, therefore, cannot be altered much freely. Also, $P_p$ and $P_q$ are the Petzval sums of the decentering lens unit and that lens unit which is positioned on the image side thereof, depending roughly on the refractive powers of the lens units, but are possible to vary to some extent by appropriately altering the number of lens elements in each of the lens units and the materials from which the lens elements are made up.

So, with the zoom lens having such a refractive power arrangement, that is, the reduced angles of inclination $\alpha_p$ and $\alpha_p'$ of the paraxial light rays, when to further improve the correction of decentering aberrations, particularly field curvature, produced when the decentering lens unit is decentered, it becomes necessary to properly determine the values of the Petzval sums $P_p$ and $P_q$ of the lens units.

The condition (11) is set forth for the zoom lens having such a refractive power arrangement and has a range determined based on the consideration described above. When this condition is satisfied, the Petzval sums of the lens units take proper values. In actual practice, there is a case where even when the Petzval sums $P_p$ and $P_q$ are determined so as to satisfy the condition (11), the equation (g) described above cannot be put to "0". However, to realize a zoom lens having the image stabilizing function to a compact form as a whole, it is desirable to satisfy the condition (11).

Next, numerical examples 10 to 12 of the invention are shown. In the numerical data for the examples 10 to 12, Ri is the radius of curvature of the i-th lens surface, when counted from the object side, Di is the i-th axial thickness or air separation, when counted from the object side and Ni and vi are respectively the refractive index and Abbe number of the glass of the i-th lens element, when counted from the object side.

NUMERICAL EXAMPLE 10 f = 35.60–101.97   Fno. = 3.60–4.60

| | | | |
|---|---|---|---|
| R1 = 220.00 | D1 = 2.5 | N1 = 1.80518 | v1 = 25.4 |
| R2 = 61.24 | D2 = 8.0 | N2 = 1.51633 | v2 = 64.2 |
| R3 = −134.30 | D3 = 0.2 | | |
| R4 = 37.37 | D4 = 4.8 | N3 = 1.69680 | v3 = 55.5 |
| R5 = 91.27 | D5 = Variable | | |
| R6 = 57.75 | D6 = 1.5 | N4 = 1.69680 | v4 = 55.5 |
| R7 = 14.23 | D7 = 4.4 | | |
| R8 = −46.08 | D8 = 1.2 | N5 = 1.69680 | v5 = 55.5 |
| R9 = 33.37 | D9 = 1.0 | | |
| R10 = 26.83 | D10 = 2.9 | N6 = 1.84666 | v6 = 23.8 |
| R11 = −323.36 | D11 = 1.5 | | |
| R12 = −23.12 | D12 = 1.2 | N7 = 1.77250 | v7 = 49.6 |
| R13 = −48.97 | D13 = Variable | | |
| R14 = (Stop) | D14 = 1.0 | | |
| R15 = 30.87 | D15 = 3.7 | N8 = 1.51633 | v8 = 64.2 |
| R16 = −45.12 | D16 = 0.2 | | |
| R17 = 31.86 | D17 = 5.2 | N9 = 1.51633 | v9 = 64.2 |
| R18 = −16.35 | D18 = 1.2 | N10 = 1.83400 | v10 = 37.2 |
| R19 = 202.89 | D19 = Variable | | |
| R20 = −53.43 | D20 = 3.3 | N11 = 1.60311 | v11 = 60.7 |
| R21 = −19.10 | D21 = 0.2 | | |
| R22 = 56.40 | D22 = 3.0 | N12 = 1.65160 | v12 = 58.5 |
| R23 = −78.57 | D23 = 5.2 | | |
| R24 = −18.51 | D24 = 1.5 | N13 = 1.80610 | v13 = 41.0 |
| R25 = −72.51 | | | |

| | Focal Length | | |
|---|---|---|---|
| Separations | 35.60 | 70.00 | 101.97 |
| D5 | 2.50 | 17.66 | 24.50 |
| D13 | 14.50 | 6.34 | 1.50 |
| D19 | 9.30 | 7.80 | 8.10 |

Diagonal Length of Image Frame: 43.27
$f_o$=70.02
$f_p$=−17.07
$f_g$=26.76
$e_T$=31.64
$|f_q/(f_o-e_T)|$=0.697
$|f_p/(fW \cdot fT)^{1/2}|$=0.283
$|P_p/P_q|$=1.286

NUMERICAL EXAMPLE 11 f = 35.97–101.72   Fno. = 4.40–4.80

| | | | |
|---|---|---|---|
| R1 = 107.93 | D1 = 2.5 | N1 = 1.80518 | v1 = 25.4 |
| R2 = 48.11 | D2 = 7.6 | N2 = 1.51633 | v2 = 64.2 |
| R3 = −583.75 | D3 = 0.2 | | |
| R4 = 34.64 | D4 = 5.9 | N3 = 1.51633 | v3 = 64.2 |
| R5 = 289.32 | D5 = Variable | | |
| R6 = 153.82 | D6 = 1.5 | N4 = 1.69680 | v4 = 55.5 |
| R7 = 15.13 | D7 = 5.2 | | |
| R8 = −64.57 | D8 = 1.2 | N5 = 1.69680 | v5 = 55.5 |
| R9 = 46.43 | D9 = 0.5 | | |
| R10 = 26.72 | D10 = 3.2 | N6 = 1.84666 | v6 = 23.8 |
| R11 = 351.36 | D11 = 2.0 | | |
| R12 = −25.55 | D12 = 1.2 | N7 = 1.69680 | v7 = 55.5 |
| R13 = −47.49 | D13 = Variable | | |
| R14 = (Stop) | D14 = 1.0 | | |
| R15 = 27.73 | D15 = 2.9 | N8 = 1.69680 | v8 = 55.5 |
| R16 = −58.49 | D16 = 0.2 | | |
| R17 = 35.28 | D17 = 3.7 | N9 = 1.51633 | v9 = 64.2 |
| R18 = −18.24 | D18 = 1.2 | N10 = 1.83400 | v10 = 37.2 |
| R19 = 59.60 | D19 = Variable | | |
| R20 = −79.17 | D20 = 3.0 | N11 = 1.69680 | v11 = 55.5 |
| R21 = −18.24 | D21 = 0.2 | | |
| R22 = 41.35 | D22 = 2.8 | N12 = 1.60311 | v12 = 60.7 |
| R23 = −142.91 | D23 = 2.0 | | |
| R24 = −18.21 | D24 = 1.2 | N13 = 1.74400 | v13 = 44.8 |
| R25 = 279.13 | | | |

| Variable | Focal Length | | |
|---|---|---|---|
| Separations | 35.97 | 70.00 | 101.72 |
| D5 | 2.00 | 11.80 | 17.70 |
| D13 | 19.50 | 7.60 | 1.50 |
| D19 | 9.30 | 8.18 | 8.84 |

Diagonal Length of Image Frame: 43.27
$f_o$=65.01
$f_p$=−18.99

$f_q$=28.96
$e_T$=25.55
$|f_q/(f_o-e_T)|$=0.734
$|f_p/(fW \cdot fT)^{1/2}|$=0.314
$|P_p/P_q|$=1.472

NUMERICAL EXAMPLE 12

| | f = 36.11–102.00 | | Fno. = 3.60–4.60 |
|---|---|---|---|
| R1 = 133.94 | D1 = 2.6 | N1 = 1.80518 | ν1 = 25.4 |
| R2 = 59.61 | D2 = 7.9 | N2 = 1.60311 | ν2 = 60.7 |
| R3 = −524.63 | D3 = 0.2 | | |
| R4 = 43.75 | D4 = 6.1 | N3 = 1.51633 | ν3 = 64.2 |
| R5 = 168.13 | D5 = Variable | | |
| R6 = 86.79 | D6 = 1.5 | N4 = 1.80400 | ν4 = 46.6 |
| R7 = 15.28 | D7 = 5.0 | | |
| R8 = −36.46 | D8 = 1.2 | N5 = 1.80400 | ν5 = 46.4 |
| R9 = 93.00 | D9 = 0.5 | | |
| R10 = 31.16 | D10 = 3.8 | N6 = 1.80518 | ν6 = 25.4 |
| R11 = −38.98 | D11 = 1.0 | | |
| R12 = −26.75 | D12 = 1.3 | N7 = 1.80400 | ν7 = 46.6 |
| R13 = −303.98 | D13 = Variable | | |
| R14 = (Stop) | D14 = 1.5 | | |
| R15 = 32.69 | D15 = 3.8 | N8 = 1.69680 | ν8 = 55.5 |
| R16 = −48.79 | D16 = 0.2 | | |
| R17 = 30.11 | D17 = 2.7 | N9 = 1.51633 | ν9 = 64.2 |
| R18 = 128.84 | D18 = 2.4 | | |
| R19 = −23.20 | D19 = 9.5 | N10 = 1.80518 | ν10 = 25.4 |
| R20 = 107.11 | D20 = 1.0 | | |
| R21 = −195.04 | D21 = 3.4 | N11 = 1.51742 | ν11 = 52.4 |
| R22 = −20.35 | D22 = Variable | | |
| R23 = 48.8 | D23 = 4.4 | N12 = 1.56732 | ν12 = 42.8 |
| R24 = −28.31 | D24 = 3.0 | | |
| R25 = −24.34 | D25 = 1.6 | N13 = 1.83400 | ν13 = 37.2 |
| R26 = −39.82 | D26 = 2.0 | | |
| R27 = −19.38 | D27 = 1.8 | N14 = 1.83400 | ν14 = 37.2 |
| R28 = −35.59 | | | |

| Variable | Focal Length | | |
|---|---|---|---|
| Separations | 36.11 | 70.00 | 102.00 |
| D5 | 2.00 | 20.54 | 28.40 |
| D13 | 13.80 | 6.16 | 1.50 |
| D22 | 5.80 | 2.99 | 2.44 |

Diagonal Length of Image Frame: 43.27
$f_o$=80.00
$f_p$=−17.62
$f_q$=27.76
$e_T$=37.41
$|f_q/(f_o-e_T)|$=0.652
$|f_p/(fW \cdot fT)^{1/2}|$=0.290
$|P_p/P_q|$=1.296

According to the invention, as described above, part of the optical system, or one lens unit, is made to move in directions perpendicular to an optical axis when the shaking of an image is corrected. Along with this, each lens element is properly arranged to assist in well correcting all decentering aberrations. In addition, it is realized that a sufficiently short decentering movement suffices for correcting the sufficiently large shaking of the image, thereby improving the compact form of the instrument as a whole. Hence, it is possible to achieve a zoom lens having the image stabilizing function suited to the standard zoom lens whose range includes from a wide-angle region to the standard region.

What is claimed is:

1. A zoom lens comprising, film front to rear, a first lens unit of positive refractive power, a second lens unit of negative refractive power, a third lens unit of positive refractive power, a fourth lens unit of negative refractive power, a fifth lens unit of positive refractive power, and a sixth lens unit of negative refractive power, zooming being performed by varying separations between said lens units, and said zoom lens satisfying the following condition:

$$0.3 < |f4/fT| < 10.0$$

where f4 is a focal length of said fourth lens unit and fT is a longest focal length of said zoom lens.

2. A zoom lens according to claim 1, satisfying the following conditions:

$$0.1 < |f2/fT| < 0.18$$

$$0.12 < |f6/fT| < 0.3$$

where f2 and f6 are focal lengths of said second lens unit and said sixth lens unit, respectively.

3. A zoom lens according to claim 1 or 2, wherein at least one of said second lens unit and said fourth lens unit remains stationary during zooming.

4. A zoom lens according to claim 1 or 2, wherein said fourth lens unit includes a negative lens of meniscus form convex toward an image side.

5. A zoom lens according to claim 1, wherein letting the separations between the i-th and (i+1)st lens units for a wide-angle end and a telephoto end be denoted by DiW and DiT, respectively, the following conditions are satisfied:

D1W<D1T
D2W>D2T
D3W<D3T
D4W>D4T
D5W>D5T.

* * * * *

UNITED STATES PATENT AND TRADEMARK OFFICE
CERTIFICATE OF CORRECTION

PATENT NO. : 6,373,639 B2
DATED : April 16, 2002
INVENTOR(S) : Shingo Hayakawa et al.

It is certified that error appears in the above-identified patent and that said Letters Patent is hereby corrected as shown below:

Drawings,
Sheet No. 14: "FIG. 11(D)(4)" should read -- FIG. 11(C)(4) --.

Column 3,
Line 15, "support-and" should read -- support and --.

Column 4,
Line 31, "graphic" should read -- are graphic --.

Column 9,
Line 57, "R1S" should read -- R15 --.

Column 11,
Line 6, "7(B)" (2$^{nd}$ occurrence) should read -- 7(C) --.
Line 37, "in" should read -- ln --.
Line 39, "a" should be deleted.

Column 12,
Line 29, "follows" should read -- follow --.

Column 19,
Line 35, "(III)" should read -- (IIIE) --.

Column 21,
Line 25, "power" (2$^{nd}$ occurrence) should be deleted.

Column 24,
Line 34, "Pq" (1$^{st}$ occurrence) should read -- Pp --.

Column 25,
Line 8, "sum s" should read -- sums --.
Line 36, "FIG. 26(A). Of" should read -- FIG. 26(A).
            Of --.
Line 60, "$_o\phi_o$" should read -- $e_o\phi_o$ --.

UNITED STATES PATENT AND TRADEMARK OFFICE
CERTIFICATE OF CORRECTION

PATENT NO. : 6,373,639 B2
DATED : April 16, 2002
INVENTOR(S) : Shingo Hayakawa et al.

It is certified that error appears in the above-identified patent and that said Letters Patent is hereby corrected as shown below:

<u>Column 26,</u>
Line 18, "th e" should read -- the --.
Line 34, "prof" should read -- of --.

<u>Column 30,</u>
Line 14, "film" should read -- from --.

Signed and Sealed this

Eighth Day of October, 2002

Attest:

JAMES E. ROGAN
Attesting Officer     Director of the United States Patent and Trademark Office